(12) United States Patent
Barlev et al.

(10) Patent No.: US 7,133,441 B1
(45) Date of Patent: Nov. 7, 2006

(54) HIGH SPEED ACCESS SYSTEM OVER COPPER CABLE PLANT

(75) Inventors: Tuvia Barlev, Rosh HaAyin (IL); Arkady Molev Shtayman, Bnai Brak (IL); Amir Kanchuk, Ramat Gan (IL); Gilad Rozen, Herzelia (IL); Ishai Ilani, Modiin (IL); Ofer Sharon, Rishon Letzion (IL); Robert Shilton, Ra'anana (IL)

(73) Assignee: Actelis Networks Inc., Fremont, CA (US)

( * ) Notice: Subject to any disclaimer, the term of this patent is extended or adjusted under 35 U.S.C. 154(b) by 0 days.

(21) Appl. No.: 09/510,550

(22) Filed: Feb. 22, 2000

Related U.S. Application Data
(60) Provisional application No. 60/121,228, filed on Feb. 23, 1999.

(51) Int. Cl.
*H04B 1/38* (2006.01)
*H04J 3/04* (2006.01)
*H04J 3/22* (2006.01)

(52) U.S. Cl. .................. 375/222; 370/536; 370/543
(58) Field of Classification Search .............. 375/219, 375/222, 257, 260, 377, 224, 227, 346, 297; 370/536, 535, 542, 543, 252, 437, 201; 725/111; 714/752, 784; 379/1.03, 1.04, 93.05, 93.06, 379/93.07, 413.02, 413.03, 413.04, 22.02, 379/27.01, 417, 27.03, 219, 220.01, 221.07; 455/67.13, 295; 324/628
See application file for complete search history.

(56) References Cited

U.S. PATENT DOCUMENTS 3,655,915 A * 4/1972 Liberman et al. ........... 370/249
4,383,316 A * 5/1983 Seidel ......................... 370/536

(Continued)

FOREIGN PATENT DOCUMENTS

WO  WO 97/37454  10/1997
WO  WO 98/57472  12/1998

OTHER PUBLICATIONS

Yamano, Seiichi, "Media Characteristics for High–Speed Digital Transmission in NTT's Local Networks", IEICE Transaction on Communications, vol. E.80–B, No. 2, Feb. 1997, pp. 345–356.

(Continued)

*Primary Examiner*—Betsy L. Deppe
(74) *Attorney, Agent, or Firm*—Pearl Cohen Zedek Latzer, LLP

(57) ABSTRACT

A system for transporting a high speed data stream over a plurality of relatively low bandwidth unshielded twisted copper pairs within the local loop plant or in any environment having a plurality of copper lines, such as on campuses, within large buildings, etc. The copper twisted pairs are transformed from a plurality of low bandwidth, low reliability links into a high reliability, very high bandwidth long range communication channel utilizing optimized xDSL transmission technologies over the plurality of copper pairs. A transmit data processor perform scrambling, FEC encoding and interleaving on the data before it is divided and dispatched to the plurality of modem elements for transmission over the local loop plant, either bidirectionally or unidirectionally. On the receiving side, the individual data streams are collected, aggregated and a receive data processor performs de-interleaving, FEC decoding and de-interleaving, resulting in the high speed data stream originally transmitted. The system also includes means for increasing the performance of the xDSL modem elements including crosstalk cancellation, power and PSD control, data rate control and optimal routing of the transmitted signals within the twisted pair binders. Network elements located remotely on the other side of the plurality of copper pairs are provided electrical power. In addition, the system optionally multiplexes a plurality of low bandwidth telephony services over the high speed link using either TDM or FDM techniques.

20 Claims, 20 Drawing Sheets

U.S. PATENT DOCUMENTS

| | | | |
|---|---|---|---|
| 4,394,642 A | | 7/1983 | Currie et al. |
| 4,546,474 A | | 10/1985 | Sako et al. |
| 4,630,126 A | | 12/1986 | Kaku et al. |
| 4,685,129 A | * | 8/1987 | Gavrilovich ................. 379/324 |
| 4,710,923 A | | 12/1987 | Nagumo |
| 4,734,920 A | * | 3/1988 | Betts ........................... 375/222 |
| 4,780,883 A | * | 10/1988 | O'Connor et al. .......... 375/219 |
| 4,862,456 A | * | 8/1989 | Giorgio ....................... 370/276 |
| 4,890,316 A | | 12/1989 | Walsh et al. |
| 4,991,184 A | | 2/1991 | Hashimoto |
| 5,042,033 A | | 8/1991 | Costa |
| 5,251,210 A | * | 10/1993 | Mann et al. ................. 370/519 |
| 5,381,412 A | | 1/1995 | Otani |
| 5,463,661 A | | 10/1995 | Moran, III et al. |
| 5,475,711 A | * | 12/1995 | Betts et al. .................. 375/240 |
| 5,479,447 A | | 12/1995 | Chow et al. |
| 5,515,398 A | * | 5/1996 | Walsh et al. ................. 375/222 |
| 5,524,122 A | * | 6/1996 | Lepitre et al. ............... 375/222 |
| 5,528,593 A | | 6/1996 | English et al. |
| 5,533,004 A | * | 7/1996 | Jasper et al. ................. 370/204 |
| 5,541,955 A | | 7/1996 | Jacobsmeyer |
| 5,619,505 A | | 4/1997 | Grube et al. |
| 5,680,400 A | * | 10/1997 | York ........................... 370/473 |
| 5,740,256 A | | 4/1998 | Castello Da Costa et al. |
| 5,784,683 A | * | 7/1998 | Sistanizadeh et al. .......... 725/73 |
| 5,809,070 A | * | 9/1998 | Krishnan et al. ........... 375/222 |
| 5,832,387 A | | 11/1998 | Bae et al. |
| 5,970,088 A | | 10/1999 | Chen |
| 5,991,271 A | * | 11/1999 | Jones et al. ................. 370/252 |
| 5,991,311 A | | 11/1999 | Long et al. |
| 5,991,857 A | | 11/1999 | Koetje et al. |
| 5,999,565 A | * | 12/1999 | Locklear et al. ............ 375/222 |
| 6,055,297 A | * | 4/2000 | Terry .......................... 379/1.01 |
| 6,144,695 A | * | 11/2000 | Helms et al. ................ 375/222 |
| 6,144,696 A | | 11/2000 | Shively et al. |
| 6,198,749 B1 | * | 3/2001 | Hui et al. .................... 370/463 |
| 6,553,075 B1 | * | 4/2003 | McGhee et al. ............ 375/254 |
| 6,647,028 B1 | * | 11/2003 | Lancon et al. .............. 370/535 |
| 2001/0043675 A1 | * | 11/2001 | Starr ........................ 379/27.01 |

OTHER PUBLICATIONS

Seiichi Yamano, EICE Transaction Communication, vol. E80–B, No. 2, "Media Characteristics for High–Speed Digital Transmission in NTT's Local Networks" Feb. 1997, (pp. 345–356).

International Telecommunication Union, High Bit Rate Digital Subscriber Line (HDSL) Transceivers, ITU–T, G.991.1 (Series G: Transmission Systems and Media, Digital Systems and Networks; Digital transmission systems—Digital Sections and Digital Line System—Access Networks (Oct. 1998).

T1E1.4/2000–056, Working Group T1E1.4 (DSL Access); "Binder Capacity Maximization by Exercising Power Control", Feb. 21, 2000.

T1E1.4/2000–520, Working Group T1E1.4 (DSL Access); "Iterative NEXT Cancellation and Optimal Power Allocation for Maximizing Throughout in Symmetric and Asymmetric DSL", Feb. 21, 2000.

* cited by examiner

HIGH SPEED ACCESS SYSTEM OVER COPPER CABLE PLANT

REFERENCE TO RELATED APPLICATIONS

This application claims priority from United States Provisional Application Ser. No. 60/121,228, filed Feb. 23, 1999, entitled "Access Express-Very High Data Rate Communication Channels Over Copper," incorporated herein by reference in its entirety.

FIELD OF THE INVENTION

The present invention relates generally to telecommunications systems and more particularly relates to a system for transmitting high speed data over the unshielded twisted pair copper cable plant.

BACKGROUND OF THE INVENTION

The demand for data communications services is currently increasing at a greater and greater rate. This increase in end-user demand for more and more bandwidth is largely the result of the Internet and other data-intensive, high bandwidth applications. The Internet, in recent years, has experienced explosive growth in both the number of end users and the volume of traffic being sent. Consumers and other end-users are demanding higher bandwidth connections and faster Internet access. Another source for the demand is the increasing use by businesses of data communications networks (including traffic over the Internet) for the transmission of documents and email for both intra-office and inter-office purposes.

The demand from businesses and consumers for broadband service is increasing as most are no longer satisfied with dial-up Internet access connections. Many businesses and consumers are now requesting multi-megabit access bandwidth in order to participate in the e-revolution and to integrate their telecommunication services.

As more and more end users generate more and more data traffic, the demand for faster and faster data links will rise sharply. Currently, telecommunication companies are scrambling to meet the current demand while attempting to estimate future demand. A major roadblock preventing telecommunications providers from offering broadband services universally, however, is the local loop, referred to by some as the 'dirt roads of the information superhighway.' In order to offer high bandwidth access, these dirt roads must be paved, and in order to do so, ILECs and CLECs must invest an enormous amount of time and money in massive optical fiber infrastructure upgrades.

Currently, some carriers are using fiber optic cable to provide the high bandwidth pipes needed to satisfy the current bandwidth demand. Optical fiber, however, is not replacing legacy the copper cable plant. It is used mainly in new cable installations and in some cases to connect central offices (COs) to remote nodes, commonly referred to as Fiber to the Curb (FTTC). Notwithstanding the installation of optical fiber cable, the 'last mile' from the curb, node or patch panel to the customer premises comprises unshielded twisted pair copper cable.

Today, deployment of fiber in the local loop in the United States, for example, is relatively low. As few as 3% of the approximately 750,000 office buildings, 9% of curb cabinets and 19% of outdoor cabinets are connected by fiber optic cable to the CO. Optical fiber cable deployment in Europe is even lower. Within 15 years, deployment of fiber in the loop in the United States is expected to reach only 50%. The cost of bringing fiber to the home, for the United States, has been estimated to be in the hundreds of billions of dollars. Thus, universal deployment to every building in the local loop is an extremely time consuming and costly effort, one not likely to be undertaken by the major carriers.

In response to customer demands for bandwidth, many companies are providing alternatives to the last mile of copper, such as LEO satellite broadband, optical fiber, CATV cable, Wireless Local Loop (WLL) and other technologies. Another available technology is xDSL modem technology. Many ILECs, CLECs, and ISPs, which typically are under huge competition, have embraced DSL technology as an immediate broadband solution to serve the current demand by getting more out of the copper plant without waiting for the lengthy installation of fiber. As with many new technologies, however, many carriers face difficulties with the deployment of DSL, such as distance limitations, the lack of service parameter guarantees and the lack of the kind of reliability afforded by fiber.

Digital Subscriber Loop (DSL) technology refers to several types of services that use advanced modem elements to transmit digital signals from a data source over copper wire. DSL modem elements permit high data rate transmission of data over the public switched telephone network (PSTN). DSL modem elements can transmit data at multiple megabit speeds using sophisticated known signal processing techniques that permit voice and data to travel simultaneously over the same analog copper twisted pair wire.

Typically, the DSL services require two modem elements, one of that is located in the CO of the Incumbent Local Exchange Carrier (ILEC). CLECs, however, may collocate their DSL access multiplexers in the CO of the RBOC, enabling them to run over unbundled copper pairs, offering broadband connections to businesses.

Existing Copper Loop Plant

A block diagram illustrating a first example prior art network connecting a central office (CO) to other COs and different types of customer premises equipment (CPE) via low bandwidth copper lines is shown in FIG. 1. The example network, generally referenced 10, includes a CO 12 housing a telephony switch 24, ATM switch 28, DSL Access Multiplexer (DSLAM) 30 and Main Distribution Frame (MDF) 26. The example network 10 illustrates the existing copper cable plant as it is commonly used today.

Numerous types of telecom devices can be connected to the switch 24, such as a computer 14 outfitted with dial up, ISDN or other suitable type of modem, telephones 16, PBX 18 via T1 or other T-carrier line, the PSTN 20 and Internet Service Providers (ISPs) 22. A plurality of lines 32 connects the switch 24 to the MDF 26. The MDF functions to terminate hundreds or thousands of copper cables 34 that leave the CO and travel towards customer premises. The switch 24 terminates twisted pairs of wire that are routed via the passive MDF 26 to the copper cable plant 34 which typically is a large cable which may contain from 1000 to 3000 copper wire pairs. The cable 34 is directed to different locations that require a split of the cable to smaller sized cables typically containing 100 to 1000 pairs.

Along the way, the cable eventually splits off with the smaller cables directed towards different directions. For example, cable 36 is connected to a patch panel 40 at node #1 which connects the twisted pairs to end customers over a relatively short distance. For example, node #1 is connected to a plurality of CPE such as telephones 42 and PBX 43 connected via a T1 line. Cable 38 is connected to another patch panel 44 at node #2 that connects to a plurality of telephones 50. Further, cable 39 is connected to another patch panel 46 at node #3 that connects to a plurality of telephony devices 52. Another bundle is connected to a second CO 46 to which are connected a plurality of telephones 52. A passive node 48 connects the MDF 26 with telephone 56 and computer terminal 58 via modem 54 and to telephone 64 and LAN 60 via modem 62. Such passive nodes are usually installed in street cabinets or in the basements of buildings.

Fiber to the Node

A block diagram illustrating a second example prior art network connecting a CO to a plurality of nodes via optical fiber lines is shown in FIG. 2. The example network, generally referenced 70, comprises a CO 86 including an exchange switch 82, ATM switch 80 and an optical multiplexer 84. The exchange switch 82 is connected to a personal computer 72 with installed modem, telephones 74, PBX 76 via a T1 or other T-carrier line and PSTN 78. The exchange switch 82 is connected to one or more nodes 90 using fiber optic cables 88. A first optical multiplexer 84 on the CO side and a second optical multiplexer 92 on the node side terminate the optical fiber on either end.

The optical multiplexers, also referred to as optical network units, function to convert the high rate optical transmission into lower rate electrical streams such as telephony or data services (e.g., T1, T3). For example, optical multiplexer 84 functions to convert electrical based data services from the exchange switch 82 into high-speed optical signals. In addition, it multiplexes the signals from the ATM switch 80 onto the fiber optic cable 88.

At the node 90, an optical multiplexer 92 converts the optical signal back to an electrical data service such as T1, T3. A DSLAM 94 conveys the signal over twisted pair wiring to the customer premises. The type of DSL signal transmitted may include ADSL 98, HDSL 108, VDSL 106 or any other type of DSL. The CPE comprises a DSL modem 96 for communicating with the DSLAM over the copper twisted pair. The DSL connection enables the connection of the data generating device such as PC 100 to an ISP that is connected via the CO 86. The DSL link may also provide for the forwarding of voice (i.e., less than 4 kHz) over the twisted pair to the exchange switch via the fiber optic link 88.

Another example includes an optical multiplexer 91 connected to a DSLAM used to transmit services to one or more Multiple Dwelling Units (MDUs) 102, 104 via various flavors of DSL, e.g., VDSL 106 and HDSL 107. A node may also house one or more Digital Loop Carrier (DLC) multiplexers for connecting the CO to the customer premises via the twisted pair along the 'last mile.'

Copper Cable Plant

The copper cable plant, also referred to as the local loop plant, is the telephone company infrastructure that connect residences and businesses to the telephone company CO. Copper twisted pairs are already widely deployed but were originally designed for low bandwidth applications.

The telephone company determines estimates for the number of wire pairs needed depending on the density of the population in an area, the layout of the streets, existing rights of way, etc. and installs copper cable plant in order to provide service to each premise. Copper cables having a sufficient number of pairs of wires to serve the particular area are installed fanning out from the CO. The cables are spliced so that an appropriate number of pairs go to each neighborhood. The cables farther from the CO generally have fewer pairs.

The loop cable layout generally comprises feeder cables joined to distribution cables at service area interfaces located in boxes. The feeder cables, as opposed to the distribution cables, are generally planned for a longer period of time between installation and exhaustion. Different types of cable installation includes aerial cables installed on poles, cable pulled through ducts beneath the pavement or buried in a trench.

The length of local loops can range up to 18,000 feet and even beyond. Loop lengths longer than 18,000 feet, suffer from excessive attenuation of the signal. The existing cable plant, however, consists of portions built decades ago and portions built recently. Up to now, the standard way of reducing attenuation to use coarse gauge cable and to install inductive loading coils.

The cable pair attenuates the signal transmitted on a cable pair in addition to noise being added to the signal. For 15 kilofeet of 26 gauge twisted pair wire, the attenuation (or loss) of the signal may range from 40 dB at 40 kHz to over 100 dB at 1 MHz. The attenuation is worse in the presence of bridged taps. A bridged tap is a branch connected at some point along the path of the cable. Note that bridged taps may occur when the same cable pair is connected through more than one branch. They also occur when a cable pair runs past the customer premises and a wire (i.e., a drop wire) is attached and is connected to the premises. The loop cable pair continues beyond the point of attachment and becomes a bridged tap.

Another problem to be dealt with is the noise that is present on the copper cable plant. In the case of DSL, the noise effects the receivers located on either end of the twisted pair cable wire. The noise may be derived from numerous sources, but the most problematic source of noise is crosstalk from other pairs of wires in the cable. The interfering crosstalk is generated by alien DSL transmitters or other technologies that use the frequency band the receiver is designed to receive. These noise sources, if sufficiently strong enough, can cause errors in the reception of the signal that was transmitted.

Crosstalk worsens as the frequency increases. Thus, at voice frequencies, crosstalk is not much of a problem. It is a problem, however, at the frequencies of other data communication schemes such as ISDN, ADSL, RADSL, SDSL, T-carrier lines such as T1 and T3 (E1 and E3 in Europe). Signals from services other than the type being transmitted are known as alien services. Crosstalk from alien services, such as other DSL transmitters operating on the same cable, generates the most limiting interference.

The process of loop qualification examines the loop configuration of the customer since a line with less attenuation is less affected by a given amount of crosstalk. The process also examines the type of equipment proposed to be installed and the existing systems already transmitting in the cable on other pairs. This process is needed since different DSL schemes transmit downstream and upstream data differently. Some schemes segregate the frequencies used to transmit from the access service provider to the customer (i.e., downstream) from those used to transmit from the customer to the access service provider (i.e., upstream).

Although, the various DSL technologies that have been developed in the past few years address the needs of individual users, they achieve rates of 1 to 8 Mbps only over distances of a few miles. In addition, DSL suffers, as described above, from sensitivity to distance, crosstalk and other types of interference and line quality. ADSL has been developed at an attempt to minimize interference by transmitting high rate data in one direction at the expense of providing significantly lower data rate in the opposite direction.

An approach to overcome these problems is to install access multiplexers (e.g., DSLAMs or DLCs) as close as possible to the customer premises. The access multiplexers are then connected to the CO via fiber optic cables (as shown in FIG. 2). The optical fiber links are typically deployed in the local loop to provide a high bandwidth pipe between the CO and various communication nodes, e.g., curb side cabinets, equipment rooms or telco closets in buildings.

These nodes typically serve tens to thousands of lower bandwidth end users that are located in buildings, on campuses, in neighborhoods, etc. They include multiplexing equipment such as DLCs, DSLAMs and WLL base stations.

These multiplexing devices function to combine the lower data rate transmissions and the conventional telephony signals from individual end users into a high bandwidth payload that is transmitted via the optical fiber link to the CO. Note that fiber optic links are considered to be reliable, immune to electrical noise and capable of transporting very high rate data streams.

As described above, a drawback of optical fiber links is that they must be deployed in numerous new routes since they are still not very prevalent. This requires a huge capital investment both in terms of cost and very long installation times. In many cases, the long formidable installation times and high costs associated with fiber deployment, often act as a deterrent to its use in providing faster, symmetrical and more reliable data services in cases where such services depend on the deployment of optical fiber.

SUMMARY OF THE INVENTION

The present invention solves the problems associated with the prior art by providing a system, referred to as the High Speed Access System (HSAS), for transporting a high speed data stream over a plurality of relatively low bandwidth unshielded twisted copper pairs within the local loop plant. The invention is not limited to applications over the local loop plant, but may be used in any environment having a plurality of copper lines, such as on campuses, within large buildings, etc. The copper twisted pairs in the local loop plant are transformed from a plurality of low bandwidth links into a very reliable, very high bandwidth long range communication channel utilizing optimized xDSL transmission over the plurality of copper pairs. The system includes means for dividing a very high speed bandwidth channel into a plurality of lower rate data streams for bidirectional transmission over a plurality of xDSL modem elements. Use of the high speed transport platform of the present invention obviates the need for organizations to replace existing copper wires in the local loop plant with optical fiber and the associated high cost and lengthy installation time.

The present invention obviates the current practice of using xDSL technology to establish links from the CO all the way to the end user. Although the HSAS provides a high speed link from the CO to the node, xDSL technology can provide the link over the relatively short distance 'drop segment,' i.e., from the node to the end user.

The present invention is operative to disassemble a high speed data stream into a plurality of parallel data channels wherein each channel is adapted to carry a lower bandwidth signal than the original data stream. The data rate as well as the BER and the delay of each channel is independent of that of other channels and varies in accordance with the quality of the channel. Note that the HSAS comprises means for aggregating a plurality of lower rate streams, e.g., T1, T3, E1, E3, ISDN, etc., into a single high speed data link using known multiplexing techniques.

Before transmission over the channel, the high speed data passes through a scrambler, FEC encoder and interleaver. The processed data is then distributed to a plurality of modem elements that may comprise xDSL modem elements. The processing performed on the data is intended to improve reliability and immunity to noise and crosstalk, while reducing delays relative to transmission over each individual channel separately.

The scrambling and interleaving algorithms are operative to provide de-correlation and resiliency to (1) crosstalk interference from signals sent over other pairs and (2) noises (e.g., background noise, impulse noise, ingress noise, i.e., noise caused by an external source or alien xDSL sources within the same binder or other line disruptions).

The FEC encoding scheme is operative to add redundant overhead data to the transmission payload. The redundant data is used to correct errors corrupting the received data, thus improving the data rate of effective range over individual transmission in different pairs since it provides a lower noise safety margin.

Each of the parallel data channels is transmitted bidirectionally or unidirectionally over a twisted pair via a high data rate modem, e.g., xDSL modem. The transmission is optionally optimized according to the spatial structure of the cable and its associated electrical characteristics.

The HSAS has the capability of transporting existing telephony services (e.g., POTS) over the twisted pairs simultaneously with the high speed data channel, using well known TDM or FDM techniques.

The HSAS also comprises means for providing electrical power to the remote node to power the HSAS and optionally other components situated therein. The power is conveyed over the same twisted pairs used to transport the high speed data link. The power is split into a plurality of tributary feed currents, each individually sent over a twisted pair.

The HSAS at the receiving end of the channel, is operative to receive each individual data channel from each twisted pair via a complementary modem, while optionally improving reception by use of information about the spatial structure and electrical characteristics of the cable. The receive data output by the modem elements is then collected and a high speed data stream is formed therefrom. The data stream then undergoes de-interleaving, FEC decoding and descrambling which function to improve the quality and reduce the BER of the receive data. The result is the original high speed data stream. The receive also provides means for equalization of different delays experienced by the plurality of twisted pairs.

The telephony services are demultiplexed from the high speed data stream. Subsequently, the high speed data stream is then demultiplexed into the plurality of lower rate tributary streams, e.g., T1, E1, ISDN, etc.

The remote power feeds are collected from the plurality of twisted pairs and aggregated into a single power source for supplying power to the components and devices in the remote node.

Information concerning the spatial structure and electrical parameters of the cable is determined from measurements performed by the HSAS. A test module is adapted to take, on a periodic basis, measurements of crosstalk and NEXT transfer functions at various frequencies between each pair and all other pairs. The tests are performed on both ends of the communications channel and can be performed within a binder thus providing information regarding the position of pairs in the binder and NEXT transfer functions between pairs.

The measurements can be performed over any arbitrary number of twisted pairs, even if the pairs are located in other binders, thus extracting mapping information about the spatial structure of one or more binders which aids in allocating individual twisted pairs in a binder. Therefore, the measurements provide inter-binder information regarding crosstalk isolation between binders as well as intra-binder related information.

If measurements are restricted to within a binder, no inter-binder information can be obtained. In this case, information regarding the copper cable plant may be available from the carrier or vendor. This information can be used to improve the performance of the xDSL modem transmission when the HSAS is connected to a plurality of twisted pairs that reside in the same particular binder. A pair to pair matrix of the NEXT isolation transfer functions can be provided as measured by the carrier or cable vendor.

The information, whether obtained by measurements or from the carrier or vendor, can be used to improve the performance of the xDSL transmission in the following ways. First, the information can be used in performing NEXT cancellation in the xDSL receiving elements. In particular, in calculating the transfer functions of the NEXT between pairs which are used to estimate the crosstalk and remove it from the received signal.

Second, to identify the pairs with the worst interference and applying NEXT cancellation to those pairs only, thus reducing the complexity of the NEXT cancellation process.

Third, to provide information relating to the transmitters. In particular, the more spatial central pairs in the binder can be selected for transmission of the more sensitive upstream signal (i.e., from remote node to the CO), since these pairs are better protected from external interference. The more robust downstream signals (i.e., from CO to remote node) may be transmitted over the pairs closer to the outer portions of the binder. This is particularly useful when asymmetrical data streams are sent on the individual twisted pairs. For example, ADSL transmits in two opposite directions simultaneously over different copper pairs.

Fourth, in providing variable gain control of the individual transmitted data streams over the different twisted pairs, so as to enable higher transmission power in the more centrally situated twisted pairs of a binder. This significantly enhances the transmission capacity and range while maintaining the total radiated spectral power as measured at the outer walls of the binder within given telecommunications regulations (e.g., within PSD regulations). The gain control applied may be frequency selective, adapting the gain to the crosstalk attenuation at each specific frequency.

Fifth, in the transmission of multiple high speed data streams, each over a separate group of pairs, the transmissions of the different streams occur through the control of mutual interference between each of the groups of pairs as described hereinabove. Note that the alien interferer noise immunity effect described hereinbelow, provides for better isolation between the different data streams.

Sixth, in the event one or more of the twisted pairs are found to be of low quality, due to high attenuation, the presence of loading coils or other impairments, the HSAS is operative to either exclude these pairs from the plurality of pairs used for transmission of the high speed data stream over the channel or reduce their transmission rates. This results in the low quality pairs being utilized in a way that eliminates the burdensome requirement of providing line conditioning, a technique known in the art. The ability of taking one or more pairs out of service, assumes that one or more redundant pairs are available.

Several advantages of the HSAS include:

(1) Providing a high speed data communication channel whereby existing telephony services are transmitted simultaneously over the same plurality of twisted pairs.

(2) Providing remote electrical powering for the components at the remote node through the plurality of twisted pairs used to transport the high speed data and existing telephony services.

(3) Providing an aggregate high speed link from a plurality of lower rate data streams.

(4) Achieving positive synergy between the various xDSL links that comprise the aggregate high speed link. Thus, an adequate system level noise margin can be achieved using lower margin per each of the separate modem elements. Hence the bit rate of the HSAS is higher than that of a plurality of xDSL modem elements when the two systems maintain the same noise margin. Note that xDSL modem elements are usually deployed with 6 dB noise margin meaning that they can maintain their performance level (BER, rate and range) even when their SNR decreases by 6 dB. Due to the spatial processing scheme described hereinafter of the HSAS and the fact that the noise is 'averaged' on all of the lines, the HSAS can maintain a similar system wide noise margin with a much lower noise margin per each of the modem elements. This means the bit rate of the HSAS is higher than that of a plurality of xDSL modem elements when the two systems maintain the same noise margin.

(5) Dealing with faulty xDSL modem elements in that the system can dynamically adapt the rate of the modem elements to the variable line and environment conditions.

(6) Providing resiliency to cut lines which are lines that have either been cut off or their transmission characteristics have severely degraded.

(7) Alien interferer noise immunity effect which increases the immunity of the high speed link to noise sources which are not uniformly distributed over the separate pairs comprising the cable. This is due to the fact that the data is spatially scrambled among the pairs before transmission. At the point of de-scrambling at the receiving side, the noise is spread spatially among many lines thus reducing the impact for the overall link.

(8) Providing for a controlled tradeoff between range, quality, resiliency to cut lines, immunity to external noises, delay and data rate of the high speed link.

It is thus appreciated that the present invention provides a significant advance in the field of digital communications and in particular in communications over the local loop plant. The present invention provides a high speed communication channel over unshielded twisted pair conductors, while continuing to provide existing conventional telephony services simultaneously therewith.

The use of multiplexing, demultiplexing, error correction over multiple channels, xDSL transmission performance improvements through spatial mapping of the cable and NEXT cancellation technique result in a system for transporting high speed data over unshielded twisted pairs that is flexible and far more immune to noise. Such a system can serve as a cost effective replacement for the costly and time consuming deployment of optical fiber in the local loop plant.

There is thus provided in accordance with the invention an apparatus for transporting a high speed data stream over a channel made up of a plurality of relatively low bandwidth twisted copper pair lines, including an encoder for applying an error correction encoding scheme to the high speed data stream, a plurality of modem elements coupled to the plurality of twisted copper pair lines, each modem associated with one of the copper pair lines and configured to operate at a data rate independent of other modem elements, a dispatcher operative to divide the encoded high speed data stream into a plurality of low rate data streams to be transmitted by the plurality of modem elements, the dispatcher adapted to forward a low rate data stream to each modem in accordance with the data rate of each modem, a collector operative to combine a plurality of data streams received by the plurality of modem elements into a received high speed data stream and a decoder adapted to receive the data stream output from the collector and to apply an error correction decoding scheme so as to generate the original high speed data stream.

There is also provided in accordance with the invention a method of selecting the parameters for codewords generated by an encoder so as to provide desired resiliency to line failures, minimum bit error rate (BER) and maximum bandwidth, the parameters consisting of K and R, wherein K-R represents the number of bytes in a payload portion of the codeword and R represents the number of bytes in a redundancy portion of the codeword, wherein the codewords are distributed to a plurality of modem elements for transmission over a plurality of low bandwidth twisted copper pair lines, each modem having a data rate independent of other modem elements, the method comprising the steps of for all valid combination of codeword size K and redundancy length R, computing the maximum number of bytes from a codeword to be sent over each modem in accordance with its corresponding data rate, for all combinations of line failures, summing the number of bits from a single codeword to be transmitted, marking this combination only if the sum is less than R/2, for all marked combinations, computing the overhead and selecting from among all combinations of K and R wherein an associated overhead was computed, the combination yielding a minimum overhead.

There is further provided in accordance with the invention a method of transporting a high speed data stream over a plurality of relatively low bandwidth twisted copper pair lines, the method comprising the steps of providing a plurality of modem elements, each modem coupled to a twisted pair line, dividing the high speed data stream into a plurality of low rate data streams for distribution over the plurality of modem elements, transmitting the plurality of low rate data streams via the plurality of modem elements over the plurality of twisted pair lines, adapting the data rate of each modem in accordance with the quality of the twisted pair line associated therewith, receiving a plurality of low rate data streams over the plurality of twisted pair lines and assembling the plurality of low rate received data streams so as to yield the original high speed data stream.

There is also provided in accordance with invention a method of selecting the parameters for codewords generated by an encoder so as to provide desired resiliency to line failures, minimum bit error rate (BER) and maximum bandwidth, the parameters consisting of K and R, wherein K-R represents the number of bytes in a payload portion of the codeword and R represents the number of bytes in a redundancy portion of the codeword, wherein the codewords are distributed to a plurality of modem elements for transmission over a plurality of low bandwidth twisted copper pair lines, each modem having a data rate independent of other modem elements, the method comprising the steps of for all valid combination of codeword size K and redundancy length R, computing the maximum number of bytes from a codeword to be sent over each modem in accordance with its corresponding data rate, for all combinations of line failures, summing the number of bits from a single codeword to be transmitted, marking this combination only if the sum is less than R/2, for all marked combinations, computing the overhead and selecting from among all combinations of K and R wherein an associated overhead was computed, the combination yielding a minimum overhead.

There is further provided in accordance with the invention a dispatcher for distributing a high speed data stream among a plurality of modem elements, including a two dimensional buffer comprising a plurality of cells arranged as a plurality of rows and columns, each row associated with a different modem and each column representing a single symbol, transmitted at the highest transmission rate, an input sequencer adapted to distribute the high speed data stream to cells in the buffer, the amount of data distributed to each row is determined in accordance with the particular data rate of the modem corresponding thereto and an output sequencer adapted to distribute the contents of the cells in the buffer to the plurality of modem elements.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
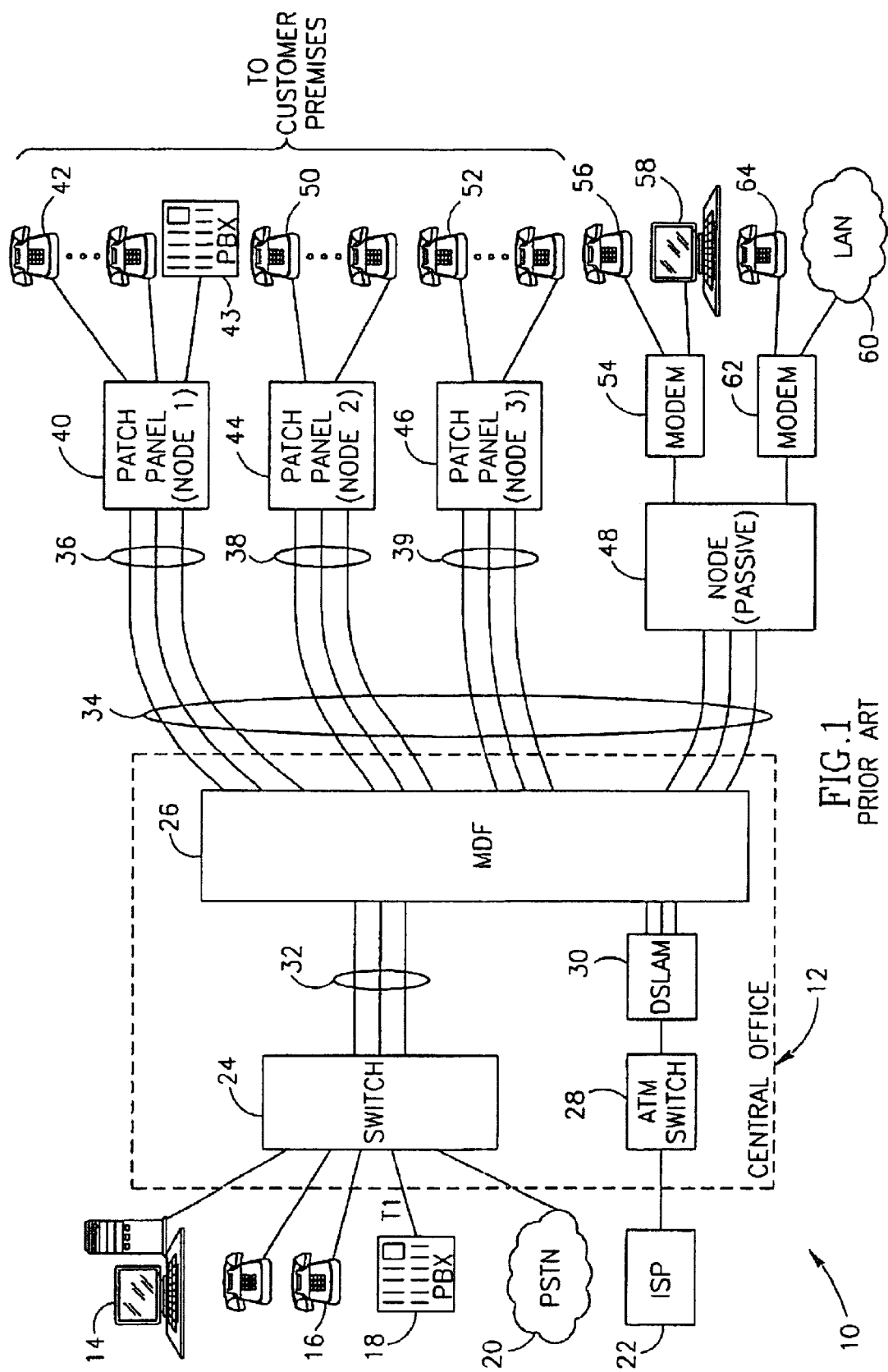
FIG. 1 is a block diagram illustrating a first example prior art network connecting a central office (CO) to other COs and different types of customer premises equipment (CPE) via low bandwidth copper lines.
Figure 2:
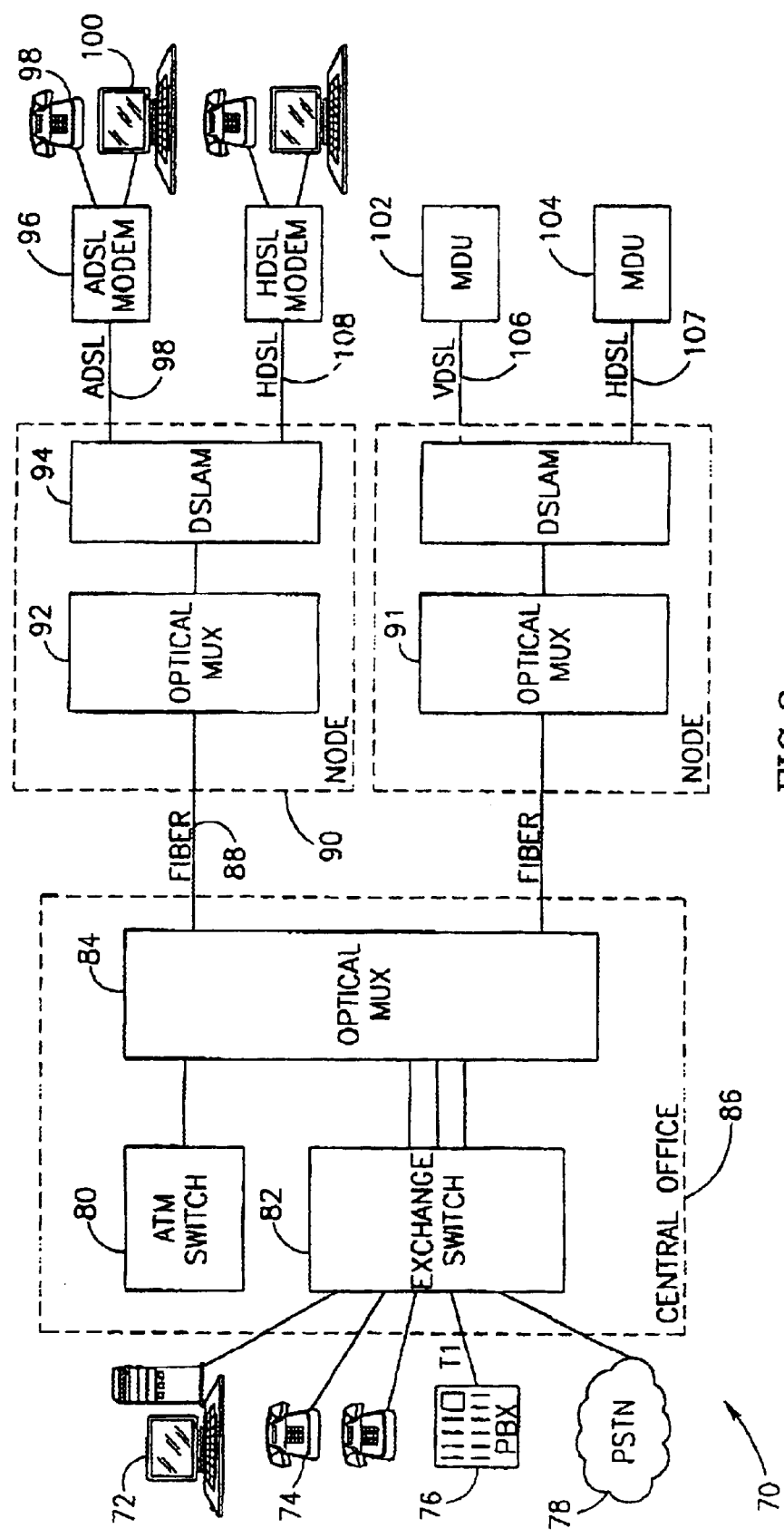
FIG. 2 is a block diagram illustrating a second example prior art network connecting a CO to a plurality of nodes via optical fiber lines.

The following notation is used throughout this document.

```
bound(e) = e is not equal to Ø
interior (e) = dest(e) is not equal to v∞
boundary (e) = dest(e) is equal to V∞
AddTriangle(v0,v1,v2)
{
    for(i ← 0, . . .,2) {
        e ← getRep(vi);
        if (bound(e)) {
            a ← b ← c ← Ø;
            e0 ← e;
            do {
                w ← dest(e);
                if(w = vi−1) {
                    if (right(e) ≠ v∞)
                        Error("invalid edge");
                    b ← e;
                }
                else if (w = vi+1) {
                    if (left(e) ≠ v∞)
                        Error("invalid edge");
                    a ← e;
                }
                else if(w = v∞) c ← e;
                e ← onext(e);
            } while (e ≠ e0 and not (bound(a) and bound(b)));
            g1 ← Ø;
            if (bound(a)) {
                if (bound(b)) {
                    if (onext(a) ≠ oprev(b)) {
                        e ← onext(b);
                        while ((e ≠ a) and (dest(e) ≠ v∞))
```

-continued

```
                            e ← onext(e);
                        if(e = a)
                            Error("non-manifold vertex");
                        f ← oprev(b);
                        Splice(onext(a),f);
                        Splice(e,f);
                    }
                    gi ← b;
                }
                else gi ← onext(a);
            }
            else if (bound(b)) gi ← b;
            else if (bound(c)) gi ← c;
            else Error("non-manifold vertex");
        }
    }
    i ← 0;
    repeat {
        if (not(interior(gi)) and not(interior(gi−1))) {
            e ← MakeEdge(vi,vi−1);
            if (boundary(gi)) Splice(onext(e),gi);
            if (boundary(gi−1)) Splice(rot−1(e),gi−1);
            gi−1 ← rot−1(e);
            g1 ← e;
        }
        else if (interior(gi) and interior(gi−1)) {
            Swap(rot−1(gi));
            if (interior(gi+1)) {
                Splice(rot−1(gi),gi+1);
                DestroyEdge(gi+1);
            }
            setRep(vi,gi);
            setRep(vi+1,rot(gi));
            setRep(vi+2,rot−1(gi));
            return;
        }
        i ← i+1
    }
}
```

Definitions Used Throughout

The following definitions are used throughout this document.

| Term | Definition |
| --- | --- |
| Active node | A node that accommodates active equipment that either concentrates or distributes transmission links. |
| CO side HSAS | The HSAS unit located in the CO. The CO side HSAS is responsible for initiating the connection establishment process and for bringing up the high speed link. |
| Cut line | A line that has either been cut off, or its transmission characteristics have been severely degraded (e.g., due to one or more failures of the modem elements associated therewith or due to one or more line failures) |
| Distribution cable or Drop cable | The cable that travels from the termination of the feeder cable over relatively short distances to the end customer. |
| Feeder cable | A large copper cable used to feed one or more service area interfaces. A feeder cable may have up to 3000 individual copper pairs. It is terminated at a wire center, passive node or patch panel. |
| Link effective bandwidth | The bandwidth available for connections, which includes both utilized and free bandwidth. |
| Link free bandwidth | The portion of the link effective bandwidth that is not currently used for connections. |
| Link performance parameters | One or more parameters that can be used to predict (1) the required number of twisted pair lines given a specific desired bandwidth, (2) the required level of reliability (i.e., BER and maximum number of lines that can be impaired without a loss of data). These parameters may be estimated or measured. |
| Link rate | The aggregate bit rate of all modem elements that are currently in use. |

-continued

| Term | Definition |
|---|---|
| Link setup parameters | One or more user specified parameters including (1) maximum BER on a link, (2) maximum number of lines that can be impaired without a loss of data. |
| Link states | The high speed link may be in one of three states: (1) up—available for connections; (2) down—no connection between HSAS units; and (3) reset—a learning state whereby both sides coordinate to synchronize the modem elements, map the twisted pair connections, measure the line NEXT matrix and find the maximal possible overall bit rate, and attempt to bring up the high speed link. |
| Modem states | A modem can be in one of either four orthogonal states: (1) synchronized—synchronization has been achieved, a line fail occurs when synchronization is lost; (2) mapped—the connection to the specific modem at the other end has been mapped; (3) in use—currently in use by the HSAS; and (4) under maintenance—modem is currently under maintenance, thus the bandwidth of the modem cannot be used for the high speed link. |
| Passive node | A node that accommodates a wire center from which a plurality of wires are distributed to users. |
| Remote node HSAS | The HSAS unit at the remote node. |

General Description

The present invention solves the problems associated with the prior art by providing an apparatus for and a method of using the unshielded twisted pair copper cable plant of the local loop as a medium for high rate data transmission. The invention functions to provide a high bandwidth, high data rate transport facility that utilizes the relatively low bandwidth unshielded copper pair wires in the local loop plant for its transmission medium. The high data rates supported are usually those supported by optical fiber links at speeds such as 34, 45, 155 Mbps and higher. The invention enables such high data rate signals to be transmitted symmetrically or asymmetrically and reliably for distances of miles, thus providing a cost effective and quickly deployable replacement for optical fiber in the loop.

The invention comprises transmitting and receiving equipment located at both ends of the data channel that operates in both directions simultaneously, providing a bidirectional high speed transport facility. A particular application of the invention is in the copper cable plant portion of the local loop that connects the CO to remote nodes, e.g., outdoor cabinets, curb side cabinets or telco closets in the basements of buildings where wire centers or passive nodes reside. Application of such a transport facility enables broadband services to be provided over existing copper infrastructure in the local loop. The invention is not limited to applications over the local loop plant, but may be used in any environment wherein a plurality of copper lines exist, such as on campuses, within large buildings, etc.

The feeder and distribution segments of the local loop generally comprise unshielded twisted pair copper wires connecting the CO with remote nodes. These segments of cable are typically the most critical and comprise the longest portion of the local loop. These are the segments targeted by carriers for replacement by optical fiber in order to obtain higher speed links. It is intended that an improvement in data transmission over these segments, as provided by the present invention, will preclude their replacement with optical fiber.

Figure 3:
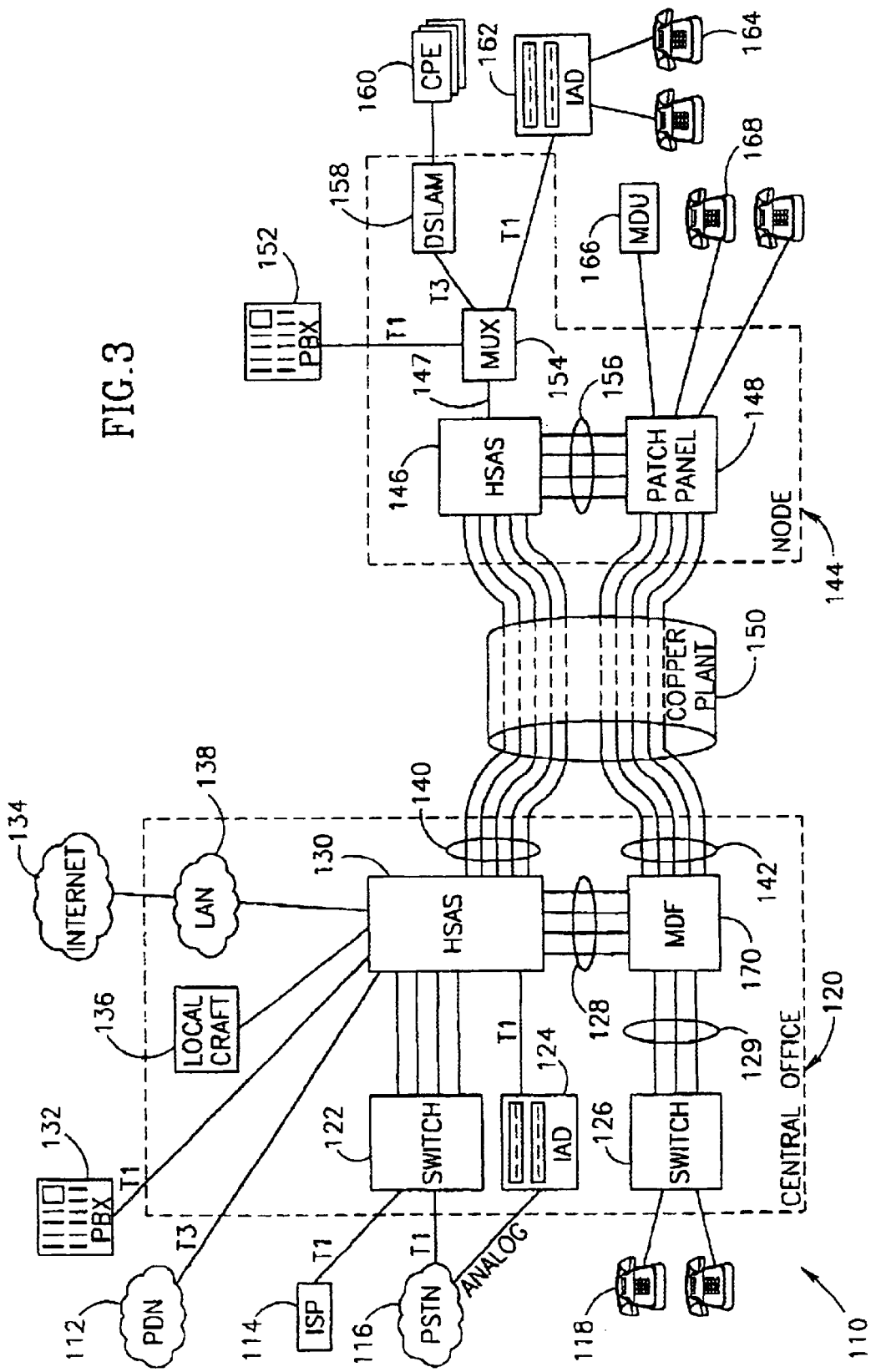
FIG. 3 is a block diagram illustrating an example network connecting a CO to a node via a high speed link over the copper cable plant utilizing the High Speed Access System (HSAS) of the present invention.

A block diagram illustrating an example network connecting a CO to a node via a high speed link over the copper cable plant utilizing the High Speed Access System (HSAS) of the present invention is shown in FIG. 3. The use of the present invention obviates the need to deploy optical fiber in place of the copper cable plant.

The network, generally referenced 110, comprises the High Speed Access System (HSAS) 130, 146 of the present invention connected to both ends of the copper cable plant 150. One end resides in the CO 120 and the other in a remote node 144. The HSAS is in turn connected to numerous devices including an exchange switch 122, Integrated Access Device (IAD) 124 over T1, Packet Data Network (PDN) over T3, PBX 132 over T1, local craft access 136 and intra-office LAN 138 connected to the Internet 134. The exchange switch 122, in turn, is connected to the PSTN 116 via T1 and an ISP 114 via T1. The IAD 124 is connected to the PSTN via analog line.

The remote node comprises the second HSAS 146, a patch panel 148 and one or more multiplexers 154. The multiplexer is connected to various CPE such as PBX 152 via T1 and IAD 162 via T1. The IAD has one or more devices 164 attached to it such as telephone sets, for example. A plurality of DSL modem elements 160 at the customer premises are connected via twisted pairs to the DSLAM 158 in the remote node. The DSLAM is connected via a high speed link such as T3 to the HSAS 146 that transports the data to the CO over the copper plant 150. The local craft access 136 is used as the means to control and manage the local and the remote HSAS.

The CO 120 also comprises an existing exchange switch 126 that provides low rate telephony services using twisted pairs 129. The twisted pairs 129 are connected to a passive patch panel 148 in the remote node 144 via the MDF 170 and copper cable plant 150. The connection to end users is made through twisted pairs connecting the CPE (e.g., MDU 166, telephones 168, etc.) to the patch panel 148.

In the example illustrated herein, the second switch 122 provides additional needed capacity. Rather than deploy optical fiber, an HSAS is placed in both the CO 120 and the remote node 144. A high speed link, aggregating the high data rate services terminating at the HSAS 130 from the switch 122 and other devices in the CO, is deployed over the copper cable plant to the multiplexer 154 at the remote node via HSAS 146. A plurality of twisted pairs 140 that were previously connected between the MDF 170 and patch panel 148, are now re-routed through HSAS units 130, 146 such that pairs 128 from the MDF are connected to pairs 156 that are input to the patch panel 148. Note that the pairs 140 are part of the larger copper cable 150.

On the CO side, the HSAS 130 functions to combine the data from the various data sources, e.g., switch 122, PBX 132, etc., with telephony services from pairs 128 and then transmit the combined data over a plurality of copper pairs 140 to the remote node 144. On the node side, HSAS 146 functions to receive the combined information over the plurality of pairs 140 and separates it into a high speed data link 147 for input to the multiplexer 154 and lower rate telephony services which are routed back to patch panel 148 over copper pairs 156.

It is important to note that the example application shown in FIG. 3 illustrates only one example of the possible application of the HSAS of the present invention. It is appreciated that one skilled in the art can apply the HSAS of the present invention to numerous other applications as well wherein it is desirable to deploy a high speed transport facility between two locations that are connected by a plurality of copper pairs with or without simultaneous telephony services over those pairs.

Figure 4:
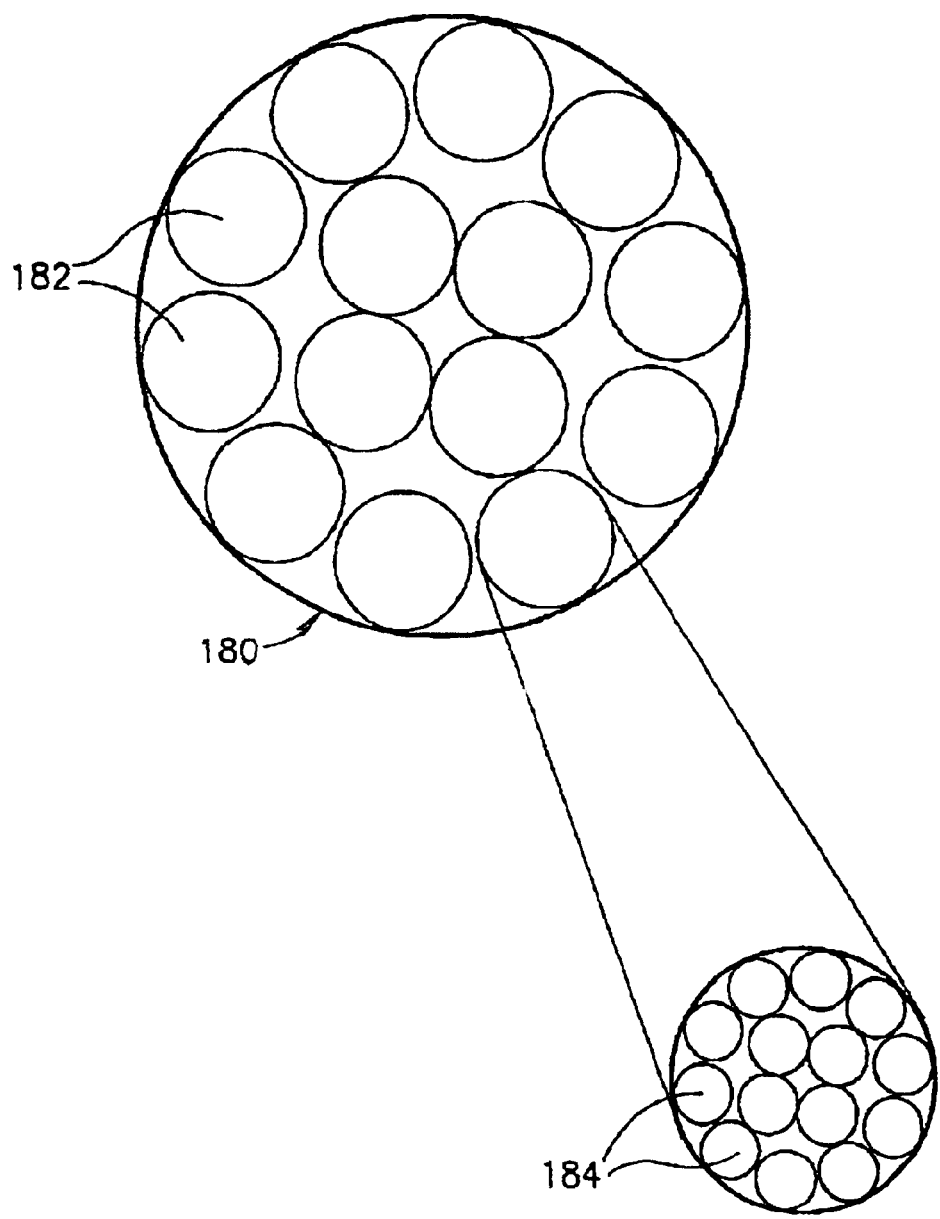
FIG. 4 is a diagram illustrating multiple cables binders within a cable bundle.

A diagram illustrating multiple cables binders within a cable bundle is shown in FIG. 4. The large copper cable 180 comprises a plurality of binders 182. These binders each carry 10, 12, 13, 25, 50 or more individual twisted pair copper wires 184. A cable 180 may comprise numerous cable binders 182. The links between HSAS units comprise a plurality of copper pairs 184. Note that the plurality of pairs used to connect two HSAS units may not lie within the same binder but may span over multiple binders. In addition, a plurality of HSAS systems may each be connected via separate groups of pairs that belong to the same cable.

The large copper cable 180 is typically used as the feeder cable to one or more service area interfaces that connect the feeder cable to distribution cables that then travel relatively short distances to the customer premises. The large cable 180 may comprise 1000 to 3000 individual copper pairs. On the CO side, the cable typically enters via a Cable Entrance Facility (CEF), or vault, where the copper pairs are terminated on a distributing frame. The distributing frame connects the large outside plant cable pairs to terminal equipment that connects the pairs to the network.

A characteristic of the copper conductors in the cable is that the electrical parameters such as NEXT and FEXT crosstalk between pairs are strongly correlated with the structure of a binder (i.e., relative isolation) and the relative position (i.e., distance) between pairs within a binder. This phenomenon is described in more detail in "Media Characteristics for High-Speed Digital Transmission in NTT's Local Networks," IEICE Transaction on Communications, vol. E.80-B, No. 2, February 1997, pages 345–356, incorporated herein by reference.

The HSAS unit comprises several blocks and may be implemented in numerous ways. Several exemplary embodiments are provided, one illustrates the HSAS unit in a Time Division Multiplexing (TDM) mode and another illustrates the HSAS unit in a Frequency Division Multiplexing (FDM) mode. Both these modes will now be described in more detail.

HSAS: TDM Embodiment

Figure 5:
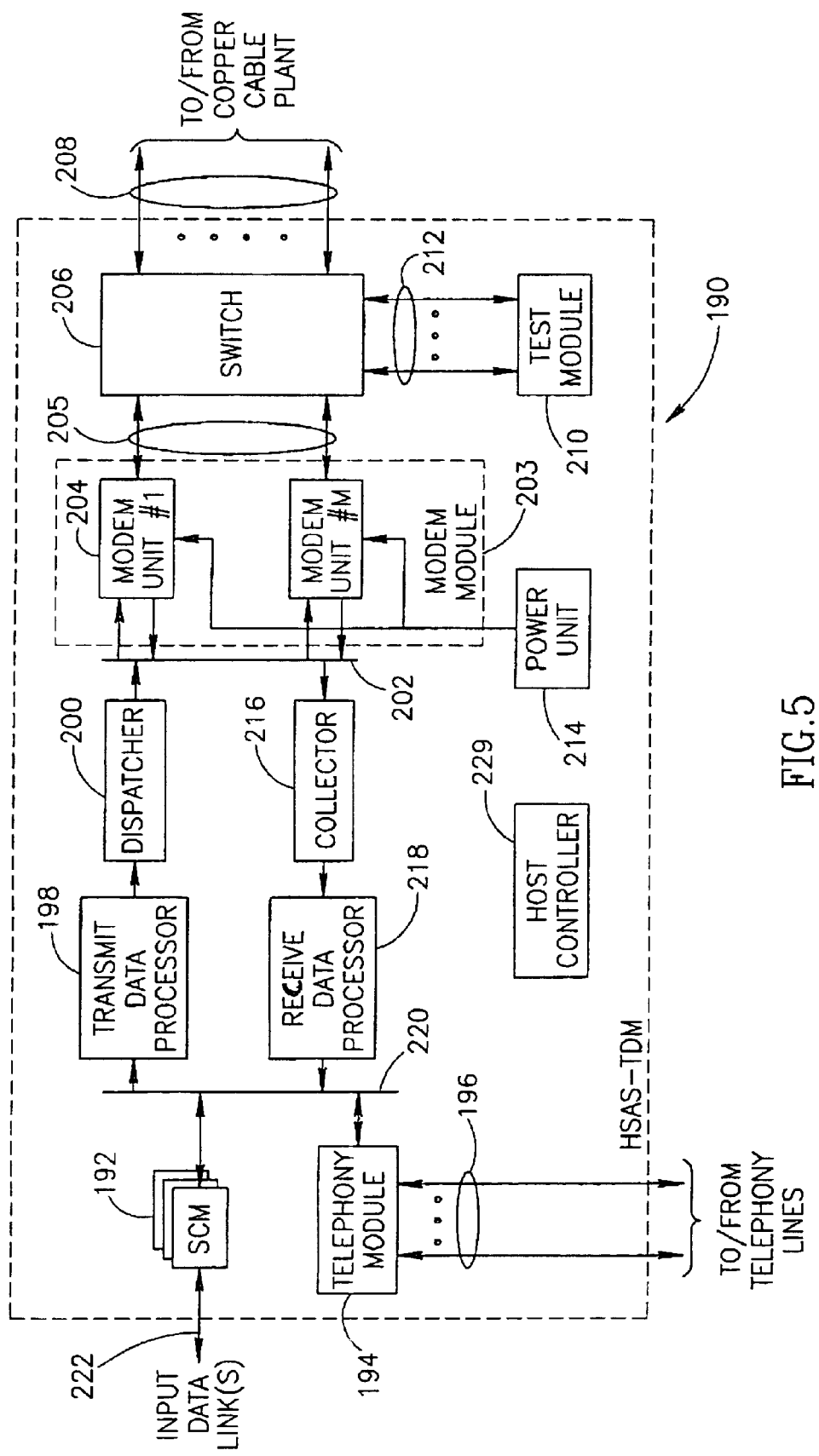
FIG. 5 is a block diagram illustrating the HSAS of the present invention constructed to integrate conventional telephony using Time Division Multiplexing (TDM)

A block diagram illustrating the HSAS of the present invention constructed to integrate conventional telephony using Time Division Multiplexing (TDM) is shown in FIG. 5. The HSAS, generally referenced 190, comprises one or more Service Channel Modules (SCMs) 192, a telephony module 194, transmit data processor 198, receive data processor 218, dispatcher 200, collector 216, an integral modem module 203 comprising a plurality of modem units 204, labeled modem unit #1 through #M and optionally crosstalk cancellation means as described hereinbelow, switch 206, host controller 229, test module 210 and power unit 214.

The SCM functions as the very high speed bidirectional line interface between the input data link 222 from the CO and the HSAS unit 190. The SCM provides line termination, synchronization and clock recovery at its receiver and line termination, line coding and signal amplification at its transmitter. The SCM is operative to provide the HSAS with a stabilized clock and input data stream from the input data link. In the opposite direction, it receives a data stream for output to the data link 222. A plurality of data rates may be supported including, for example, T1 (1.544 Mbps), T3 (45 Mbps), E1 (2.048 Mbps), E3 (34 Mbps), OC-3 (155 Mbps) and STM-1 (155 Mbps). It is appreciated that other rates, both higher and lower, may also be supported. In accordance with the present invention, a multiplexer is provided in the SCM for multiplexing multiple lower rate input streams, such as T1 or E1, into a higher rate stream. Note that numerous other types of data links may be supported and it is intended that the invention not be limited to those described herein. It is appreciated that the construction of these data interfaces is well known in the art.

The data from the SCMs is then forwarded to data processor 198 via bus 220. The data processor 198 is adapted to receive a single high speed data stream from the plurality of SCMs 192. The input data stream is then scrambled, FEC encoded and interleaved before being input to the dispatcher 200, thus improving immunity to noise and crosstalk. The dispatcher comprises one or more dispatch tables that are used to buffer the data to be sent to each modem unit 204. The data input to the dispatcher is divided into a plurality of lower rate data streams, each adapted to a particular modem unit. It is appreciated that the system may comprise other well known signal and data processing blocks as well as partial implementations of the processing blocks disclosed herein without departing from the scope of the present invention.

The allocation of the input stream to the various modem units may be performed using any suitable method. One such method is a round robin circular bit mapping technique. A second is an ATM inverse multiplexing circular mapping. Both allocation methods being known in the art. A third allocation method is described hereinbelow.

The data processor 198 applies an error correction encoding scheme jointly over the plurality of data streams sent to the modem units for transmission via bus 202. This scheme adds redundant overhead data to the signals transmitted and is used by the receiving data processor on the opposite side of the channel for correction of any errors that may have corrupted the transmitted data. It can be used as a mechanism that provides the system with resiliency to cut lines. The data processor 198 also introduces synchronization time signal overhead data into the transmitted data that is used by the data processor on the opposite of the channel for delay equalization between the various lower rate channels.

The telephony module 194 functions to multiplex a plurality of lower rate telephony lines 196 to the data transmitted over the local loop plant using a time division multiplexing scheme well known in the communications art. Similar to the SCMs, the telephony module interfaces the lower rate telephony line signals to the data processor 298 over the bus 220. The multiplexed data signal output of the telephony data carries the sampled TDM signal from the telephone lines and is combined with the high speed data from the SCMs before being processed into a plurality of lower rate streams for transmission by the modem units.

The data is sent to the modem units 204 from the dispatcher 200 via bus 202. The modem units comprise any suitable types of DSL modem elements such as modem elements that conform to the T1E1.4 HDSL2 standard. The output of the modem units pass through switch 206 before being coupled to the copper plant 208.

In the receive direction, the low rate signals received over the plurality of pairs by the modem units 204 are forwarded to the collector 216 via bus 202 where they are combined into a single high speed data stream. This high speed data stream is then input to the receive data processor 218 which functions to de-interleave, apply FEC decoding and de-scramble the received data stream. The data is forwarded to the SCMs and telephony module for transmission to the input data links and telephony lines, respectively.

The switch module 206 comprises a configurable switch matrix, such as may be implemented using metallic, electromechanical or solid state switches. The switch matrix is operative to receive commands from the host controller 229 and in response thereto switches the copper pairs 208 onto modem unit lines 205 or onto test module lines 212. Each line to line connection may be controlled independently of all other connections. The switch module 206 also functions to terminate lines that are momentarily disconnected. The mechanism that provide the system with resiliency to cut lines also compensates for such events. Note that in the case where asymmetric xDSL technologies are used in two opposite directions, the switch module 206 can be adapted to provide the switching facility, upon command from the host controller 229, to (1) connect lines carrying upstream transmissions to twisted pairs located more centrally in the binder and to (2) connect lines carrying downstream transmissions to twisted pairs located closer to the boundaries of the binder. This helps to protect the more sensitive links.

Alternatively, line pair selection may be implemented using xDSL components that are capable of transmission in both the upstream and downstream directions. In this case, flexible data switching for these components is performed in the dispatcher 200 and collector 216, under command of the host controller. Consequently, the functions of the switch module 206 are reduced to performing line switching for test purposes.

The host controller 229 is adapted to provide the management and control processes for the HSAS. Although not shown for clarity sake, the host controller maintains a connection to each component of the HSAS via one or more control lines. The host controller is adapted to provide management and control processes for both internal operation processes and external operation processes. Examples of internal operation processes include but are not limited to initialization of each of the various modules, plug-and-play automatic configuration and training upon restart, back-up switching of modules upon detection of a failure, etc. In addition, the host controller manages the wake up process of the system. Examples of external operation processes include but are not limited to interfaces for one or more user terminals, interfaces for one or more local craft access ports, etc.

In operation, the host controller modules on the CO side and the remote node side of the communications channel are adapted to maintain a communications link between them. This communications link is used for purposes such as coordinating operations involving both sides, exchanging operating status, etc.

The power unit 214 is operative to provide electrical power for the HSAS and optionally to other units in its vicinity. It can be adapted to derive power from any suitable source of electrical power including the standard −48/−60 V feed found in most COs, 110 VAC, 220 VAC or any other source of electrical power either from a utility, battery or otherwise.

When it is desired to provide remote powering of the remote side, the HSAS at the CO side comprises DC to DC conversion means for converting a low voltage into a higher voltage. The resultant signals are transported over two or more twisted pairs using a well known differential feeding scheme, such as the balun (i.e., balanced-unbalanced) method. The conversion may be performed using standard conversion techniques well known in the art or using a commercially available DC to DC converter.

At the remote node side, the power unit comprises means for collecting the one or more feed currents and generating a single combined power source. The combined voltage is stepped down using rectification means as is known in the electrical arts. In addition, the power unit is adapted to support battery charging and comprises hitless backup means, both techniques being well known in the art.

The test module 210 is adapted to perform parameter measurements of the twisted pairs 208. The measurements include mapping the spatial structure of the cable (as shown in FIG. 4), including binders within the cable, using crosstalk measurements. The crosstalk measurements include measurements at low frequencies where crosstalk is more monotonously proportional to the distance between pairs, measurements of crosstalk between different pairs and of NEXT transmission functions over one or more frequencies of interest, measurements of attenuation, level of interference between different pairs, SNR and cable length.

The test modules located on both the CO and remote node sides of the communication channel perform the measurements via coordination between the two over a communication link on one or more of the twisted pairs. The results of the measurements are stored for later use by the host controllers on both the CO and remote node sides.

The test module comprises transmitting means that is capable of generating tones at different frequencies and with variable amplitude. It also comprises frequency selective receiving means adapted to amplify received signals, filter the signals using tunable band pass filters to reduce noise interference and measure the resultant received power. The test module is also adapted to provide the appropriate line terminations if required by any of the measurements. Note that the transmitting and receiving means may be implemented using any suitable means including standard digital signal processing elements. The measurements can also be implemented by transmitting various known data sequences by the xDSL modem elements. These known sequences are then received and compared at the other side.

The twisted pairs that are undergoing measurements may be disconnected from the modem units 204 by the switch 206 and connected to the test module 210 on both the CO and remote node sides. The host controller 229 is operative to redirect in advance the payload transmission from the pairs that are intended to undergo measurements to other pairs that are not undergoing measurement. This assumes that there exists some margin of redundancy in the pairs for measurement purposes.

The measurements are performed in coordination between the two test modules on either side of the channel. For example, to measure line attenuation, the test module on one side transmits a signal and communicates the frequency of the signal to the other side via a communication link over pairs not under test. The test module on the other side, in response thereto, tunes its filters to the particular frequency and measures the received power. The power measurement is then communicated back to the other side over the communication link for further processing.

HSAS: FDM Embodiment

Figure 6:
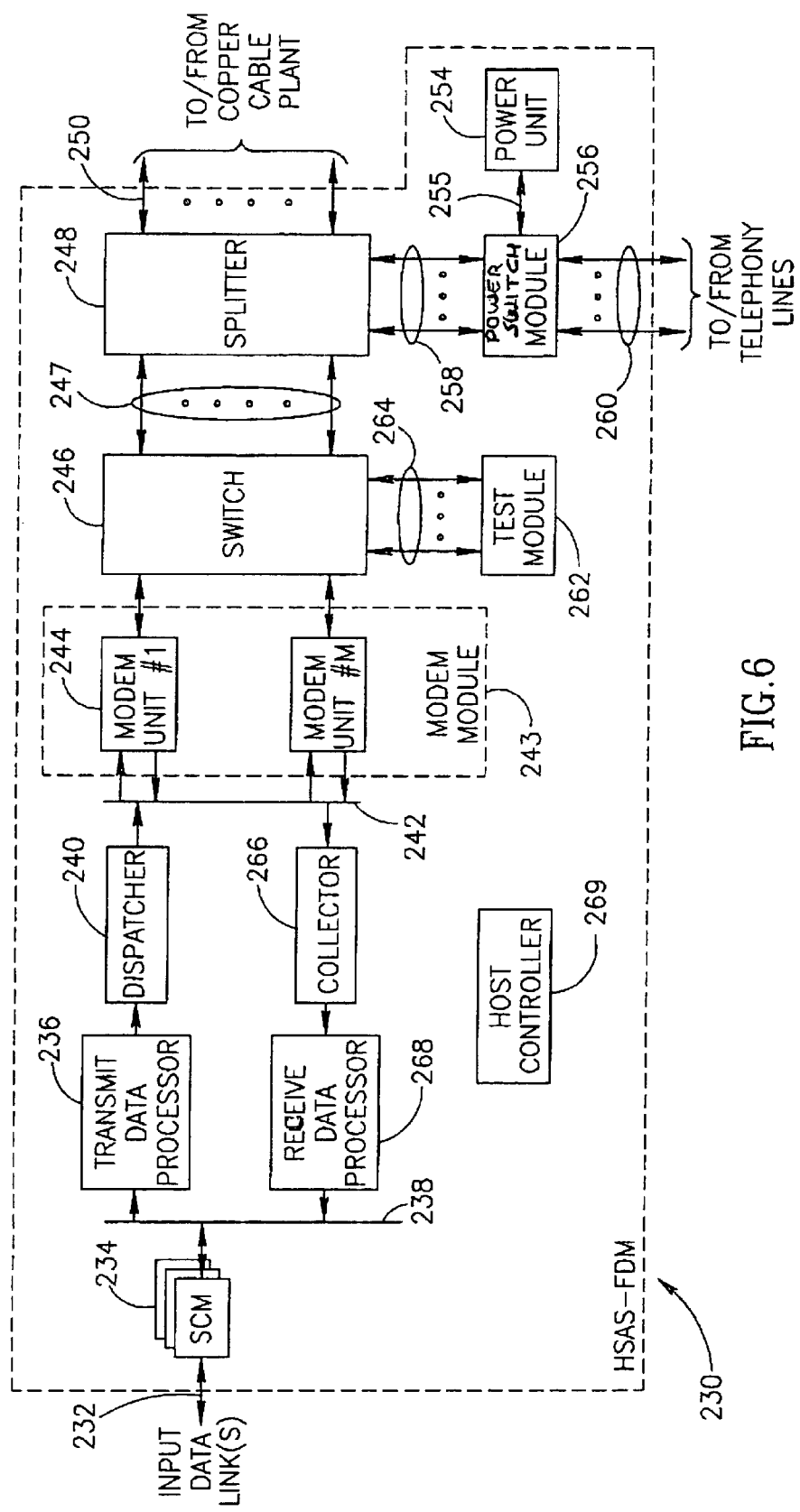
FIG. 6 is a block diagram illustrating the HSAS of the present invention constructed to integrate conventional telephony using Frequency Division Multiplexing (FDM)

A block diagram illustrating the HSAS of the present invention constructed to integrate conventional telephony using Frequency Division Multiplexing (FDM) is shown in FIG. 6. The HSAS, generally referenced 230, comprises one or more Service Channel Modules (SCMs) 234, a transmit data processor 236, receive data processor 268, dispatcher 240, collector 266, an integral modem module 243 comprising a plurality of modem units 244, labeled modem unit #1 through #M and optionally crosstalk cancellation means as described hereinbelow, switch 246, test module 262, splitter 248, host controller 269, power switch 256 and power unit 254.

The operation of the HSAS constructed for FDM is similar to that of the TDM version of the HSAS illustrated in FIG. 5. Therefore a detailed description will not be repeated here. Note, however, that the key difference between the two embodiments comprise the mechanism of transporting the telephony data over the twisted pairs. In the TDM embodiment, the telephony signals are multiplexed with the higher frequency data signals output by the modem units 244, resulting in a combined signal multiplexed in time. In the FDM embodiment, the telephony signals are multiplexed in frequency using the splitter 248.

The splitter 248 comprises a plurality of splitter devices, each providing separation in the frequency domain between low rate, low frequency telephony services, such as POTS, and the signals transmitted by the modem units which occupy a higher spectrum. Both signals are transported over the same twisted pair cables but occupy different frequency bands. Use of splitters to separate the two signals in frequency permit the data signals 247 output of the switch 246 to be transmitted simultaneously with the telephony services from lines 258 over the same plurality of twisted pairs 250. Note, however, that the use of splitters is limited to those xDSL technologies that support FDM transmission, such as ADSL.

The power switch module 256 comprises means to permit remote power feeding of the remote node via one or more of the plurality of twisted pairs 250. The power is delivered simultaneously with the combined transport of the xDSL data transmissions and low rate telephony services over the same twisted pairs. The xDSL data transmissions and low rate telephony services multiplexed onto the same twisted pair using FDM techniques.

The power switch 256 is adapted to receive a plurality of low rate telephony lines 260 and one or more power lines 255 from the high voltage power source unit 254 located on the CO side. The corresponding power unit at the remote node is connected to a load adapted to collect the individual tributary feed currents from the plurality of lines 250.

The power switch 256 also comprises a plurality of switches (e.g., electromechanical or solid state) each of which is connected to a separate line. Each switch is capable of connecting a splitter line 258 to either a telephony line 260 or high voltage power feed 255, in accordance with a command.

The power switch 256 also comprises a plurality of switches (e.g., electromechanical or solid state) each of which is connected to a separate line. Each switch is capable of connecting a splitter line 258 to either a telephony line 260 or high voltage power feed 255, in accordance with a command.

On the CO side, the power switch is adapted so that when there is no concurrent telephony session occurring on a particular line, the power switch is operative to disconnect this specific line 264 from telephony lines 260 and connect them instead to the power source unit 254. On the remote node side, the power switch is adapted to connect all lines from the splitter to the load rather than to the telephony lines, thus enabling the current feed to be transported over the copper twisted pairs 250 through one or more tributary currents. When the telephony signals are replaced with the power feed, standard line termination is applied to the telephony lines on the CO side and battery feed is applied to the end user equipment on the remote node side.

On the CO side, the monitoring device in the power switch 256 is operative to detect the request for a telephony session (i.e., detecting an off-hook in a POTS line) on line 'j'. In response, the power switch disconnects line j in the plurality of lines 258 from the power source 254. If the telephony session is detected on the remote node side, the power switch is operative to disconnect the line from the load instead. Note that any suitable means may be employed to detect the request for a telephony session including available analog off-hook detection circuits or well known digital signal processing techniques.

Simultaneously, the CO and remote node sides communicate with each other so as to coordinate appropriate switching actions on each side. Upon termination of the telephony session, detected by the monitoring device, the power switches on both CO and remote node sides are operative to switch line j back to the power feed position.

It is important to note that the power switch is adapted to perform the switching with timing coordination so as to achieve synchronized switching and appropriate electrical line discharge on both CO and remote node sides.

The process described hereinabove is a statistical 'multiplexing' process whereby power is fed to the remote side in accordance with the telephony traffic load. The power switch comprises means for balancing the load requirements on the remote node side with the telephony traffic statistics.

A charged battery is provided on the remote node side in order to ensure restart of the HSAS on the remote node side and to ensure battery feed to end user's CPE. When the battery is close to being fully discharged, the power switch on the CO side is adapted to impose a strict upper limit on the telephony traffic load, until the battery is sufficiently charged.

Common Elements

Figure 7:
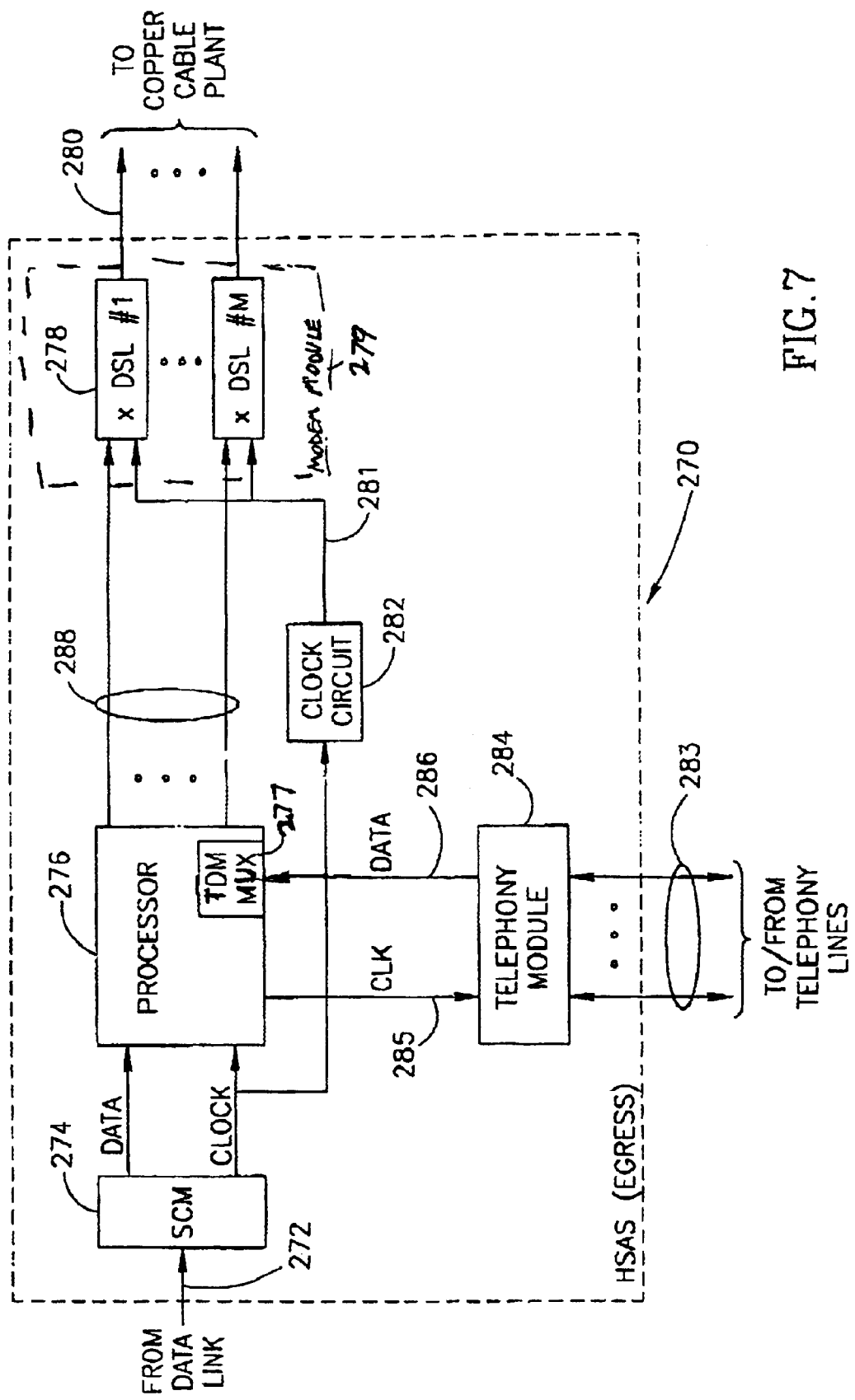
FIG. 7 is a block diagram illustrating the egress portion of the HSAS of the present invention in more detail.

A block diagram illustrating the egress portion of the HSAS of the present invention in more detail is shown in FIG. 7. The egress portion of the HSAS unit, generally referenced 270, comprises a SCM 274, processor 276, an integral modem module 279 comprising a plurality of xDSL modem elements 278, labeled xDSL #1 through xDSL #M, coupled to twisted pairs 280 and optional crosstalk cancellation means as described hereinbelow, a clock circuit 282 and a telephony module 284.

In this embodiment, the HSAS unit 270 comprises a processor 276 (e.g., microcomputer, microprocessor, programmable logic array, etc.) operative to receive a very high rate data stream and clock signal from the SCM 274. The SCM is adapted to extract the clock signal and generate the data signal from the input data link 272. The clock signal is input to clock circuitry 282 which functions to divide the clock signal into one or more lower rate clocks used for timing and synchronization of transmission processes in the xDSL modem elements 278. The clock division may be implemented using well known components such as PLLs, counters, etc. and techniques that are known in the art.

The telephony module 284 is adapted to provide interfaces for relatively low rate telephony services such as voice or POTS, ISDN, low rate n*64 kbps data services, switched 56 and medium rate interfaces such as T1 (1.544 Mbps) or E1 (2.048 Mbps). On the telephony side, lines 283 and associated interfaces provide the required bidirectional line termination functions, such as protection (e.g., lightening, over voltage, over current, etc.), physical layer signaling, line feeding, etc. as is known in the art.

Figure 8:
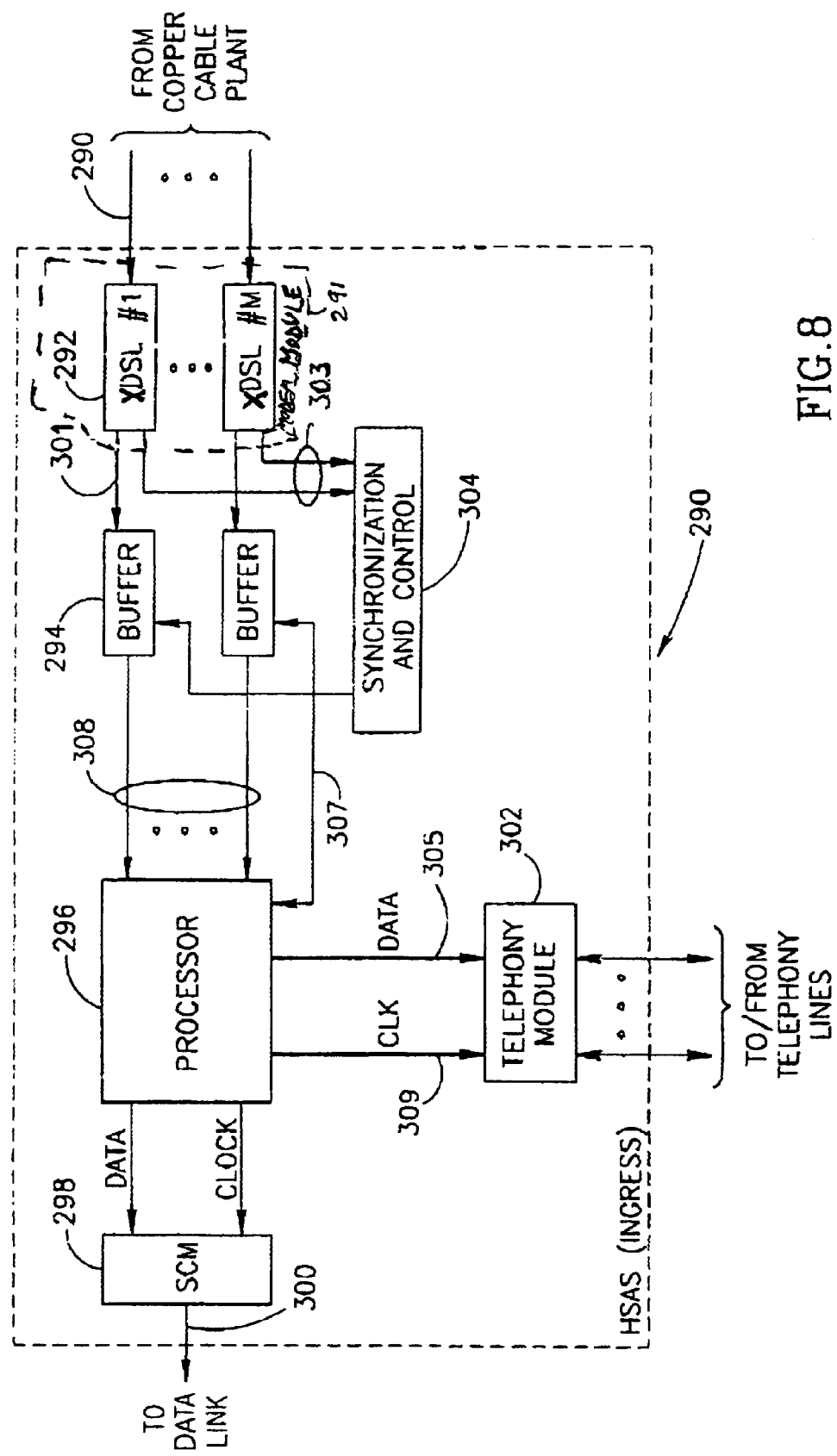
FIG. 8 is a block diagram illustrating the ingress portion of the HSAS of the present invention in more detail.

On the HSAS side, the telephony module provides multiplexing means that is adapted to multiplex low rate telephony services onto digital data link 286 using TDM techniques. These multiplexed telephony services are multiplexed using TDM with the input high speed data stream output of the SCM 274. The resultant multiplexed data signal is transmitted over the copper pairs 280 to the remote end of the communications channel. On the receiving side, the telephony services are demultiplexed from the high speed data link onto data link 305 (FIG. 8). The telephony module 302 on the remote side is operative to demultiplex and reconstruct the telephony services from the data link 305 using techniques well known in the electrical arts.

When the telephony lines signals are transmitted using TDM as shown in FIG. 5, the telephony signals are sampled by the telephony module 284 using clock 285. Using the clock signal 285, the telephony module 284 directs the data stream 286 to a TDM multiplexing element 277 incorporated within the processor 276. The TDM multiplexing element 277 functions to multiplex the data stream from the SCM with the telephony data 286 into a higher rate data stream.

This higher rate stream is divided into a plurality of frames of length L which are then scrambled, error correction encoded and interleaved, using techniques well known in the art, and then forwarded to modem 278 via modem Tx data lines 288. For example, the error correction coding overhead data may be generated using parity codes or Reed Solomon codes, both well known in the art. The result of the error correction coding is a codeword having a length K to be transmitted during each transmission cycle. The processor 276 may be preprogrammed to execute such a coding algorithm. Commercially available coding integrated circuits such as those manufactured by Advanced Hardware Architectures, Inc., Pullman, Wash. or a FPGA implementations can be employed. A number of such coding algorithms can be programmed in the processor 276, wherein each is applicable to particular set of line conditions; effective transmission rates and reliability requirements as selected by an external host controller or CPU.

Given a common transmission time base (clock signal 281), a common transmission frame timing cycle can be derived for all the transmission elements (i.e., xDSL modem elements 278). Within this frame cycle, the effective rate for each transmitting element 'i', where 0<i<M, corresponds to a number of bits, denoted $t_i$, transmitted, each transmission cycle.

The length K is calculated to be smaller than or equal to the total sum of $t_i$ bits per transmission cycle, for all M transmitting elements 278 combined together. For each frame cycle, the codeword with length K is then divided into $t_I$ sections of $t_i$ bits, with each section transmitted over the corresponding $i^{th}$ transmission element.

Additional robustness to errors in transmission maybe achieved by applying an interleaving process, wherein the frame of K bits is interleaved in time, as is known in the art, before transmission over the plurality of transmission elements 278.

In order to properly reassemble the transmitted frame on the receiving side, the host controller communicates the transmission parameters to the receiving HSAS. Such parameters include, for example, interleaving and error correction coding schemes used, frame length, effective rate for each transmission channel, etc. Such communications may utilize one or more overhead data channels or an Embedded Operations Channel (EOC) integral to the xDSL modem elements used. Alternatively, these parameters can be conveyed using a control channel, which is multiplexed by the HSAS onto the high speed link that connects one side to the other.

Since the transmitting elements 278 are aligned to a common time base upon transmission of the data, the framing signals from the xDSL modem elements at the receiving end may be used to align the received data. Alternatively, a common synchronization clock used for both the CO and remote node sides, may be sent over a specific copper pair dedicated for this purpose.

A block diagram illustrating the ingress portion of the HSAS of the present invention in more detail is shown in FIG. 8. The ingress portion of the HSAS unit, generally referenced 290, comprises an integral modem module 291 comprising a plurality of xDSL modem elements 292, labeled xDSL #1 through xDSL #M and optional crosstalk cancellation means as described hereinbelow, buffers 294, a processor 296, a SCM 298, a synchronization and control circuit 304 and a telephony module 302.

The transmitted signals are received over twisted pairs 290 by xDSL modem elements 292 that function to output the received data 301 and one or more synchronization signals 303. The synchronization signals are input to a synchronization and control circuit 304. The received signals 301 are buffered in rate adjustment buffers 294 before being input to the processor 296. The processor functions to reassemble the high speed data stream and forward the data and associated clock to SCM 298. The SCM outputs a high speed data stream 300 having a rate similar to the originally transmitted high speed data stream 272 (FIG. 7).

Reassembly of the high rate data stream from the plurality of low rate streams may be implemented through either a round robin mapping method or an ATM inverse multiplexing technique, as described in connection with the processor 276 in the egress HSAS 270 (FIG. 7).

The processor 276 also functions to apply the same error correction coding scheme to the data received over the plurality of pairs 308. The error correction coding process utilizes the redundant overhead data for correction of any errors found in the received data. The processor also applies a de-interleaving process and de-scrambling process to the received data, thus aligning the data to the originally transmitted sequence. The processor also utilizes the time stamp synchronization overhead data received over the plurality of streams 301. This data is used for alignment and compensation of delays between the different lower rate channels.

In connection with the TDM implementation of the HSAS shown in FIG. 5, in addition to the high speed data stream 300, the processor 296 is operative to extract a data signal 305 from the data received from the plurality of lower rate streams 301. The data signal 305 is input to the telephony module which demultiplexes it to provide telephony signals suitable for the plurality of telephone lines connected thereto. The extraction of the telephone signals form the data received over the copper pairs can be performed using well known time division multiplexing techniques. The data signal 305 carries the sampled TDM multiplexed telephony services. In addition, a recovered clock signal 309 is provided to the telephony module 302 as well.

The plurality of data streams 301, which may be of different rates, are received from the receiving portions of the xDSL modem elements 292 in the ingress HSAS 290 together with timing signals 303 (i.e., clock and framing signals) generated by each element. The timing signals are directed to a synchronization and control circuit 304 whereby they are used to derive control signals 307 for buffers 294. A single buffer 294 is provided for each received data stream.

The buffers enable the alignment of the received data, thereby compensating for different delays in the various data streams. The framing signal may serve as a point of reference for the alignment process.

The processor 296 receives the aligned $t_f$ bits per frame from the $I^{th}$ modem element. Based on information received by the host controller at the ingress HSAS, via a communications channel formed between the hosts of both egress and ingress sides, the processor performs the following functions:

1. Combines the $t_f$ bits together into a K bit long word.
2. Re-arranges the order of the bits if scrambling or interleaving was introduced at the time of transmission.
3. Performs an error correction decoding function, using the redundant data to correct any errors found. Words of length L bits remain per frame.
4. TDM techniques used to demultiplex the relevant telephony data stream 305 and associated clock 309 synchronized thereto from the error corrected data.
5. Transmits the remaining high speed data to the SCM 298 over data lines and associated clock lines.

The modem elements in the HSAS make up a bidirectional (or unidirectional) multi-pair transmission facility that interfaces between a plurality of digital data streams (M egress data streams 288 towards the cable and M ingress data streams 308 from the cable) and a plurality of twisted copper pairs on the cable side. Note that the data streams may be of different data rates. Each modem element comprises one of the known xDSL technologies, such as HDSL, SDSL, HDSL2, ADSL, VDSL or any other suitable xDSL technology.

Each of the modem elements supports a single low rate data stream (288 in FIG. 7, 301 in FIG. 8) on the digital side and provides for such a stream to be received and/or transmitted (i.e., transceived) over one or more twisted pairs on the cable side (280, 290). Note that the number of twisted pairs may be higher than one per individual modem element depending on the xDSL technology selected for a particular application.

The modem elements used, may be adapted to support either (1) bidirectional (i.e., symmetric) communications, such as HDSL or HDSL2 or (2) asymmetric communication, such as ADSL. In the event that asymmetric modem elements are utilized, transmission occurs in two opposite directions over different twisted pairs. Depending on the application, special provision can be made for the optimal allocation of the data streams into the pairs, NEXT cancellation and gain control in order to avoid interfering with other signals in the copper cable plant, as described in more detail infra.

Note that the xDSL technologies described above can be operated at different rates for each of the twisted pair lines depending on the individual line characteristics. In accordance with the invention, the performance of the modem elements in the HSAS may be enhanced in terms of rate and range by using information available to the HSAS concerning the internal spatial structure of the cable (such as the one shown in FIG. 4) that is in use. Information includes the structure and composition of the binders within the cable. Also included are the relative locations of twisted pairs within binders and their electrical parameters including crosstalk. The dominant component of crosstalk interference is that contributed by nearby radiators, i.e., NEXT. Useful information about the NEXT can be represented by the value of its transfer function at various frequencies, measured on both the CO side and the remote node side, between any two specific twisted pairs used.

Such information, either relating to a plurality of pairs which resides in various binders or within a single binder, may be provided to the HSAS unit by either (1) measurements taken either manually or automatically via a test module incorporated into the HSAS; (2) cable vendor information where applicable, which may comprise worst case inter-binder crosstalk and nominal copper pair attenuation; or (3) measurements taken automatically by the adaptive filters, which are used for the implementation of the NEXT cancellation itself. During the coarse adaptation phase, these filters adapt their transfer function to represent that of the NEXT transfer function, e.g., using the LMS adaptation method (NEXT cancellation error is used as a feedback for the adaptation process). During the fine adaptation phase, i.e., during run time, they use NEXT cancellation error feedback for continuous fine adaptation.

The HSAS optionally comprises NEXT cancellation means, implemented using known digital signal processing techniques. The NEXT cancellation means is adapted to operate based on the measured NEXT transmission function between transmission pairs of cable. The following process may be performed in order to substantially reduce, at the receiving elements, the NEXT interference caused by crosstalk from other transmitters. In general, the NEXT canceler is operative to generate an estimate of the NEXT transfer function. Using this function, an estimate of the disturbing NEXT signal is generated and subtracted from the received signal.

The process is performed for j=1 to N transmit twisted pairs and i=1 to M receive twisted pairs. The term $H_{ij}(f)$ denotes the measured frequency dependent NEXT transmission function between pairs i and j. The received signals $R_i$ and the transmit signals $T_j$ are sampled and transformed into the frequency domain, using Fourier techniques well known in the signal processing arts.

The received signal after NEXT cancellation is calculated using Equation 1 below.

$$RX_i(f) = R_i(f) - \sum_j H_{ij}(f) \cdot T_j(f) \qquad (1)$$

where $RX_i(f)$ represents the $i^{th}$ received signal after NEXT cancellation. Subsequently, $RX_i(f)$ is transformed back into the time domain using well known inverse Fourier techniques, thus providing a time domain signal.

Alternatively, the calculation of the received signal after NEXT cancellation can be performed entirely in the time domain, using the time domain representation of the NEXT transfer function $H_{ij}(t)$, as is known in the art. In both time and frequency domain implementations of the NEXT cancellation, LMS adaptive FIR filters are used to estimate the NEXT transfer function.

In accordance with the present invention, the test module 210 (FIG. 5), 262 (FIG. 6) may be adapted to periodically measure $H_{ij}(f)$ which may be represented as a two dimensional matrix referred to as the crosstalk matrix. The test module monitors the cable parameters and compensates for changes found therewith. The cable parameters may depend on environmental factors such as temperature and humidity. The updated $H_{ij}(f)$ generated by the test module replaces the old $H_{ij}(f)$ in future calculations of the NEXT cancellation apparatus. Alternatively, the adaptation may be implemented using a combination of the test module functions and the LMS adaptive FIR filters themselves.

The NEXT cancellation process described above may be performed for all transmitting pairs or for a portion of the transmitting pairs in the event it is desirable to reduce the computation complexity. In this case, only those pairs identified as having significant NEXT problems are included in the calculations. The test module may be adapted to perform the selection in accordance with the crosstalk matrix.

Alternatively, the modem elements used in the HSAS may comprise Discrete Multitone (DMT) modem elements. Such a modem element may be adapted to perform the NEXT cancellation method of the present invention with respect to each of the different tones separately. This provides the flexibility of choosing the worst interfering frequencies for each pair, e.g., for allocation of cancellation resources, independently from others.

Adaptive Estimation of Crosstalk Matrix

In the event (1) no measured information about the NEXT transmission functions $H_{ij}(f)$ or $H_{ij}(t)$ (i.e., the crosstalk matrix), is available, or (2) for dynamic adaptation of the transmission functions previously measured to changes over time, the NEXT cancellation apparatus is adapted to estimate the characteristics of the transmission functions, using suitable adaptive feedback methods known in the art. One such suitable feedback method is implemented using a trial and error process whereby for each possible pair (i,j), different sets of parameters for the NEXT transfer function $H_{ij}(f)$ or $H_{ij}(t)$ are substituted into the cancellation process of subtractive addition. For each set of parameters, the energy of the received signal RX(f) is measured.

The set of parameters for which the energy reaches a minimum is selected as the estimated transmission functions for the particular parameter set of $H_{ij}(f)$ or $H_{ij}(t)$ which are then used in the NEXT cancellation process. This process is repeated for each of the receive twisted cable pairs.

Another suitable method comprises using adaptive filters that are used to implement the NEXT cancellation algorithm itself. During the coarse adaptation phase, these filters are operative to adapt their transfer function to match that of the NEXT transfer function, e.g., using the LMS adaptation method, the NEXT cancellation error is used as feedback for the adaptation process. During the fine adaptation phase, such as during run time, the filters use NEXT cancellation error feedback to achieve continuous fine adaptation.

Transmit Power Control and Ingress and Egress PSD Control

When (1) one or more integral binders are available for use with the HSAS unit of the present invention as the communication channel for transmission of the, high speed data link and when (2) the NEXT cancellation algorithms described herein are implemented, the following performance enhancements may be performed.

First, the more spatially central pairs within a binder are selected for transmission of the signals that are more sensitive to noise, since these pairs are better protected from interference sources that are external to the binder. The more robust signals may be transmitted over the twisted pairs, which are closer to the boundaries of the each binder.

Such a technique may be used to provide more isolation protection for transmission of the more sensitive signals over the more isolated pairs (usually the more centrally located pairs). The sensitivity of signals varying as a function of the SNR margin required for their operation. The higher the required SNR margin, the higher the sensitivity. For specific modem elements, the sensitivity may be different for the upstream and the downstream directions of the transmission.

In addition, such a technique may be used to provide more isolation for transmission of signals that have higher PSD radiation. This may provide for a higher channel capacity, thus causing more disturbances to the transmission environment. Such a technique is particularly relevant when asymmetrical xDSL technologies are used over the individual twisted pairs. One application of this principle utilizes the well known ADSL scheme such that the two opposite up-stream and down-stream directions are simultaneously communicating over different copper pairs.

Alternatively, the same technique may be used for transmission of ADSL signals directionally over the same copper pair utilizing the more isolated pairs in the binder and utilizing well known full duplex echo cancellation techniques.

The selection of pairs may be performed either through host control of the exchange switch or through manual wiring based on information presented to the end user by the HSAS user interface.

Second, a variable gain control scheme for each of the transmitted data streams over the different pairs in the binder which is based on the isolation measured between any particular pair and a pair located close to the binder boundaries. In operation of such a scheme, the more isolated the pair, the higher the power that may be transmitted without violating PSD regulations limiting the maximum power radiated from a binder. This scheme may significantly enhance the transmission performance over the twisted pairs. Optionally, this gain control scheme may be frequency selective, thus adapting the gain to the isolation associated with the pair at each specific frequency.

The construction of such a gain control as described hereinabove may comprise (1) a gain control directly applied to the xDSL modem elements and/or (2) gain controlled line amplifiers on each of the copper pairs.

The gain control may be applied directly to the xDSL modem elements as long as the modem elements have been adapted to support external gain control. It is noted that when xDSL elements based on well known DMT technology, different gain controls may be applied on each of the different tones, thus providing a frequency selective gain control apparatus.

Gain control line amplifiers may be used on each of the copper pairs in the transmit direction only. Such amplifiers may be implemented utilizing operational amplifiers with a digitally controlled switch for selection of different resistor values in the feedback loop of the amplifier, as is known in the electrical arts. The parameters of the gain control may be updated periodically, through the use of updated isolation parameters as obtained from measurements conducted by a test entity such as the test module 262 (FIG. 6).

In order to ensure that the total radiated power at the boundaries of the binder do not exceed the limits set by PSD regulations that most countries have, e.g., as formulated by the FCC in the United States and other PTTs around the world, the test module may be adapted to periodically perform measurements of the PSD on the twisted pairs residing close to the external boundaries of the binder, thus monitoring and providing feedback to the gain control process. Periodic tests may be performed via the switching element used for NEXT measurements. Such measurements can be implemented without degrading the performance of the channels as described hereinabove. Transmission of multiple high speed links over a separate binder within the same larger copper cable is possible when the spectral power emission is regulated within limits as promulgated by the FCC or PTT for each binder as described hereinabove.

Line Isolation Measurement

Figure 9:
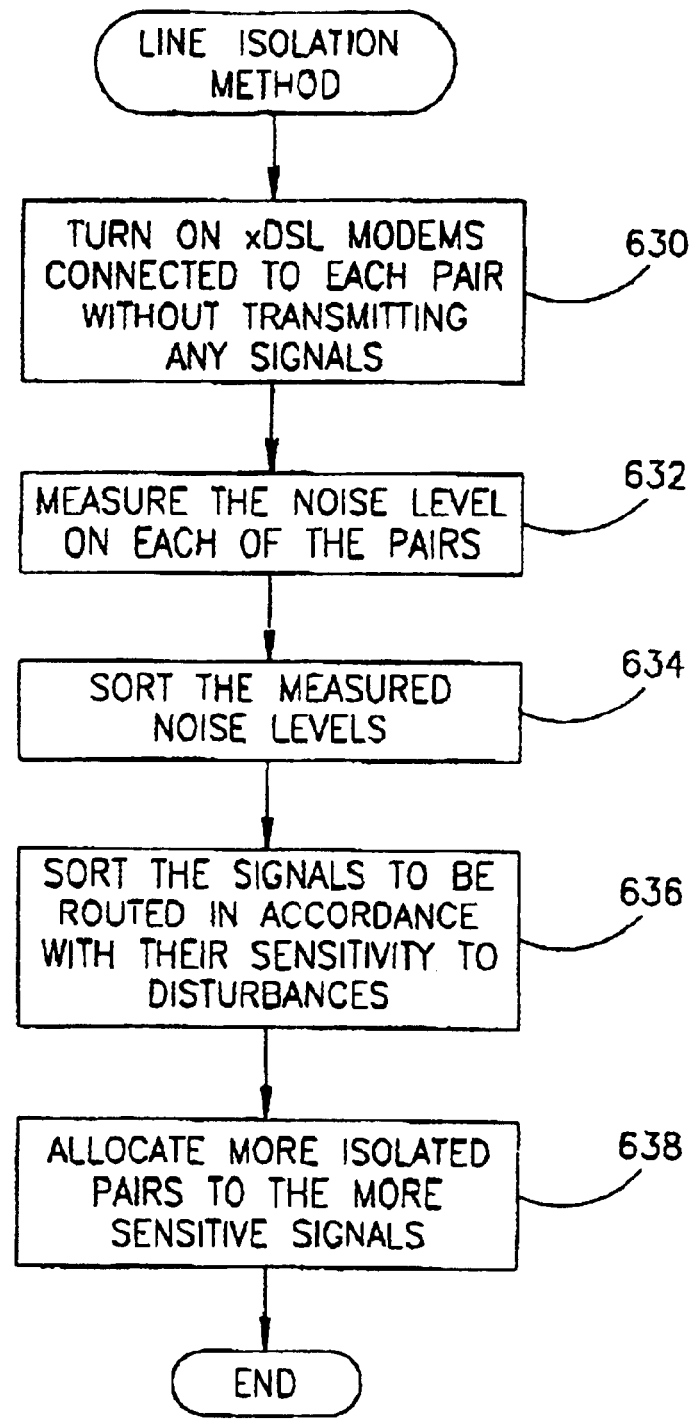
FIG. 9 is a flow diagram illustrating the line isolation measurement method of the present invention.

A flow diagram illustrating the line isolation measurement method is shown in FIG. 9. The line isolation method functions to locate and map the more isolated pairs in given binders that may be used for power control in an ingress and egress PSD control scheme. First, the xDSL modem elements connected to each of the twisted pairs are turned on without transmitting any signal onto the line (step 630). Then, the noise level at each of the pairs is measured utilizing either the internal SNR meters or received power meters built into most commercially available xDSL modem elements (step 632). Since the modem elements on either end of the line are not transmitting, the power measurements represent the disturbance power received on that particular line. Therefore, the measurements can be interpreted as a relative measure of the isolation of the line from external disturbers. A lower received power or SNR measurement indicates increased relative isolation.

The isolation measurements are then sorted in order of degree of isolation (step 634). In the case of SNR measurements, a low SNR indicates high isolation. The signals to be routed over lines are then sorted based on their sensitivity to disturbances (step 636). The two lists are then mapped together such that the more isolated lines are allocated to the more sensitive signals (step 638). Note that the allocation may be performed using the switch 206 (FIG. 5) located between the modem elements and the lines. Note also that this method is operative to map the isolation of a line regardless of its position within the binder or the position of the binder within the bundle.

An alternative method of identifying the more isolated pairs within a given binder (i.e., the more centrally located pairs) utilizing the crosstalk matrix described above will now be presented.

For each row 'i' of the crosstalk matrix, the normas of the elements are summed, excluding those located on the diagonal of the matrix. This summation $R_i$ can be interpreted as a measure of the overall crosstalk sum of all other pairs within the binder onto the line i. The $R_i$ values are then sorted based on their magnitude. The higher the value of $R_i$, the more centrally located the pair.

In addition, upon allocation of a plurality of pairs 140 (FIG. 3) to the high speed link, the following scheme can be used for placing the pairs into one or more groups, each group being part of a different binder. Note that in this case, the plurality of pairs are divided among the binders in an unknown manner.

Given a worst case isolation function H(f) (measured in dB) between two adjacent pairs in a binder, as well as a worst case isolation function $H_b$(f) between two pairs in different binders, as provided by the cable vendor, a tone signal s(f) (f being a relatively low frequency, e.g., 100 kHz) is transmitted on each of the pairs. On each of the other pairs a measurement of the received power at the same frequency is performed.

Note that the transmissions and measurements are to be performed utilizing the test module 210 (FIG. 5), 262 (FIG. 6). The power level of the transmitted signal s(f) (in dB) is the noise floor power level, i.e. N(f)+H(f)+$H_b$(f)−3 dB.

Signals above the noise floor level are received and measured only on pairs within the same binder of the transmitting pair. All the pairs having a direct or indirect transmit/receive relationship are identified as belonging to the same binder. For example, if a transmission on pair 1, is received on pairs 2 and 3 only, pairs 2 and 3 have a direct transmit/receive relationship to pair 1. If a transmission on pair 3 is received on pairs 1 and 4, pair 4 will be considered as having an indirect receive/transmit relationship to pair 1, and thus will be allocated to the same binder.

Further, after mapping of a plurality of pairs into different binders, any of the above described methods for mapping pairs within each binder for the purpose of power control and ingress and egress PSD control may be applied.

Optimal Allocation of Transmit Power

As described previously, it is a function of the transmitting unit to transmit a plurality of signals over the plurality of copper pairs that are routed within a binder or within multiple binders within a bundle. In order to comply with PSD regulations, the transmission power of those signals must comply with PSD masks specified by regulations. The purpose of the limitation as specified in the regulations is to avoid the damaging affect of non-controlled cross disturbance of various xDSL services that may be routed within a binder or across multiple binders within a bundle.

Therefore, in cases where a complete binder is allocated for the sole use of a HSAS system, it should be verified that the overall PSD at the external boundaries of the binder complies with those PSD mask regulations. Within the binder, the HSAS is operative to select the PSD of the various modem elements in such a way that the overall throughput is optimized while the overall PSD radiated from the binder towards copper pairs external to the binder complies with any applicable PSD mask regulations.

One method of implementing the above is to vary the transmission power of the modem elements that are using the internal pairs of the binder while continuously measuring the power on the lines that reside on the perimeter of the binder. This power measurement can be performed utilizing the internal received signal power meters or SNR meters built into the majority of commercially available modem elements that are connected to the pairs residing on the perimeter of the binder.

Alternatively, the line pairs can be connected to the test module 210 (FIG. 5) in order to measure their PSD. This connection is made using switch 206 (FIG. 5) located between the line pairs and the modem elements. For the purpose of measuring the PSD at various frequencies, the test module 210 may utilize various well known digital signal processing techniques such as those based on the Fourier transform.

The present invention provides a method of allocating transmit power which is implemented in conjunction with the NEXT cancellation algorithms described herein.

Optimal Allocation of Transmit Frequency Bandwidth

In addition to the above, each of the pair mapping methods described above can be used for allocation of transmit frequency bandwidth. Such allocations may be performed in a manner such that the more broadband transmissions are allocated to the more isolated pairs within a binder. The overall PSD radiated from the binder towards the copper pairs external to the binder needs to be maintained within the PSD mask regulations. Note that a combination of frequency and power allocation methods may be used together in the same HSAS.

Remote Power Feeding

With reference to FIG. 5, the HSAS adapted for TDM operation comprises a power unit 214 coupled to the plurality of modem units 204. The HSAS is operative to combine remote power feeding and data for transmission over the twisted pair channels 208. In this embodiment, relevant only to the TDM mode, DC voltage is applied over one or more twisted copper pairs. The pairs assigned for power transmission are fixed and typically do not change on a dynamic basis.

The DC output by the power unit 214 at the CO side is divided into a plurality of smaller DC current tributaries wherein each tributary is transported over one or more assigned pairs. Note that each polarity of the DC current is conducted via a separate copper pair. The DC current may be combined into the pair using any suitable technique such as multi-port line transformers, a technique known in the electrical arts.

At the remote node side, the plurality of DC currents are collected, combined together and then regulated and used as the power source for the remote node HSAS unit and optionally other devices in the node as well. In addition, a battery may be used which is adapted to be charged by the supplied current. The battery provides backup power in the event disruptions to the current supply occur or during brief periods of excess power consumption.

NEXT Cancellation

Figure 10:
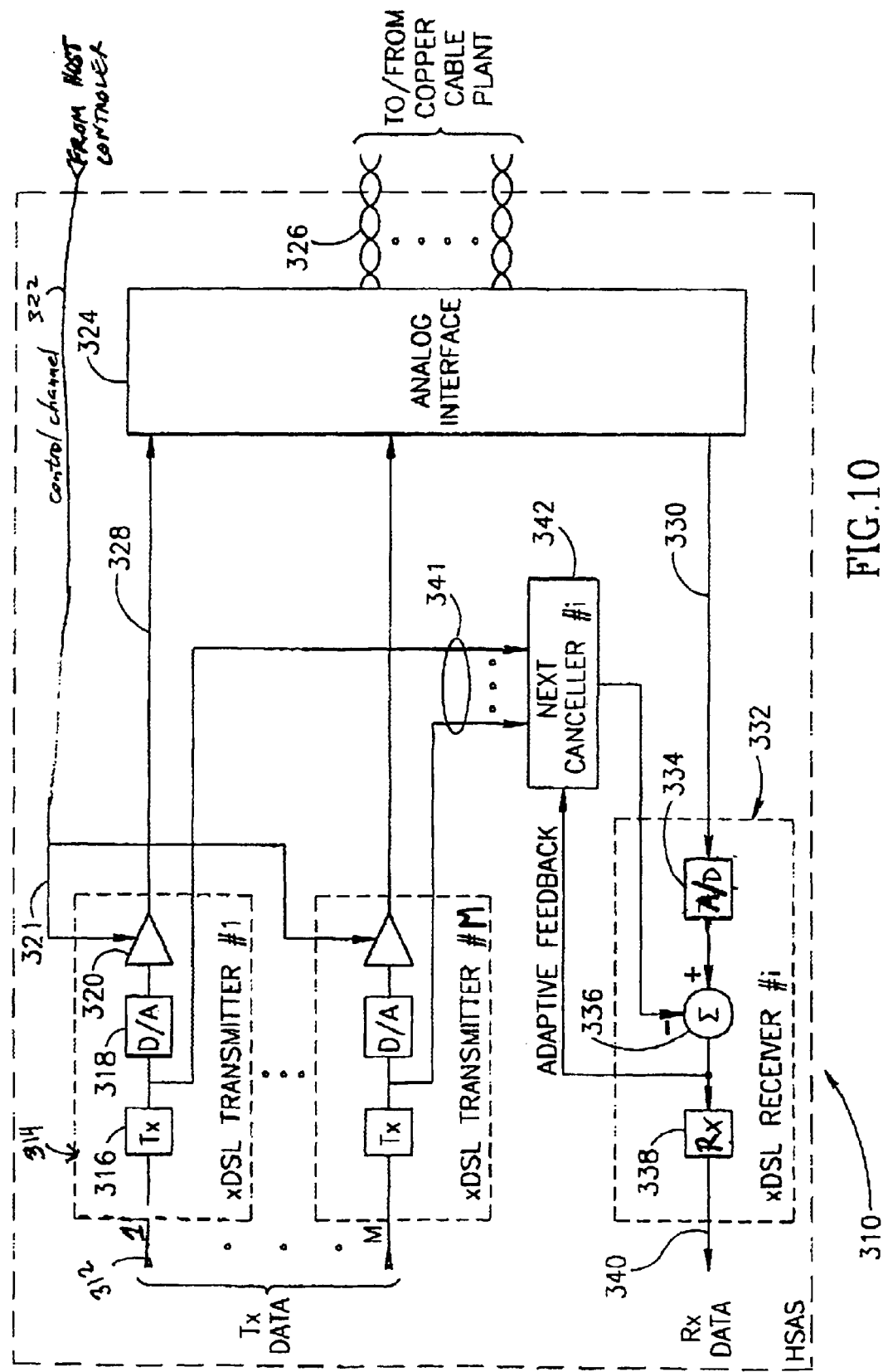
FIG. 10 is a block diagram illustrating the xDSL modem portion of the HSAS of the present invention in more detail with NEXT cancellation incorporated therein.

A block diagram illustrating the integral modem module portion of the HSAS of the present invention in more detail with NEXT cancellation incorporated therein is shown in FIG. 10. In this embodiment, the HSAS, generally referenced 310, comprises a plurality of xDSL transmitters 314, labeled xDSL transmitter #1 through xDSL transmitter #M, an $i^{th}$ xDSL receiving element #i 332, a control channel 322 from the host controller, $i^{th}$ NEXT cancellation unit #i 342 and analog interface circuitry 324. Note that the transmitter 314 and receiver 332 may be implemented separately or together in a single ASIC or IC depending on the actual xDSL technology implemented.

Each xDSL transmitter 314 is connected to a Tx data stream 312 and comprises a transmit portion 316, D/A converter 318 for conversion of the transmit symbols and a digitally controlled variable gain amplifier 320. The gain control signal 321 is generated by the host controller and received over the control channel 322.

The HSAS also comprises 'M' xDSL receiving elements 332 (only one of which is shown for clarity sake). Each receiving element 332 is adapted to receive the analog signal 330 from the analog interface 324 and to output a receive data stream 340. Each receiving element comprises an A/D converter 334 for converting the analog received signal into digital form, summer 336 and receiver portion 338.

The analog interface circuit 324 comprises analog components, such as hybrid circuits, line transformers, etc., which perform any or all of the following functions.

1. xDSL line termination and protection in accordance with recommendations of the specific vendor of the xDSL technology implemented.
2. Separation of transmit 328 and receive 330 signals when bidirectional xDSL technologies are used (e.g., HDSL) over twisted pairs 326, typically through the use of standard hybrid circuit elements.
3. Transmission of feed currents for the electrical components in the remote node. A feed current generated by the power unit 214 (FIG. 5) is divided into a plurality of tributary currents whereby each is transported to the remote node side over one or more copper pair. The analog interface may also comprise protection circuitry for each of the tributaries. The protection circuitry can protect against short circuits, leakage, over current, thermal shutdown, etc.

The NEXT cancellation unit #i 342 performs the NEXT cancellation function for the $i^{th}$ received signal. It is adapted to receive, via signal lines 341, all or part of the M transmitted signals $T_j(t)$ which are in digital form at a point before conversion to analog by A/D converters 320. Note that, depending on the copper plant in use, the complexity of the system may be reduced by avoiding processing of all of the signals. This is particularly useful when different portions of the pairs are routed via different binders that are nearly completely isolated for NEXT cancellation purposes.

The frequency domain implementation of the NEXT cancellation unit is adapted to receive the NEXT transmission functions $H_{ij}(f)$ (i.e., the crosstalk matrix) from the host controller. Alternatively, the time domain implementation of the NEXT cancellation receives the NEXT transmission function $H_{ij}(t)$ from the host controller. Alternatively, the NEXT cancellation unit receives the NEXT transmission function from adaptive filters, which are used in the implementation of the NEXT cancellation algorithm itself.

During an initial coarse adaptation phase, these filters are operative to adapt their transfer functions to match that of the various intra pair NEXT transfer functions using, for example, the LMS adaptation method. NEXT cancellation errors are used as feedback for the adaptation process. During a later fine adaptation phase, such as may be conducted during run time, the filters use NEXT cancellation errors feedback to achieve continuous fine adaptation and tracking of the NEXT transfer functions. The NEXT cancelers calculate the combined signal $\Sigma T_j(f) \cdot H_{ij}(f)$ in the frequency domain implementation or alternatively $\Sigma T_j(t)/ *H_{ij}(t)$ in the time domain implementation. Note that in the frequency domain implementation, the signals $T_j(t)$ must first be transformed to the frequency domain using well known Fourier techniques (e.g., FFT).

The combined signal is then subtracted from the received signal via summer 336. Note the NEXT cancellation may be performed in either the time or frequency domain. When performed in the frequency domain, the NEXT estimation signal is transformed back to the time domain using well known Fourier techniques (e.g., IFFT) prior to the subtractive addition operation.

The NEXT cancelled signal output of the summer 336 is then fed to the Rx portion of the modem element 338 and as an adaptation feedback signal to the NEXT canceler 342. This feedback is used for the adaptation of the NEXT canceler. Note that when adaptive FIR filters are used in performing the cancellation, the well known LMS algorithm may be used for the adaptation.

In the case where DMT xDSL modem technology is used, the NEXT cancellation process may be performed separately for each of the different tones (or carriers) whereby the subtraction is performed using the frequency domain representations of the transmitted and received signals.

A NEXT cancellation unit 342 is required for each of the receivers 332 and can be implemented using any suitable means such as digital signal processing techniques that are well known in the electrical arts. The summer 336 may be implemented in a similar manner or via modification to the xDSL components. Note that the transmitters, receivers, NEXT cancellation units and summers may be implemented together on one or more monolithic ICs.

Note also that in the embodiment of the HSAS intended for FDM operation as shown in FIG. 6, the analog interface does not need any line termination and power feeding circuitry since these functions are provided by the switch 246, splitter 248 and power switch 256.

Figure 11:
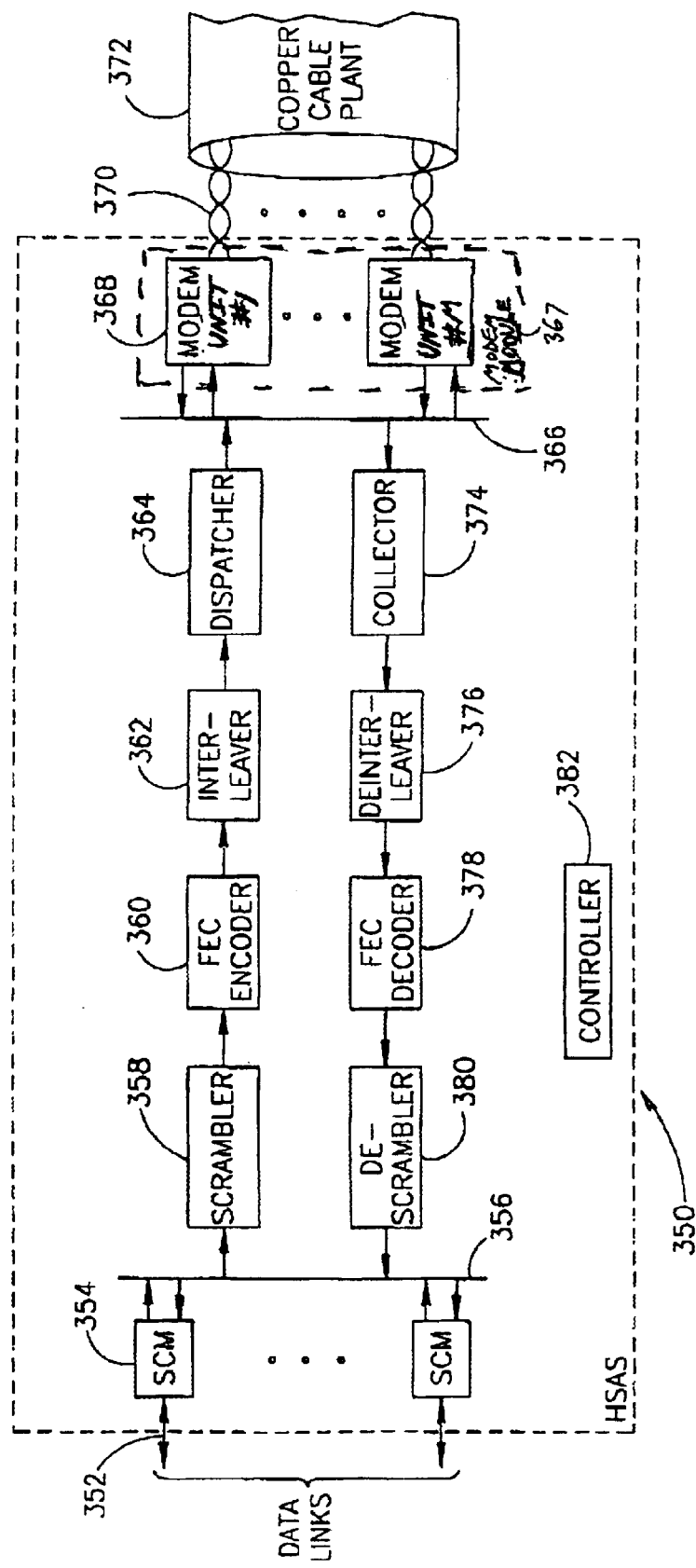
FIG. 11 is a block diagram illustrating an alternative embodiment of the HSAS constructed in accordance with the present invention.

A block diagram illustrating an alternative embodiment of the HSAS constructed in accordance with the present invention is shown in FIG. 11. In this embodiment, the HSAS, generally referenced 350, comprises a plurality of SCMs 354, a data scrambler 358, FEC encoder 360, interleaver 362, dispatcher 364, an integral modem module 367 comprising a plurality of modem elements 368, labeled modem unit #1 through #M and optional crosstalk cancellation means as described hereinabove, collector 374, de-interleaver 376, FEC decoder 378, de-scrambler 380 and host controller 382.

The HSAS utilizes the copper twisted pair wires to deliver a high bandwidth channel from end to end. The number of twisted pairs required depends on numerous factors such as the type of modem elements used, length of the cable, desired BER, desired bit rate, etc. For illustration purposes, a table is presented listing the number of pairs required as a function of cable distance and bit rate.

TABLE 1

Number of Pairs Required

| Bit Rate (Mbps) | Distance (kilofeet) | | | | | | | | | | |
|---|---|---|---|---|---|---|---|---|---|---|---|
| | 6 | 8 | 10 | 12 | 14 | 15 | 16 | 17 | 18 | 19 | 20 | 21 |
| 15 | | | 11 | 17 | 24 | 28 | 31 | 39 | 43 | 49 | 57 | 64 |
| 20 | | 9 | 14 | 21 | 29 | 37 | 42 | 52 | 57 | 65 | | |
| 25 | 8 | 11 | 18 | 24 | 37 | 46 | 52 | 65 | 72 | | | |
| 30 | 9 | 13 | 19 | 29 | 44 | 56 | 63 | | | | | |
| 35 | 11 | 15 | 23 | 34 | 51 | 65 | | | | | | |
| 40 | 12 | 16 | 24 | 38 | 59 | | | | | | | |
| 45 | 14 | 18 | 27 | 43 | 66 | | | | | | | |

The numbers of pairs listed in Table 1 above were calculated assuming the use of HDSL2 modem elements, without NEXT cancellation and with a maximum BER of $10^{-10}$.

In operation, the HSAS functions as the interface between the SCMs and the copper plant. The high data rate bit streams from the input data links are received by the SCMs 354 and forwarded to the scrambler 358 via bus 356 and subsequently to FEC encoder 360 and interleaver 362. The SCMs are adapted to aggregate one or more high speed input data links into a single high speed data stream. The resulting data stream is then distributed or dispatched among the plurality of modem units via bus 366. Each modem then transmits its data onto one of the twisted pairs 370 of the copper cable plant 372.

The SCM functions as the line interface means that is adapted to convert the input data stream, e.g., T1, E1, T3, E3, OC-3, etc. into a universal format that is placed onto the bus 356 for subsequent processing. In the transmit direction, the scrambler receives the data over the bus and randomizes the data before error correction is applied. In the receive direction, the descrambler 380 receives data that has already been error decoded and descrambles it to generate the original data transmitted from the other side. The scrambling/de-scrambling process comprises any standard technique such as those based on a linear feedback shift register with a suitable generator, e.g., $1+x^5+x^{23}$ or $1+x^{18}+x^{23}$.

The data is then FEC encoded by encoder 360 that functions to add error correction information to the bit stream. For example, well known Reed Solomon coding may be used. Note that commercial coding integrated circuits such as those manufactured by Advanced Hardware Architectures, Inc., Pullman, Wash., FPGA implementations, etc., may be used to implement the FEC encoder and decoder. The length of the FEC codeword generated may comprise any number of bytes from 3 to 255 while the number of corrected bytes may be any number, e.g., 8. In the receive direction, the de-interleaved data is processed by the FEC decoder 378 which functions to correct any error in the bit stream using the redundancy transmitted with the payload.

The interleaver 362 is adapted to overcome burst noise that is common to one or more lines. The time duration of the noise the interleaver is able to handle may vary from approximately 250 to 500 microseconds The interleaver is operative to divide the input bit stream into a plurality of small portions such that the FEC is still able to generate the correct data without one of the portions. The interleaver buffers the codewords input thereto so as to have sufficient data to divide. The divided data from different codewords is then forwarded to the twisted pair lines such that during any specific period of time, e.g., 500 microseconds, only a portion of the data from a codeword is transmitted on each of the twisted pair channels. This immunizes the system from burst noise common to all the lines that exceeds the specified time period,. e.g., 500 microseconds. The interleaver is adapted to have a variable depth that can be set by the host controller. Note that to minimize the delay, the HSAS of the present invention may operate without the interleaver.

The latency added to the transmission time varies by bit rate and the desired time duration to be protected against. For example, the latency for supporting 500 microseconds of noise correction range from approximately 11.8 to 12.4 milliseconds and between 5.5 and 6.2 milliseconds for supporting 250 microseconds of noise correction.

The dispatcher 364 receives the processed high speed bit stream and performs rate conversion and data dispatching (i.e., distributing) to the individual modem units 368. The dispatcher is adapted to divide the high speed data stream into a plurality of lower rate bit streams each suitable for transmission by one of the modem units. Thus, the function performed is analogous to inverse multiplexing of the high speed data stream over the lower capacity copper pairs. The dispatcher is responsible for dispatching the data symbols to the different modem elements such that only a portion of the data from a codeword is transmitted on each of the twisted pair channels. This protects the system against cut lines.

The modem elements function to receive the data from the dispatcher and convert the data to the line code in accordance with the particular xDSL technology implemented. Example xDSL technologies include ADSL, HDSL, HDSL2, SDSL and VDSL. Each modem unit comprises circuitry adapted to (1) collect the data forwarded by the dispatcher, (2) synchronize both the transmission of data to the modem core and reception of data from the modem core, (3) modulate the data in accordance with the technology used, (4) output digital symbols to a D/A converter, and (5) place the symbols onto the copper twisted pair via an analog front end interface.

The host controller 382 functions to control the interfaces of the HSAS, between modules and between the HSAS and external links. It also is adapted to perform configuration, initialization, performance monitoring storage, maintenance and control of the components internal to the HSAS. The host controller is adapted to support synchronization to an external clock, generate a system clock and to transfer SCM clocking information to the remote side thus establishing master and slave sides.

Each HSAS is configured either as a master or slave in accordance with the parameters loaded into each system. A HSAS configured as a master is responsible for (1) determining the bit rates of each of the modem units, (2) starting the process of setting up the modem logical links with the salve side (i.e., determining the mapping between physical and logical modem elements/lines), (3) establishing the service channel, (4) determining the configuration of the scrambler/de-scrambler, FEC encoder/decoder, interleaver/de-interleaver, dispatcher and collector for both sides, (5) supplying the system clock that the slave side synchronizes (e.g., using the clock recovered by the modem).

Bus 356 functions to couple traffic between the SCMs and the data processing elements (i.e., scrambler 358/de-scrambler 380). The bus is adapted to carry the full bandwidth of the high speed input data links. Preferably the bus comprises a packet (i.e., block or cell) type of bus so as to (1) enable rate conversion of the various clocks on the SCMs interfaces to the system clock of the HSAS, and to (2) provide a mechanism of marking the particular source of the input data (e.g., SCM interface number).

The packets (or cells) are adapted in length to support interfaces having differing clock speeds. The packet header comprises information regarding the length of the data for each transmission. The bus is also adapted to support rate adaptation between the SCMs and the HSAS system clock, mark the information input from the SCM, quickly resynchronize on the data frame, support SCM switching so as to enable port switching for redundancy purposes.

Bus 366 functions to carry the traffic between the dispatcher/collector and the modem units. The information output by the dispatcher is divided among the plurality of modem units. In order to recover the data on the receive side, a spatial frame (as described hereinafter), is added to each modem line, enabling the receiver to collect the data from the modem units and assemble it in the same order it was transmitted. In addition, this spatial frame enables the system to support modem elements having variable delays.

The bus 366 is bidirectional allowing traffic in both directions. In the transmit direction, information such as (1) the spatial frame and CRC information, (2) error correction information, (3) clock synchronization data and (4) multiple rate framing information to permit synchronizing the modem units once per frame, is placed on the bus by the dispatcher.

Each modem unit is adapted to support varying data rates, e.g., a data rate of n*64 kbps where 'n' ranges from, for example, 1 through 36 for a minimum rate of 64 kbps and a maximum rate of 36*64=2.304 Mbps which is the maximum for HDSL2. The maximum data rate is determined by, among other things, the modem technology implemented.

Figure 12:
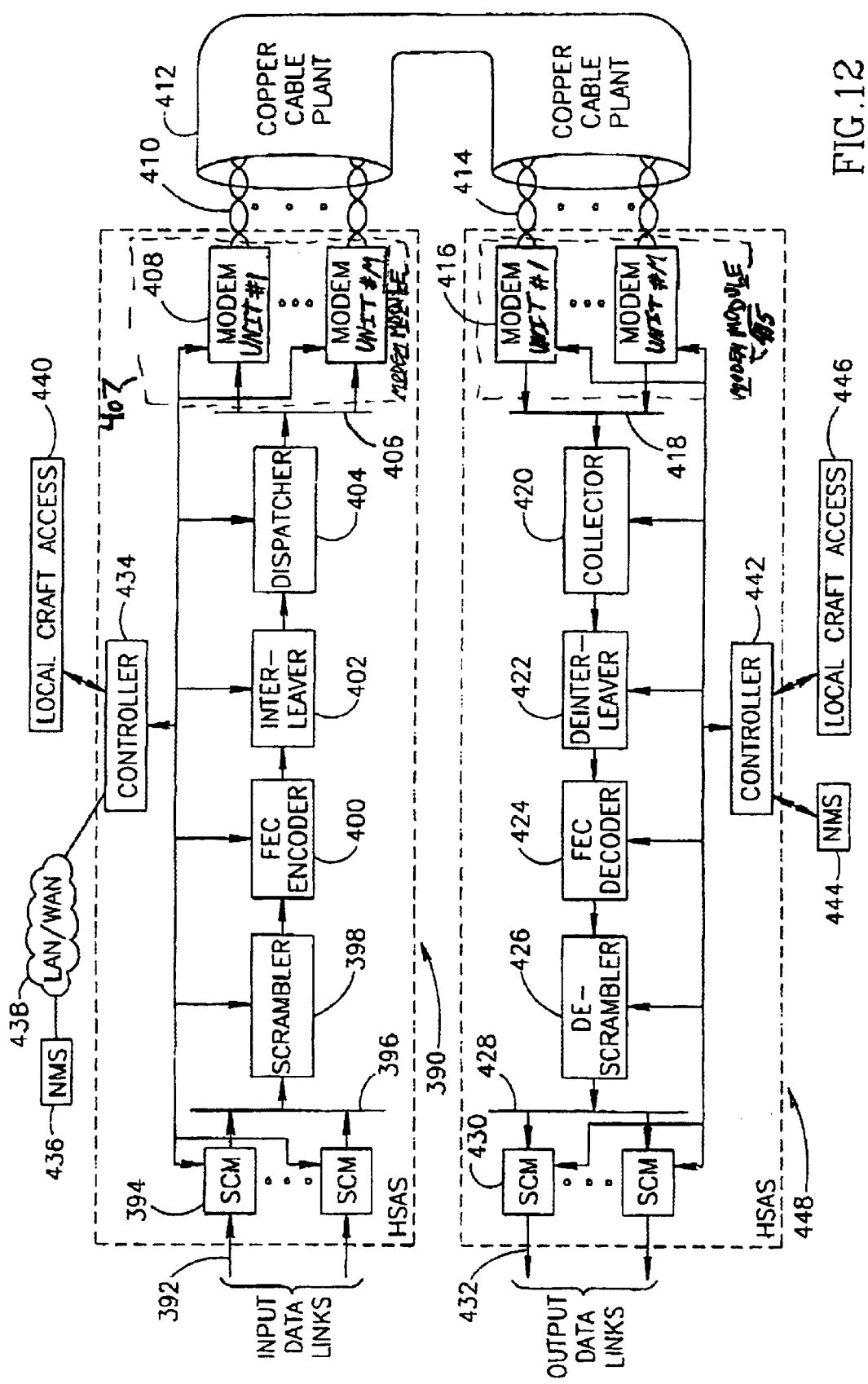
FIG. 12 is a block diagram illustrating an egress and ingress HSAS constructed in accordance with the present invention and located on either end of the copper cable plant.

A block diagram illustrating an egress and ingress HSAS constructed in accordance with the present invention and located on either end of the copper cable plant is shown in FIG. 12. The relevant portions of the egress HSAS, generally referenced 390, are shown as well as the relevant portions of the ingress HSAS, generally referenced 390. The egress HSAS 390 comprises a plurality of SCMs 394 coupled to one or more input data links 392, a data scrambler 398 coupled adapted to receive data from the SCMs via bus 396, FEC encoder 400, interleaver 402, dispatcher 404, an integral modem module 407 containing a plurality of modem units 408, labeled modem unit #1 through #M and optional crosstalk cancellation means as described hereinabove coupled to the dispatcher via bus 406 and host controller 434.

In accordance with the invention, the system may be constructed to be asymmetrical in rates meaning the data rates of the modem elements on both sides of the line are not necessarily the same. Since the modulation schemes and the rates used by the modem elements in each direction may vary the HSAS supports the configuration wherein the number of transmitters and receivers on each side is different. In any event, however, the number of transmitters at one side must be equal the number of receivers at the other side and vise versa.

The host controller 434 comprises one or more interfaces to various external devices. Illustrated is a connection from the host controller 434 to a Network Management System (NMS) 436 via a LAN/WAN 438 and a connection to a local craft access 440 device. In addition, the host controller may comprise (1) standard SNMP agent functionality with MIB-II support for interfacing with an external SNMP based NMS, (2) world wide web (WWW) interface for interfacing with a NOC technician or local craft for provisioning, maintenance or other purposes, a TL-1 interface for access by a local craft via RS-232, NOC technician or others. The modem units 408 transmit to their respective twisted pairs 410 over the copper cable plant 412.

The ingress HSAS 448 comprises a modem module 415 comprising a plurality of modem units 416 coupled to a collector 420 via bus 418, de-interleaver 422, FEC decoder 424, de-scrambler 426, one or more SCMs 430 coupled via bus 428 to de-scrambler 426, one or more output data links 432 and host controller 442. The host controller comprises one or more interfaces for communicating to external devices such as NMS 444, local craft 446 or any other device for management, provisioning, maintenance or monitoring purposes.

System Wake Up Process

Figure 13:
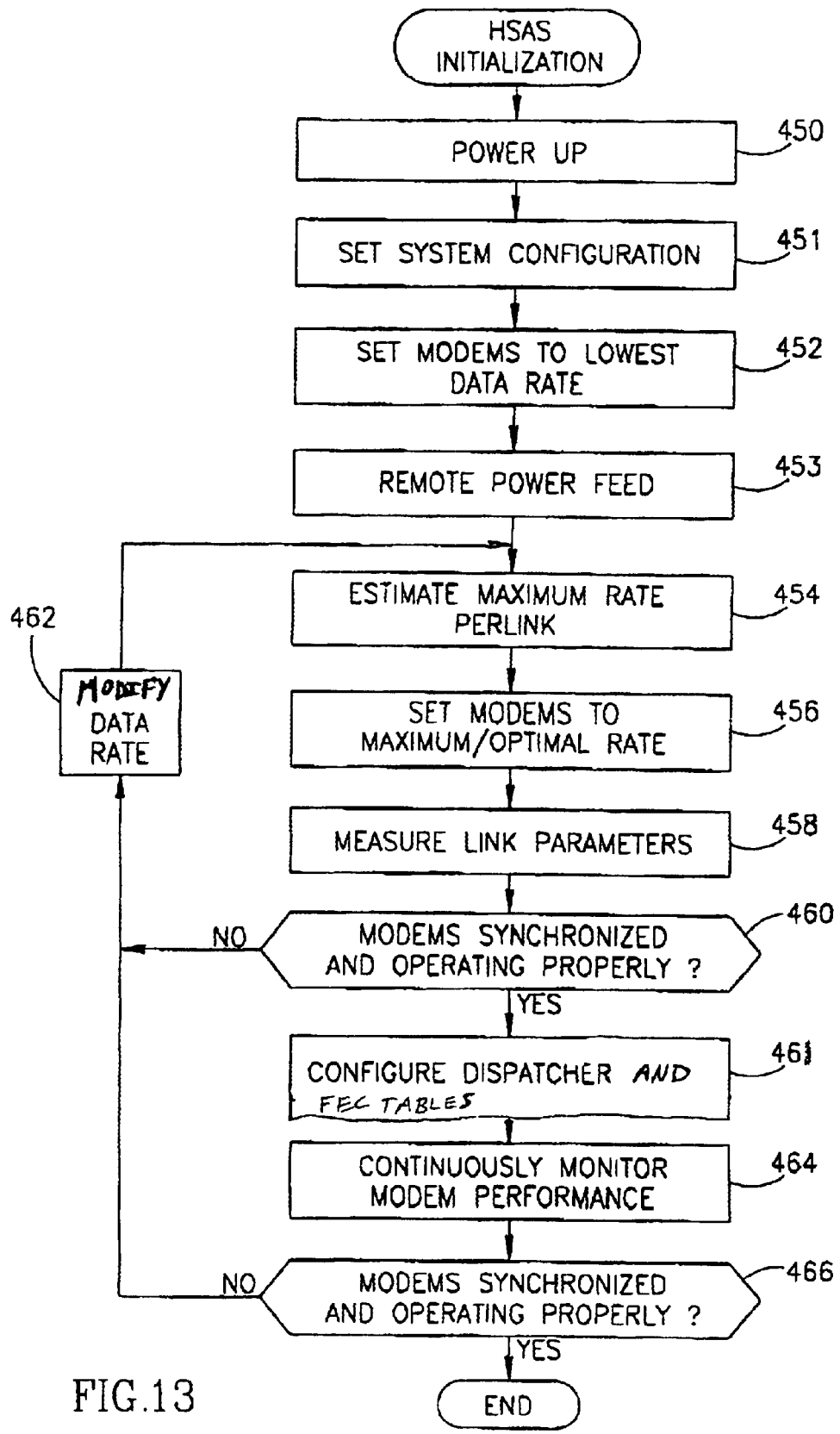
FIG. 13 is a flow diagram illustrating the initialization method portion of the HSAS of the present invention.

The initialization or wake up of the HSAS will now be described in more detail. A flow diagram illustrating the initialization method portion of the HSAS of the present invention is shown in FIG. 13. The first stage is the power up stage (step 450). In this stage the HSAS located on the CO side powers up assuming it is connected to a direct power supply in the CO. The remote node, however, may not have a local power source available and therefore requires remote power feed from the HSAS on the CO side.

In the TDM embodiment of the HSAS (FIG. 5), the remote powering can be provided simultaneously with telephony services. Thus, the remote node can be provided with a power feed immediately.

In the FDM embodiment of the HSAS (FIG. 6), however, the remote powering cannot be provided simultaneously with telephony services. Thus, the power switch 256 is operative to configure all its switches to the power source setting. At the remote node, a battery is provided to ensure reliable initialization of the HSAS.

The system is then configured (step 451). In this stage, the host controller in the HSAS on both CO and remote node sides, (1) initialize all components that require one or more parameters to be initialized, (2) identify the installed modules and their respective capabilities and configurations (particularly those of the xDSL modem units), (3) perform self tests of hardware and software systems and (5) establish connections with one or more user interfaces.

All modem elements are then set to their lowest data rate (step 452). In this stage, the modem elements are configured to transmit data at their lowest data rates in order to establish a low rate communication channel between the CO and remote node sides. Once the channel is established, relevant information is exchanged between the two sides.

Next, in the event the optional FDM embodiment of the HSAS is implemented, switched power feeding from the HSAS in the CO to the remote node may begin (step 453). This permits the transport of telephony services to the remote node. The maximum rate of each modem per link is then estimated (step 454). The characteristics of the cable are measured using one or more of the following: test modules, switching modules, internal measurement mechanisms within the modem elements themselves, internal measurement mechanisms within the NEXT cancellation units themselves (e.g., NEXT cancellation error) and the coordination of the host controllers of both the CO and remote node. The internal measurement mechanisms within the modem elements themselves may include BER meters, SNR meters, line attenuation meters and/or noise margin meters. The measurements taken include attenuation of each pair and crosstalk transmission function (isolation) between pairs all of which may be frequency dependent. Note that the spatial allocation of pairs within binders may be derived from such measurements. The host controller then calculates an optimal constellation of transmission parameters based on these measurements together with the transmission characteristics of the xDSL modem elements and the required link performance.

The calculations performed by the host controller may include one or more of the following 1. Calculation of the NEXT transfer function matrix $H_{ij}(f)$ (frequency domain implementation) or $H_{ij}(t)$ (time domain implementation) for all or a portion of the twisted pairs.
2. Allocation of specific pairs that are located more centrally within the binder for the more sensitive transmission, while pairs located closer to the outer wall of the binder are allocated for less sensitive (e.g., downstream) transmission.
3. Determination of the permitted transmitted power and respective gain for each of the pairs. The gain may be frequency selective. Both the gain and permitted transmit power are determined in accordance with spatial position of each pair, thus maintaining the spectral power emission envelope from the binder within given boundaries as dictated by PSD regulations.
4. Determination of the optimal transmission rate for each direction of each twisted pair link. Note that these rates may vary between the different links and that it may vary between each direction of a specific link. The rates are calculated such that the overall throughput of the system is optimized. This optimization is preferable since modem elements may have mutual degradation effects that vary with their rates (e.g., the PSD of the modem transmission varies with the data rate). Therefore, in some cases, especially in those where NEXT cancellation is not applied or is applied on a fraction of the number of the pairs in use, optimizing the overall throughput of the system requires more than maximizing the throughput of each of the modem elements as explained hereinbelow.
5. Determination of the maximum effective data payload rate for each stream (i.e., link) in each direction.
6. Selection of the error correcting coding schemes to be used in the transmit and receive data processor These schemes may vary between the two sides. This is done based on one or more system requirements, such as system BER, resiliency to cut lines, delay, impulse noise resiliency, bit rate, range, etc.

Once the calculations are complete and the maximum transmission rates per link (for both directions of the link) are determined, the modem elements are set to an optimal rate which may or may not be the maximum calculated previously (step 456). The parameters determined are forwarded to the transmit data processor, receive data processor, modem units and switch on both the CO and remote node sides. Link transmission is initiated and high speed link data communications is started.

After the modem elements are configured with optimal data rates and the data links are established, the link parameters are then measured (step 458). Measurements are taken after the high speed data link begins operation by (1) test modules, (2) internal measurement mechanisms within the modem elements themselves or (3) internal measurement mechanisms within the NEXT cancellation units themselves (e.g., NEXT cancellation LMS filters). The internal measurement mechanisms within the modem elements themselves may include BER meters, SNR meters, line attenuation meters and/or noise margin meters. It is then checked if any of the modem elements have lost synchronization and/or are not operating properly (step 460).

If any of the modem elements have lost synchronization or are not operating properly, the data rate of the modem may be changed (step 460) and the process repeats starting with step 454. Note that the rate may be increased or decreased since the PSD of a modem may vary with its rate. Note that increasing or decreasing a modem's rate changes the spectral region in which its transmitted energy is located and hence changes its disturbance to its neighbors and its sensitivity to disturbing radiation (i.e., crosstalk) from its neighbors. Once the modem elements are synchronized and operating properly, the tables in the dispatcher and collector and the FEC parameters are configured in accordance with the rates of each modem (step 462). Note that different FEC and dispatching configurations may be applied within the two HSAS units located on either side of the link.

One possible way for choosing the optimal rates for the modem elements would be to adjust their rates such that there is an adequate margin between their actual SNR (measured using their internal SNR meters) and the SNR, which is required for maintaining their required BER level. The HSAS performs an iterative process of rate adjustments that starts with a fixed rate for all of the modem elements. Subsequently, the rates of the modem elements either increase or decrease such that the rates of modems having a margin higher than required are increased. Similarly, the rates of the modem elements with margin lower than required are decreased. This iterative process continues until the margins are within a predetermined vicinity of the required margin.

Alternatively, all possible combinations of rates in steps of 64 kbps for each of the modems are tried. Those combination of rates are chosen which provides the maximal overall high-speed link bit rate.

Periodically, the link transmission parameters (e.g., the SNR and BER of each of the links, the amount of CRC errors associated with each of the links, etc.) are monitored and measured in order to adapt the HSAS to (1) changes in external operating conditions or to (2) internal system faults (e.g., modem element faults, bus faults, etc.) (step 464). In response to the link measurements, the HSAS may modify one or more of the transmission parameters. The HSAS is adapted to maintain the transmission process in as best an optimal state as possible. In particular, the measurement results are used by the host controller to update the optimal channel calculations and to modify the appropriate components in response thereto.

If a modem loses synchronization or is found to not be operating properly (i.e., one or more performance thresholds are exceeded such as BER, SNR, CRC errors, etc.) (step 466), its data rate is changed and the process repeats from step 454.

Note that alternatively, the initialization process may comprise an iterative process whereby the modem elements are configured for lower link performance in terms of data rate, range, and reliability. In accordance with the channel conditions, the link performance is gradually improved in steps over time.

Forward Error Correction

The FEC encoding and decoding portions of the HSAS will now be described in more detail. To aid in improving the performance of the high speed data link, the HSAS is adapted to handle failed lines. A failed line is a line (1) that has been physically severed or cut, (2) whose impedance has increased sufficiently to impede transmission, (3) whose noise levels have increased to an extent that transmission is severely impaired or not possible or (4) whose modem element has failed or whose performance has degraded beyond a particular predefined threshold.

The HSAS incorporates error correction coding schemes to handle failed lines so that data transmission is not impaired. To provide a margin of safety, the HSAS can optionally be configured to operate at a BER higher than required e.g., to work at $10^{-15}$ when required to work at $10^{-10}$. Thus, in the event of a failed line, the BER increases to a point that is still below the desired BER. It is preferable, however, that the HSAS be configured to maintain a steady BER close to but better than the threshold set by the user. Such a FEC coding scheme provides immunity to background noise, impulsive noise and external interferers.

Figure 14:
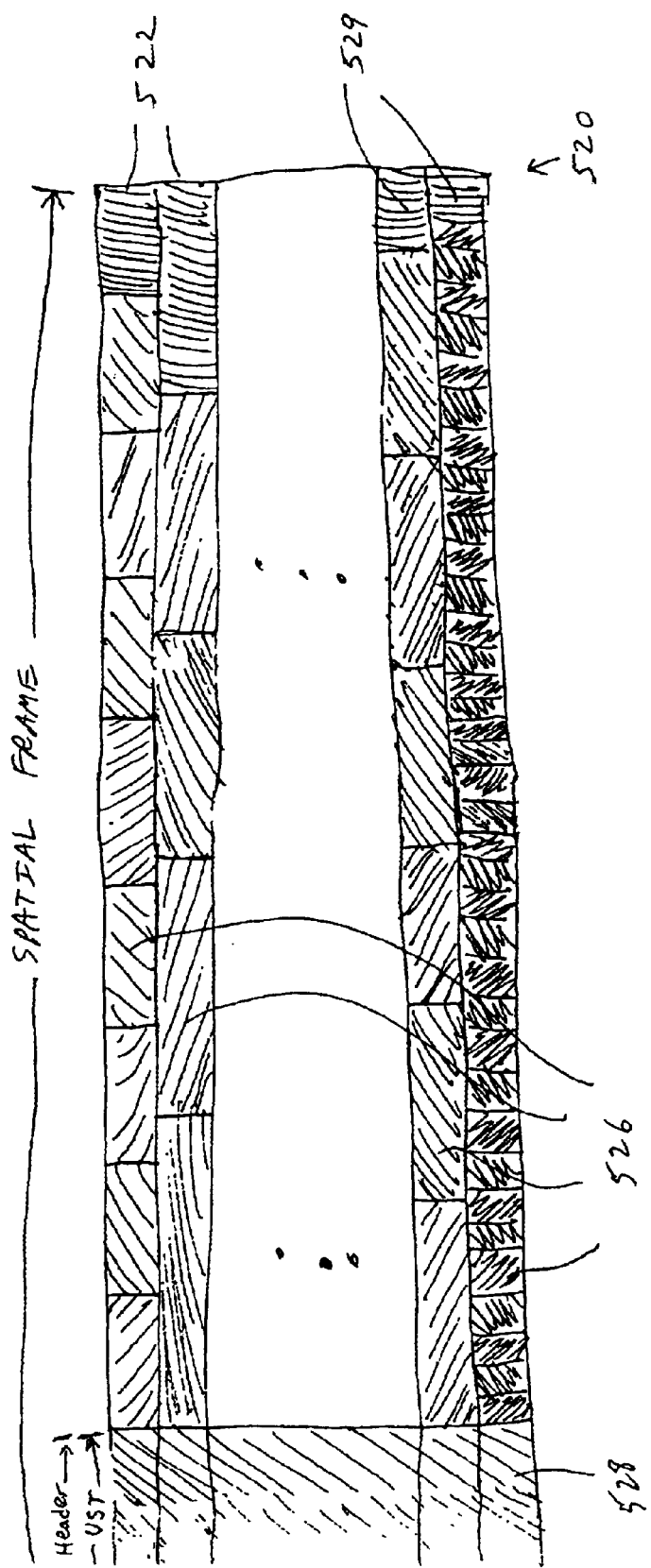
FIG. 14 is a diagram illustrating the structure of a spatial frame and associated Unit Symbol Time (UST)

A diagram illustrating the structure of a spatial frame and associated Unit Symbol Time (UST) is shown in FIG. 14. The UST shall be defined as the duration of a symbol that is transmitted by the modem with minimal rate. For example, a UST shall be 125 microseconds for a modem having a rate of 64 kbps. The spatial frame 520 is comprised of a plurality of codewords 526. Each codeword comprises a plurality of symbols, wherein each symbol represents a byte and has a duration that varies with the rate of the modem element that transmits it. The spatial frame, generated by the dispatcher, comprises codewords for all modem units. Each row 522 of the spatial frame is associated with one of M modem units. Header information 528 including a synchronization symbol or symbols having a duration of UST is added to the beginning of each spatial frame. Note that the length of the header is no shorter than the UST transmitted by the slowest modem, e.g., 125 microseconds.

A function of the spatial frame is to encapsulate a plurality of codewords and to compensate for variations in modem rate regardless of the rate of the individual modem elements the codewords are transmitted through. The spatial frame enables all the modem elements to synchronize to a frame fixed in time regardless of a modem's rate. The period of a spatial frame may range, for example, from 4 to 12 milliseconds.

The symbol duration as it is transmitted on the twisted pair line varies in accordance with the data rate of the particular modem. The duration is shorter for a symbol transmitted by a modem set to a higher rate. Thus, modem elements set to higher rate are able to transmit more codewords within a given time than modem elements configured to lower rates.

Thus, the codewords are represented by their duration in time taking into account the speed of the modem. Thus, for example, the duration of a codeword for modem #2 is more than twice as long as that for modem #1. This is because modem #1 is set to a rate more than twice as fast as the rate modem #2 is set to. Modem M is set to an even higher rate, hence the large number of codewords it is able to transmit in during the spatial frame. When the modem elements in use are of the HDSL2 technology, the shortest duration codeword corresponds to a bit rate of 36*64 kbps=2.304 Mbps.

The vertical hatching portions 529 at the end of each row 522 represents zero padding that is added to the end of each spatial frame for each modem line. Preferably, the codewords inserted into a spatial frame do not cross frame borders. Hence, any gaps must be padded with zeros. Alternatively, the spatial frame can be divided into sub portions each having a duration of one UST. A whole number of codewords are placed within each sub portion and any extra space is padded with zero bytes so as to fill the gap between the last codeword and the UST boundary. This provides for easier hardware buffering schemes.

Note that other periods for the UST period may also be used and are considered to be within the scope of the invention. Preferably, the UST period is 125 microseconds, as this represents the least common denominator for all possible bit rates. In other words, after one UST, it is guaranteed that all modem elements would have transmitted at least one entire symbol.

The FEC and its related processes will now be described in more detail. The FEC encoding/decoding and dispatching/collection portions of the HSAS are adapted to (1) provide resiliency to line failures, without permanently degrading the performance of the system, to (2) improve the performance of the system over the performance achievable using conventional copper transmission methods and to (3) increase the system's immunity to noise (i.e., thermal noise, impulse noise, etc.) while operating. The resiliency is provided but for a limited number of failed lines, the number of which is specified by the user at startup.

Figure 15:
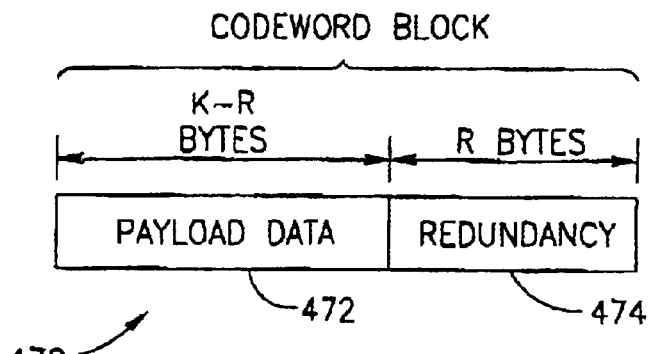
FIG. 15 is a diagram illustrating the K-byte codeword block used in the FEC portion of the HSAS.

A logical diagram illustrating the K-byte codeword block used in the FEC portion of the HSAS is shown in FIG. 15. The codeword block, generally referenced 470, comprises a payload portion 472 consisting of K–R bytes and a redundancy portion 474 consisting of R bytes. The value K represents the block length, i.e., the total number of bytes in the codeword, and R represents the number of redundant bytes included in the codeword. Note that the codeword of FIG. 15 represents a logical perspective of the codeword. In actual implementation, however, the payload bytes and the redundancy bytes may be arranged in a different order. For example, if the coding device is a commercially available device such as from Advanced Hardware Architectures, Inc., Pullman, Wash., the value of K may range from 3 to 255 bytes, while R may range from 1 to 20 bytes.

In one alternative embodiment, the FEC coder comprises a Reed Solomon block coder. The coder is capable of correcting R/2 symbol errors. For resiliency to a specified number of cut lines, K and R can be chosen such that no more than R/2 symbols are corrupted when the above-specified number of lines are cut. In the event more than R/2 symbols are corrupted, the Reed Solomon error correction no longer provides immunity to noise.

This can be overcome, however, by adding 'spare' bits (such as parity bits) to R or by detecting which line has failed and enabling the decoder to use what is known as 'erasure' information. Erasure can be used with the present invention in the event a line failure occurs, since line failures can be detected by the modem elements, by an error indication generated by the FEC decoder. For example, the modem elements can use their CRC mechanism, SNR meter or loss of signal indicator to detect errors. The FEC encoder functions to add the redundancy that is required to correct for errors caused by line failures and to improve the immunity to various types of noise. In one alternative embodiment, the encoder performs Reed Solomon block coding, a process well known in the coding arts. The parameters for the encoding are determined in accordance with the user's specifications related to number of failed lines to be handled, desired coding overhead, desired BER, etc., in addition to the modem transmission rates and BER values.

Note that in operation, the dispatcher requests data from the FEC encoder. Therefore, the rate of input to the encoder is the rate the dispatcher requests data. Since the input data stream may have a different rate than the dispatcher, the HSAS is operative to insert 'idle' blocks before the encoder when needed.

The dispatcher functions to distribute the encoded data, following interleaving, to the modem elements in as optimal way as possible. The dispatcher comprises a double buffered memory whereby during any point in time, data is written to one buffer while data is read from the other buffer to be forwarded to the modem elements. The FEC and the dispatcher operate synchronously with each other, i.e., the dispatcher requests data from the FEC and the FEC inputs an equivalent amount of data at its input. The parameters of the FEC and the dispatcher (i.e., the dispatching table) may be modified without affecting the transmission of the data stream.

The dispatcher is adapted to generate the spatial frame to which the FEC and dispatcher are synchronized The spatial frame also enables the receiving modem elements to compensate for the different delays generated due to the modem elements being configured to varying bit rates. As described previously, data to the modem elements is sent over a bus such as a synchronous bus. The data is sent and received in dedicated time slots. Each timeslot may transfer data at the maximum rate of each modem. Note that more than one modem may share a given time slot so long as the sum of the data rates does not exceed the maximum bit rate of all modem elements combined.

Figure 16:
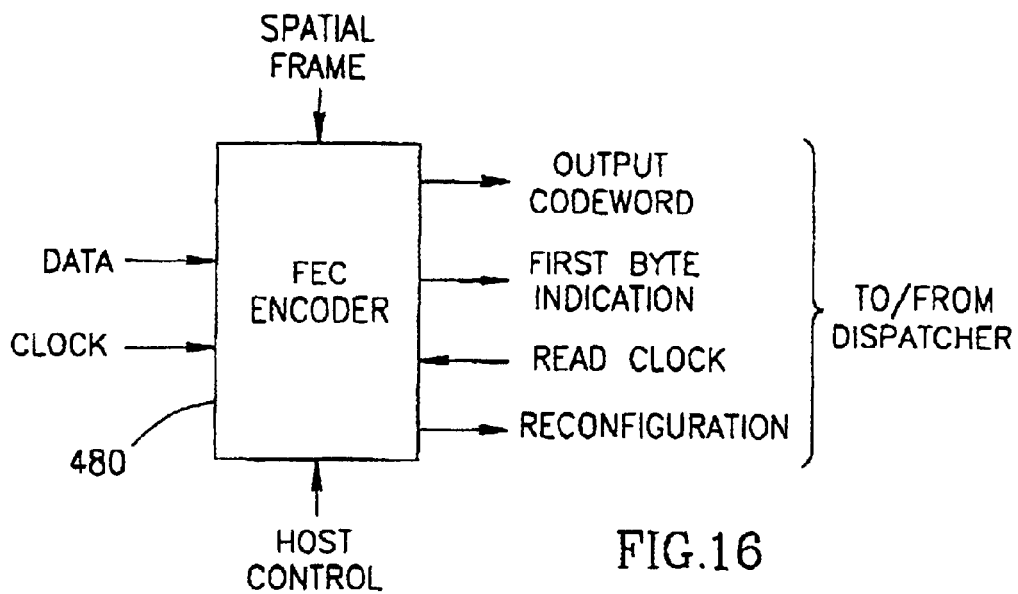
FIG. 16 is a block diagram illustrating the signals that interface with the FEC encoder portion of the HSAS.

A block diagram illustrating the signals that interface with the FEC encoder portion of the HSAS is shown in FIG. 16. The input data to the encoder, generally referenced 480, is sent from the scrambler or the SCMs in the event the scrambling function is disabled. The data is sent as a stream of bytes that is read asynchronously from the input. A clock is provided with the data. The host controller configures the encoder with codeword size K, codeword redundancy size R and a change request signal used to signal a change in parameters.

In accordance with the invention, more than one set of codeword parameters (K, R) may used within a spatial frame. The codeword parameters are switched cyclically to allow for an optimal combination of coding overhead vs. correction capabilities. For example, within a spatial frame duration, higher redundancy (or coding overhead) is preferably used until the state of the line is determined (cut line or operative line) and then, a lower redundancy (or coding overhead) may be used, since erasure indications can be used to enhance the correction capabilities of the FEC decoder, with lower coding overhead.

The encoder is adapted to output codewords of length K, with K–R bytes originating from the input data stream and R bytes added by the encoder. The bytes are pulled from the FEC encoder when requested by the subsequent stage, utilizing the read clock. The first byte indication provides the next stage with an indication of when the first byte of the codeword is being read. A reconfiguration signal is used by downstream connected stages to perform an encoding and dispatching parameter change. The encoder also receives a spatial frame boundary signal from the dispatcher to aid in synchronizing the data stream.

Figure 17:
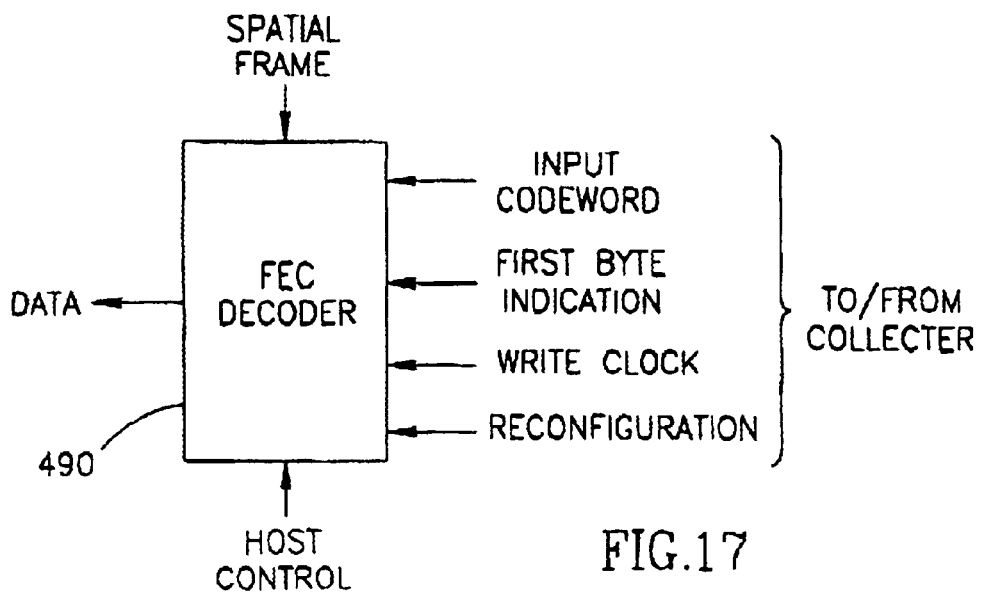
FIG. 17 is a block diagram illustrating the signals that interface with the FEC decoder portion of the HSAS.

A block diagram illustrating the signals that interface with the FEC decoder portion of the HSAS is shown in FIG. 17. The codeword having a length K is input to the decoder, generally referenced 490, from the output of the previous stage, typically the collector or the de-interleaver. The data is input as a stream of bytes that is written asynchronously to the decoder. A write clock is provided with the input codeword. The host controller configures the decoder with codeword size K, codeword redundancy size R and a change request signal used to signal a change in parameters. The decoder is adapted to output a data stream of bytes that are transferred asynchronously to the subsequent stage.

Figure 18:
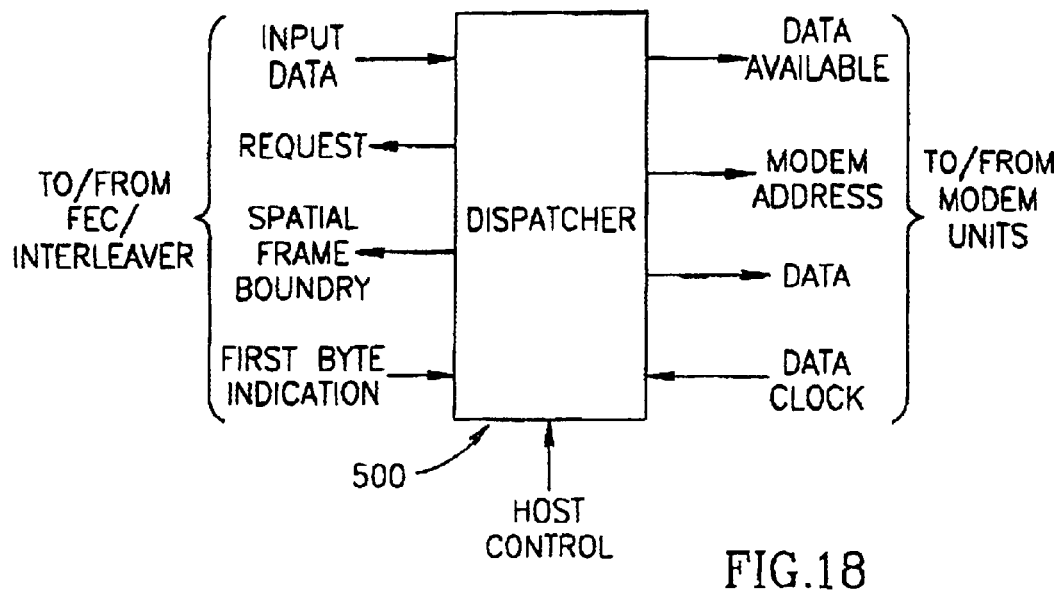
FIG. 18 is a block diagram illustrating the signals that interface with the dispatcher portion of the HSAS.

A block diagram illustrating the signals that interface with the dispatcher portion of the HSAS is shown in FIG. 18. The dispatcher, generally referenced 500, is adapted to read input data from the FEC (assuming the interleaver is incorporated into the dispatcher) using the request signal (i.e., read clock). The first byte indication from the FEC serves to indicate the byte being received is the first byte in a codeword. The spatial frame boundary is generated by the dispatcher and serves to indicate the location of the boundary of the spatial frame, which is used by the FEC encoder.

The dispatcher is adapted to output a stream of bytes to the plurality of modem elements. A data available signal indicates valid data is available. Data is transferred to the modem elements using the modem address lines, data lines and a data clock. The data is transferred during timeslots of fixed duration.

The host control comprises the dispatching sequence (used by the dispatcher to determine the distribution of bytes to modem elements), the spatial frame size and the sequence used to write data to the modem elements.

Figure 19:
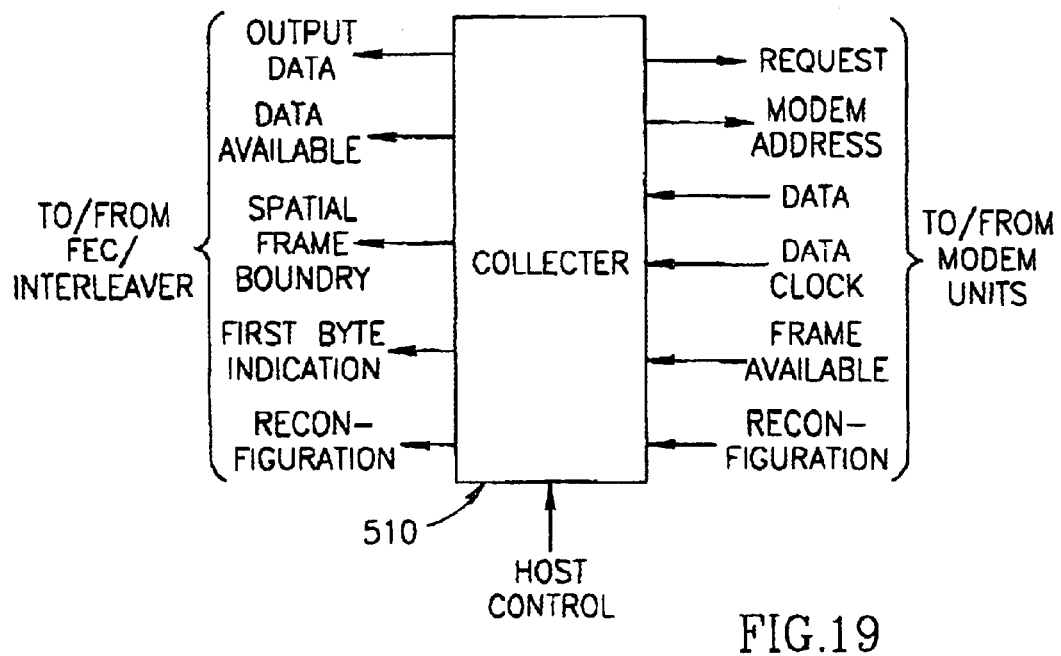
FIG. 19 is a block diagram illustrating the signals that interface with the collector portion of the HSAS.

A block diagram illustrating the signals that interface with the collector portion of the HSAS is shown in FIG. 19. The collector, generally referenced 510, is adapted to receive data from the plurality of modem elements. The data is transferred from the modem elements using the request line and modem address lines. The modem elements transfer the data over the data lines using a data clock supplied by the modem. A frame available signal from the modem indicates whether data is valid. The reconfiguration signal from the modem serves to indicate that a parameter change is to be performed.

The collector is adapted to output data to the FEC (assuming the de-interleaver is integral therewith) along with a data available signal to indicate valid data, a first byte indication and a spatial frame boundary indication.

The host control configures the collector with the collection sequence (used by the collector to determine the distribution of bytes from the modem elements), the sequence for reading from the modem elements and the size of the spatial frame.

Figure 20:
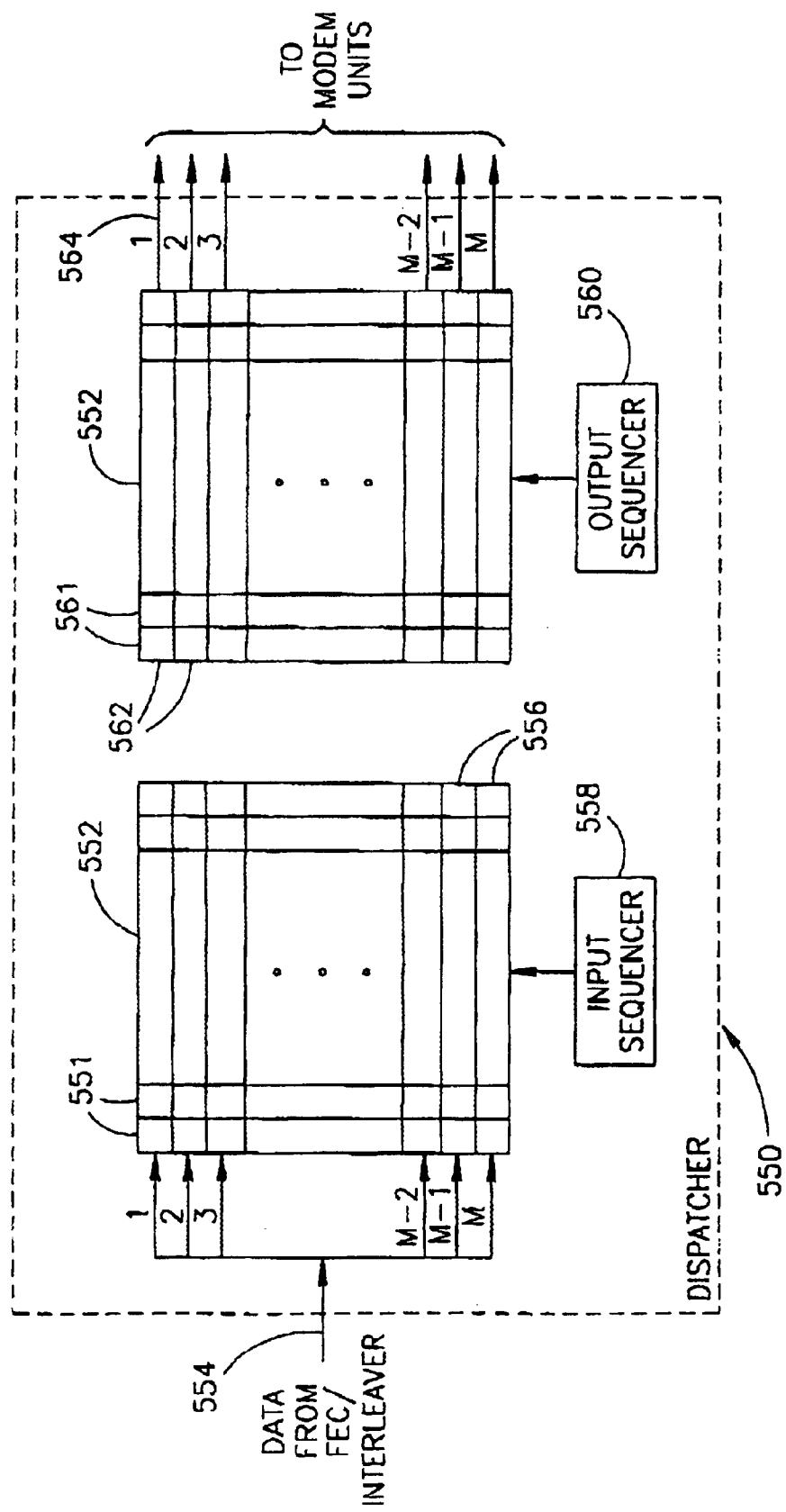
FIG. 20 is a block diagram illustrating the dispatcher portion of the HSAS in more detail.

A block diagram illustrating the dispatcher portion of the HSAS in more detail is shown in FIG. 20. The function of the dispatcher is to distribute data output by the FEC encoder (assuming de-interleaver is integral to the dispatcher) to the available modem elements. It is assumed that individual rates of the modem elements are already determined as described hereinabove. The rates are determined at startup and maybe modified in accordance with changes in the environment. The rate of each modem may vary between, for example, 64 kbps to 2.304 Mbps (i.e., 1*64 kbps to 36*64 kbps).

The method of dispatching and collecting the data will now be described in more detail using for illustrative purposes, a system in which the modem elements operate at rates that vary between 64 kbps to 2.304 Mbps (i.e., 1*64 kbps to 36*64 kbps), the UST period is chosen to be 125 microseconds, the codeword size 'K' varies between 3 to 255 symbols and the redundancy length 'R' varies between 1 to 20.

The dispatcher, generally referenced 550, preferably comprises a double buffer arrangement whereby the input buffer 552 receives data from the FEC via input line 554. The contents of the output buffer 552 is transferred to the available modem elements via lines 564. Each row 556, 562 represents one of M modem elements and each column 551, 561 represents one symbol, transmitted at the highest transmission rate. The size of each buffer is the number of modem elements M*36, which is the size required to support the case where all M modem elements transmit at the maximum rate. The actual number of symbols (i.e., bytes) written to each row depends on the actual bit rate for that particular modem. Note that larger size row buffers are needed to support modem elements having higher maximum transmission rates.

An input sequencer 558, preprogrammed or configured dynamically, determines the sequence of the distribution of incoming data output from the FEC. Similarly, an output sequencer 560, preprogrammed or configured dynamically, determines the sequence of the distribution of output data from the dispatcher to the modem elements. The input sequence is restarted after the input buffer has been filed several times.

Assuming the modem elements are assigned bit rates as multiples of 64 kbps, each column is adapted to represent the time to transmit one symbol (i.e., 8 bits) which is 8 bits/(64 kbps)=125 microseconds. A single cycle of the input sequencer comprises at a minimum the number of rows times the number of columns, i.e., M*36.

The number of FEC codewords in the input sequencer cycle is fixed but the size of the codeword is not fixed. The bytes that remain after the input buffer is filled with codewords, are padded with zeros or idle symbols. Alternatively, the spatial frame can be divided into sub portions each having a duration of one UST. A whole number of codewords are placed within each sub portion and any extra space is padded with zero bytes so as to fill the gap between the last codeword and the UST boundary. This provides for easier hardware buffering schemes.

The output from the output buffer is transferred to the modem elements using a sequencer that is preprogrammed or configured dynamically. The dispatcher is operative to send data to the modem bus 366 (FIG. 11) which comprises a plurality of time slots. Each time slot represents a data stream with a rate of 4.096 Mbps or any other suitable rate.

Figure 21:
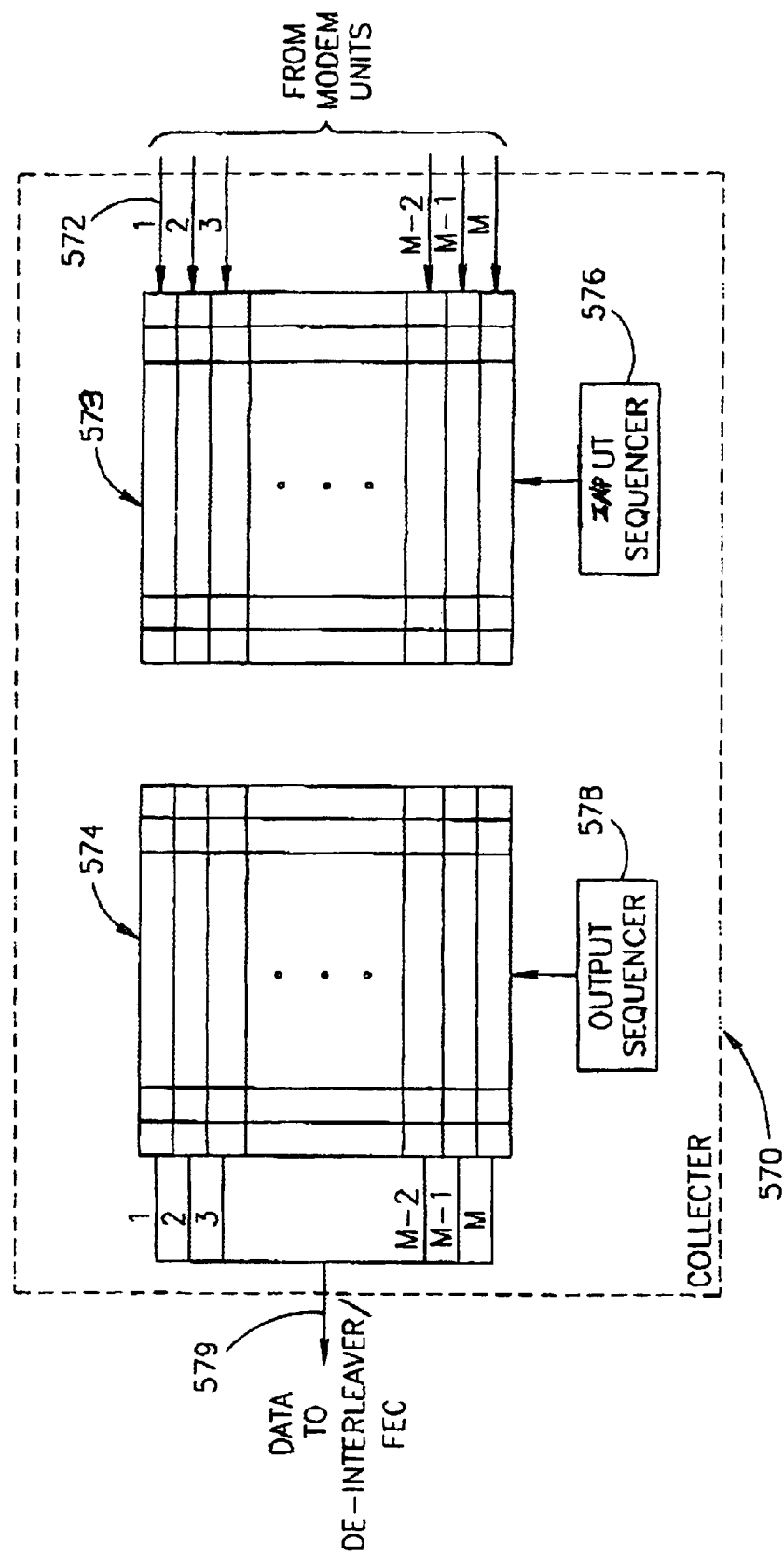
FIG. 21 is a block diagram illustrating the collector portion of the HSAS in more detail.

A block diagram illustrating the collector portion of the HSAS in more detail is shown in FIG. 21. The collector, generally referenced 570, comprises a double buffer arrangement whereby the input buffer 572 receives data from the modem elements via lines 572. The contents of the output buffer 574 is transferred to the FEC decoder via line 579. The structure of the input and output buffers 572, 574 is similar to that of the dispatcher 550 (FIG. 20). Each row represents one of M modem elements and each column represents one symbol, transmitted at the highest transmission rate. The size of each buffer is the number of modem elements M*36, which is the size required to support the case where all M modem elements transmit at the maximum rate. The actual number of symbols (i.e., bytes) written to each row depends on the actual bit rate for that particular modem. Note that larger size row buffers are needed to support modem elements having higher maximum transmission rates.

An input sequencer 576, preprogrammed or configured dynamically, determines the sequence of the distribution of incoming data output from the modem elements. Similarly, an output sequencer 578, preprogrammed or configured dynamically, determines the sequence of the distribution of output data from the collector to the FEC decoder.

Periodically, a spatial frame synchronization word is sent to all the modem elements for transmission over the channel. The transmitting and receiving modem elements utilize the spatial frame synchronization word to compensate for the variable delays in each of the lines. The collector is adapted to receive an indication of the beginning of the spatial frame from the modem elements and accordingly gather (i.e., collect) the data from the modem elements in accordance with the input sequencer 576. Note that only when a predetermined majority of the modem elements have their respective synchronization words aligned, is the spatial frame synchronization issued. Note also that the collecting of data from the modem bus is performed in similar fashion to the dispatching to the bus as described hereinabove.

As described previously, the interleaver may be implemented integral with the dispatcher. In either case, the interleaver receives codewords of (K, R) from the FEC encoder that are to be distributed to the modem elements by the dispatcher. Preferably, the codewords are distributed such that in the event of a line failure or impulse noise such as lightening, etc. no more than R/2 symbols are corrupted. To achieve this, the codewords are interleaved in time spatially across all the modem lines. The interleaving is performed such that for the duration of an impulse of certain length (e.g., 500 microseconds) no more than R/2 FEC redundancy symbols from each FEC codeword are on the modem lines at any one time. This is achieved by spreading the codewords over time and across the lines.

To overcome an impulse having a duration T, an interleaver is required having the following delay or latency:

$$\text{Delay} = T \cdot \max\left(\frac{2K}{R}\right) \quad (2)$$

where T is the duration of the impulse noise, K is the block code length and R is the number of redundant symbols.

For example, to overcome an impulse with duration T=500 microseconds, with a block code length K less than 255 and R greater than 2, the maximum delay, using Equation 3 above, is 85 milliseconds. To ensure a reasonable delay by the interleaver, R/K is preferably limited, e.g., no less than 10% or 20%. This limit should be taken into account in the selection of the FEC parameters. Note that the higher the ratio, the better the latency, but at the expense of increased overhead.

A possible method of selecting the FEC codeword parameters will be described in more detail. In accordance with the invention, a number of factors relating to the desired performance and operating points of the modem elements are taken into account in determining the FEC codeword parameters (i.e., K and R) and in determining the input sequencer tables in the dispatcher and collector.

In particular, the method preferably takes into account the following parameters: the number of modem elements, the bit rates of the modem elements, desired resiliency to line failures, desired system BER, the worst case modem BER and the limitation on the FEC overhead ratio. The method is operative to determine the length K of the FEC codeword, redundancy length R and the dispatch sequence tables.

The aim of the FEC parameter selection method is to search for a combination of FEC codeword size and FEC redundancy that provides the desired resiliency to line failures, overall BER and maximizes bandwidth. The method assumes that the number of modem lines, the bit rates associated with each line and the number of line failures to be protected against are all known. The following is a pseudo code listing for the method.

Listing 1: FEC Parameter Selection Method 1. repeat steps A and B for all valid combinations of codeword size K and redundancy length R whereby K varies from 3 to 255 and R varies from 1 to 20:
   A. compute the maximum number of bytes from a codeword that is to be sent over each line 'i', in accordance with the bit rate of the modem corresponding thereto, using the following expression $$\left[ K \cdot \frac{\text{bit\_rate}(i)}{\sum_{j=1}^{M} \text{bit\_rate}(j)} \right] \quad (3)$$

where bit_rate(i) is the bit rate of modem 'i,' and M is the number of modem elements.

B. repeat steps 'i' and 'ii' for all possible combinations of line failures (using the number of line failures corresponding to maximum resiliency):
      i. on the cut lines only: sum the number of bits from a single codeword to be transmitted.
      ii. if sum $<R/2$ (i.e., is resilient to line failures) then mark this combination of (K, R); if sum $\geq R/2$ then do not mark the combination (K, R) and return to step B.
   C. for all combinations of (K, R) that were marked in step B, compute the overhead using the following:

$$\text{overhead} = \frac{\text{num\_code} \cdot (K - R)}{\sum_{j=1}^{M} \frac{\text{bit\_rate}(j)}{8} \cdot 125 \mu \text{sec}} \quad (4)$$

where num_code is the number of codewords that can be transmitted in 125 microseconds. The denominator is the total number of bits that can be transmitted in 125 microseconds.

2. choose from among all combinations (K, R) that an overhead value has been calculated for, the combination that yields the minimum overhead.

The method of determining the input sequence in the dispatcher will now be described in more detail. In accordance with the method, the size of the codeword K, redundancy R and the maximum number of bytes from each codeword that can be sent by each modem are known.

Figure 22:
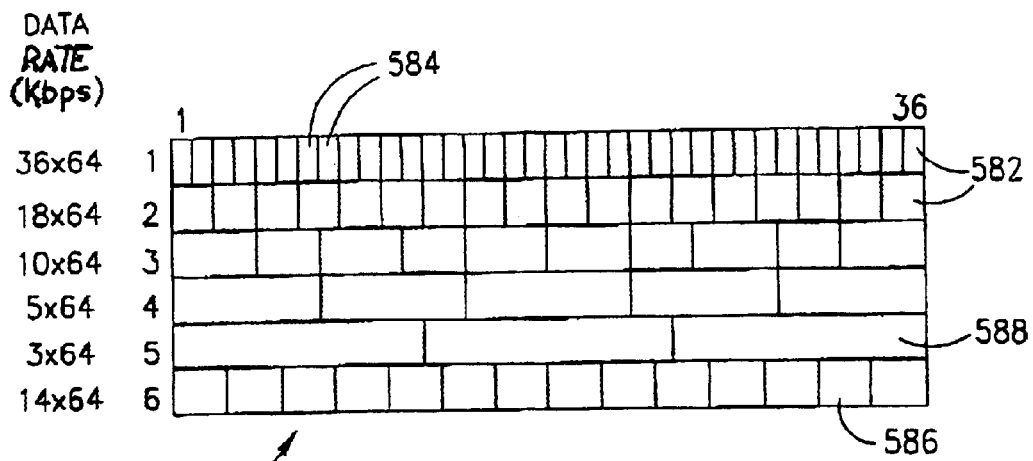
FIG. 22 is a diagram illustrating an example format of a dispatcher table memory.

Initially, a table is created having a number of rows equal to the number of modem elements and a number of columns equal to the maximum bit rate divided by the bit rate resolution, e.g., 2.048 Mbps/64 kbps=32. An example of such a dispatch memory table is illustrated in FIG. 22. The table, generally referenced 580, comprises six rows 582 and 36 columns. The maximum data rates for the six modem elements are as listed in Table 2 shown below.

| Modem | Rate (Kbps) |
|-------|-------------|
| 1 | 36*64 |
| 2 | 18*64 |
| 3 | 10*64 |
| 4 | 5*64 |
| 5 | 3*64 |
| 6 | 14*64 |

In this example, the minimum transmission duration for a cell is $$\frac{8}{36 * 64 \times 10^3}$$

seconds, corresponding to the fastest modem bit rate. The maximum duration is 125 microseconds, corresponding to the slowest modem bit rate. The actual transmission duration of a data byte is indicated by the boxes in the table. For a modem with a bit rate of $$\frac{36}{N} \cdot 64 \text{ Kbps,}$$

the transmission comprises N cell(s) from the table. For example, modem #1 has a bit rate of 36*64 kbps, therefore cells 584 for modem #1 have a short duration. Modem #6 has a bit rate of 14*64 kbps, therefore cells 586 have a longer duration than those of modem #1. Modem #5 has a bit rate of 3*64 kbps, therefore cells 588 have a relatively long duration.

A pseudo code listing is presented to illustrate the dispatcher input sequence method below in Listing 2.

Listing 2: Dispatcher Input Sequence Method

1. The cells are filled beginning with the first cell of the first modem.
2. The dispatch table is then filled:
   A. repeat for all codewords in a cycle (i.e., 125 microseconds):
      i. repeat for all bytes in a codeword:
         a. find the next available modem cell.
         b. check if the maximum allowable number of bytes from one codeword have been sent to this modem (this was computed in step 1-A; see Listing 1); if TRUE then place the byte in this cell, if FALSE go to step 'a'.
   B. check the dispatch table for unfilled cells, fill any found with 'null' symbols.

To aid in understanding the dispatch input sequence method of the present invention, two illustrative examples are presented.

Figure 23:
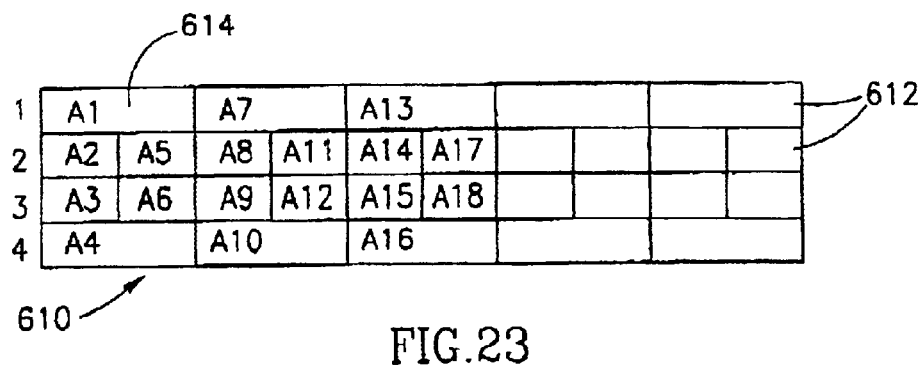
FIG. 23 is a diagram illustrating the contents of a first example dispatcher table memory wherein a single codeword has been placed in the dispatch table.

A diagram illustrating the contents of a first example dispatcher table memory wherein a single codeword has been placed in the dispatch table is shown in FIG. 23. In this first example the following parameters apply:
Codeword size=18 bytes
Redundancy length=12 bytes
Number of modem elements/lines (M)=4

Line rates for modem elements #1 through #4: $R_1$, $2*R_1$, $2*R_1$, $R_1$ (wherein $R_1$ is a valid modem bit rate)
Number of bits per line: 3, 6, 6, 3
Resilient against 1 line failure The table, generally referenced 610, comprises four rows 612 and a plurality of cells 614. The 18 bytes of the codeword are labeled A1 through A18 and their location is indicated in the table. The cells are allocated starting with the first cell of the first modem and cycles through each modem until the entire codeword is entered into the table. Once filled, the table is then output to the modem elements by the output sequencer 560 (FIG. 20).

Figure 24:
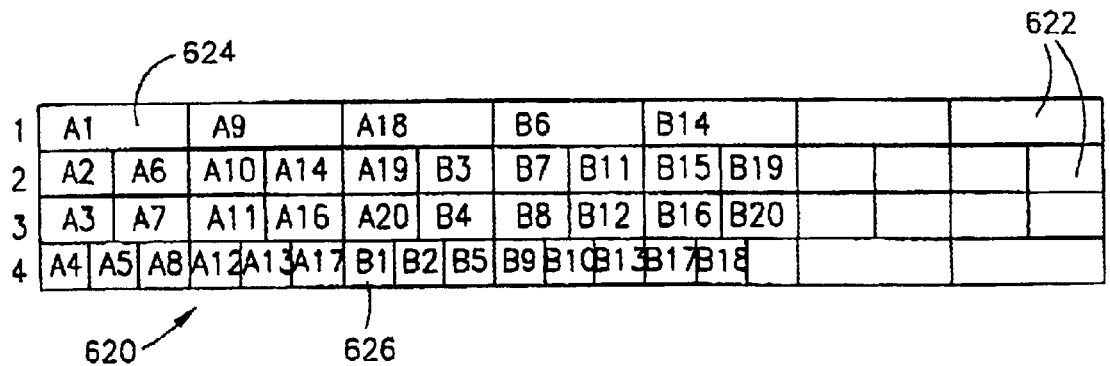
FIG. 24 is a diagram illustrating the contents of a second example dispatcher table memory wherein two codewords have been placed in the dispatch table.

A diagram illustrating the contents of a second example dispatcher table memory wherein two codewords have been placed in the dispatch table is shown in FIG. 24. In this second example the following parameters apply:
Codeword size=20 bytes;
Redundancy length=12 bytes;
Number of modem elements/lines (M)=4;
Line rates for modem elements #1 through #4: $R_1$, $2*R_1$, $2*R_1$, $3*R_1$ (wherein $R_1$ is a valid modem bit rate);
Number of bits per line: 3, 5, 5, 8;
Resilient against 1 line failure;

The table, generally referenced 620, comprises four rows 622 and a plurality of cells 624. The 20 bytes of the first codeword are labeled A1 through A20 and their location is indicated in the table. The 20 bytes of the second codeword are labeled B1 through B20 and their location is also indicated in the table. The cells are allocated starting with the first cell of the first modem and cycles through each modem until both codewords are entered into the table.

As described previously, the present invention comprises synchronization means to aid in transmission and reception of data. The data output from the dispatcher is distributed to the plurality of modem elements with variable bit rate, delay and jitter. At the receiving end, the collector functions to combine the data streams into a single stream. To do this accurately, it is necessary to synchronize the data streams that are received by the modem elements.

The spatial frame comprises a synchronization header at the beginning thereof. At the receiving end, reception of a complete spatial frame allows resynchronization of the data streams received by the modem elements. The overhead required for spatial frame synchronization is preferably as low as possible. In the example presented herein wherein the synchronization period is 125 microseconds and the spatial frame period $T_{SF}$ is 8 milliseconds, the overhead is given as follows.

TABLE 4

Tag tiling variables

| variable | Meaning |
|---|---|
| β | minimum vertex angle |
| k | tag diameter |
| m | minimum diameter of sensor field of view on surface |
| s | maximum center-to-center tag spacing |
| t | minimum center-to-center tag spacing |

The spatial frame header is simultaneously transmitted on all the modem elements for the duration of 125 microseconds. Therefore, the actual number of symbols in the spatial frame header depends on the bit rate of the modem. This is illustrated in the header portion 528 of the spatial frame 520 (FIG. 14). The input sequencer in the dispatcher transfers the header bytes to each modem once during every cycle. Although the synchronization period may comprise a fixed period of time, it comprises a variable number of bytes, depending on the data rate of the modem associated with that line.

The receiver is operative to align the received data streams in accordance with the detection of the header of the spatial frame. Each of the modem elements in the HSAS is adapted to detect a synchronization symbol. The synchronization symbol, one UST duration (e.g., 125 microseconds) is periodically transmitted on all modem lines simultaneously. A buffer in each modem functions to absorb any delay that may exists on a particular modem line. The delays are inevitably introduced by the operation of multiple modem elements running different bit rates. For example, when HDSL2 modem elements are used, the trellis code modulator in the transmitters and the Viterbi decoders in the receivers both create delays the duration of which depend on the bit rate. To compensate, the synchronization detect signals from all the modem elements are pooled into a master sync detect circuit. The circuit is operative to combine the synchronization patterns from all the modem elements and generate a single detect signal.

Figure 25:
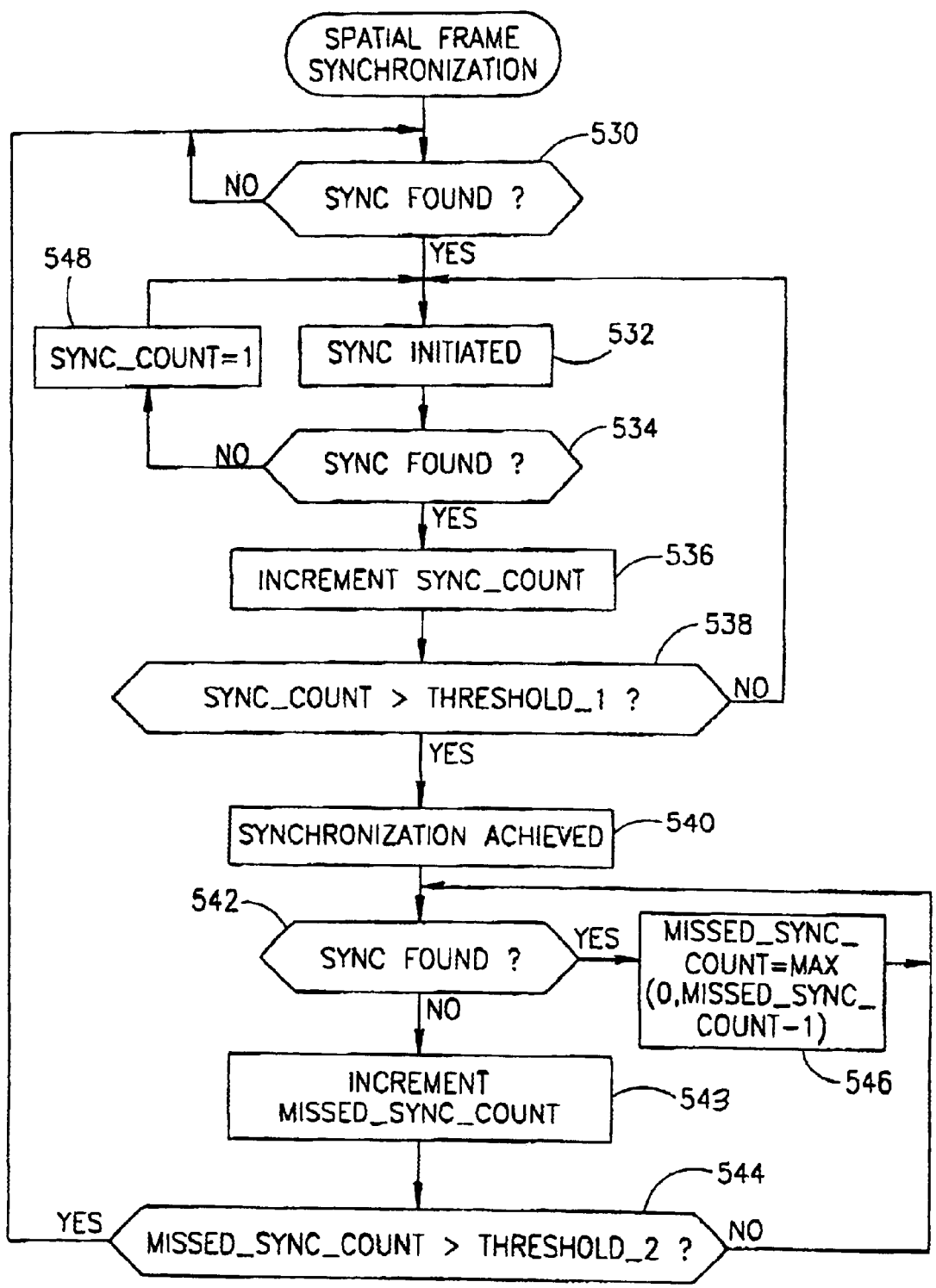
FIG. 25 is a flow diagram illustrating the flywheel spatial frame synchronization method portion of the HSAS of the present invention.

Each modem is operative to synchronize the data stream in accordance with the spatial frame header it receives on its line. When the buffers in the different modem elements are synchronized via the master sync detect circuit, the collector starts reading data from the modem elements. The master sync detect circuit may be implemented in any suitable way. When the spatial frame duration is larger than the maximal delay, the master sync detector may be implemented using the 'flywheel' or correlator technique, both techniques being well known in the art. The correlator requires a large amount of memory but is more robust to BER degradation. For example, the flow diagram illustrating the flywheel spatial frame synchronization method portion of the HSAS of the present invention is shown in FIG. 25. The flywheel method requires relatively far less memory but potentially suffers from BER degradation. This method functions to search for a synchronization header during a certain time window of the input stream in each modem. A first threshold is used to detect when synchronization has been achieved and a second threshold to detect the loss of synchronization.

Initially, the modem searches for the sync header (step 530). When a sync is found, the sync process initiated state is entered (step 532) and the modem searches again for the sync header (step 534). If no sync is found, the value of the counter sync_count is set to one (step 548) and the method continues with step 532. If a sync is found, the sync_count is incremented (step 536).

The value of sync_count is then compared to a first threshold (threshold_1) (step 538). If sync_count is less than or equal to threshold_1 the method continues with step 532. If sync_count is greater than threshold_1 then synchronization is declared (step 540).

The modem searched the next sync header (step 542). If it is not found, a second counter missed_sync_count is incremented (step 542). Missed_sync_count is then compared to a second threshold (threshold_2) (step 544). If missed_sync_count is greater than threshod_2, then the method returns to step 530. If missed_sync_count is less than of equal to threshod_2, then the missing sync can be tolerated and the method continues with step 542. When a sync is found (step 542) the value of missed_sync_count is set to the greater of missed_sync_count −1 or zero (step 546) and the modem continues searching for the sync (step 542).

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to without departing from the spirit and scope of the present invention.

What is claimed is:

1. An apparatus for transporting a high speed data stream over a channel consisting of a plurality of relatively low bandwidth twisted copper pair lines, comprising;

an encoder for applying an error correction encoding scheme to said high speed data stream;

a plurality of modem elements coupled to said plurality of twisted copper pair lines, each modem element associated with one of said copper pair lines and configured to operate at a data rate, delay, signal to noise ratio, and bit error rate independent of other modem elements;

a dispatcher operative to divide said encoded high speed data stream into a plurality of low rate data streams to be transmitted by said plurality of modem elements, said dispatcher adapted to forward a low rate data stream to each modem element in accordance with the data rate of each modem;

a collector operative to combine a plurality of data streams received by said plurality of modem elements into a received high speed data stream;

a decoder adapted to receive said received high speed data stream output from said collector and to apply an error correction decoding scheme so as to generate an original high speed data stream;

means for selecting the parameters for codewords generated by said encoder so as to provide desired resiliency to line failures, minimum bit error rate (BER) and maximum bandwidth, said parameters consisting of K and R, wherein K-R represents the number of bytes in a payload portion of said codeword and R represents the number of bytes in a redundancy portion of said codeword, wherein said codewords are distributed to said plurality of modem elements for transmission over said plurality of low bandwidth twisted copper pair lines, each modem element having a data rate, delay, signal to noise ratio, and BER independent of other modem elements, said means for selecting comprising:

means for computing the maximum number of bytes from a codeword to be sent over each modem element in accordance with its corresponding data rate, for all valid combination of codeword size K and redundancy length R;

means for summing the number of bytes from a single codeword to be transmitted, for all combinations of line failures;

means for marking this combination only if said sum is less than R/2;

means for computing an overhead for all marked combinations; and means for selecting from among all combinations of K and R wherein an associated overhead was computed, the combination yielding a minimum overhead.

2. The apparatus according to claim 1, wherein said dispatcher further comprises:

a two dimensional buffer comprising a plurality of cells arranged as a plurality of rows and columns, each row associated with a different modem element and each column representing a single symbol, an input sequencer adapted to distribute said high speed data stream to cells in said buffer, the amount of data distributed to each row is determined in accordance with the particular data rate of the modem corresponding thereto; and an output sequencer adapted to distribute the contents of the cells in said buffer to said plurality of modem elements.

3. The apparatus according to claim 2, wherein said input sequencer comprises filling means for:

filling the cells of said buffer with bytes beginning with the first cell of the first row;

finding the next available cell in said buffer;

placing a byte in the next available cell if the maximum allowable number of bytes from one codeword have not yet been placed in the particular row; and repeating said steps of finding and placing for all codewords in one cycle of said input sequencer.

4. The apparatus according to claim 3, wherein said fills means comprises fills any unfilled cells with null symbols.

5. A method of selecting the parameters for codewords generated by an encoder so as to provide desired resiliency to line failures, minimum bit error rate (BER) and maximum bandwidth, said parameters consisting of K and R, wherein K-R represents the number of bytes in a payload portion of said codeword and R represents the number of bytes in a redundancy portion of said codeword, wherein said codewords are distributed to a plurality of modem elements for transmission over a plurality of low bandwidth twisted copper pair lines, each modem element having a data rate, delay, signal to noise ratio, and BER independent of other modem elements, said method comprising the steps of:

for all valid combination of codeword size K and redundancy length R, computing the maximum number of bytes from a codeword to be sent over each modem element in accordance with its corresponding data rate;

for all combinations of line failures, summing the number of bytes from a single codeword to be transmitted;

marking this combination only if said sum is less than R/2;

for all marked combinations, computing an overhead; and selecting from among all combinations of K and R wherein an associated overhead was computed, the combination yielding a minimum overhead.

6. An apparatus for transporting a high speed data stream over a channel consisting of a plurality of relatively low bandwidth twisted copper pair lines, comprising;

an encoder for applying an error correction encoding scheme to said high speed data stream;

a plurality of modem elements couple d plurality of twisted copper pair lines, each modem element associated with one of said copper pair lines and configured to operate at a data rate, delay, signal to noise ratio, and bit error rate independent of other modem elements;

a dispatcher operative to divide said encoded high speed data stream into a plurality of low rate data streams to be transmitted by said plurality of modem elements, said dispatcher adapted to forward a low rate data stream to each modem element in accordance with the data rate of each modem, wherein said dispatcher further comprises:

a two dimensional buffer comprising a plurality of cells arranged as a plurality of rows and columns, each row associated with a different modem element and each column representing a single symbol, an input sequencer adapted to distribute said high speed data stream to cells in said buffer, the amount of data distributed to each row is determined in accordance with the particular data rate of the modem corresponding thereto; and an output sequencer adapted to distribute the contents of the cells in said buffer to said plurality of modem elements;

a collector operative to combine a plurality of data streams received by said plurality of modem elements into a received high speed data stream; and a decoder adapted to receive said received high speed data stream output from said collector and to apply an error correction decoding scheme so as to generate an original high speed data stream.

7. The apparatus according to claim 6, wherein said input sequencer comprises filling means for:

filling the cells of said buffer with bytes beginning with the first cell of the first row;

finding the next available cell in said buffer;

placing a byte in the next available cell if the maximum allowable number of bytes from one codeword have not yet been placed in the particular row; and repeating said steps of finding and placing for all codewords in one cycle of said input sequencer.

8. The apparatus according to claim 7, wherein said fills means comprises fills any unfilled cells with null symbols.

9. The apparatus according to claim 6, further comprising means for interleaving said encoded high speed data stream before distribution to said said dispatcher.

10. The apparatus according to claim 6, further comprising means for de-interleaving said received high speed data stream.

11. The apparatus according to claim 6, further comprising an interleaver operative to divide codewords generated by said encoder into a plurality of shorter data segments, said shorter data segments forwarded to said dispatcher such that during any period of time only a portion of a codeword is transmitted over said plurality of twisted copper pair lines so as to provide protection from burst noise.

12. The apparatus according to claim 6, further comprising a scrambler adapted to scramble said high speed data stream before said error correction coding scheme is applied by said encoder.

13. The apparatus according to claim 6, further comprising a de-scrambler adapted to de-scramble said received speed data stream before error correction decoding by said decoder.

14. The apparatus according to claim 6, further comprising means for excluding a particular twisted pair line from the plurality of twisted pair lines used for transmission of said high speed data stream in the event the quality of said particular twisted pair line drops below a threshold.

15. The apparatus according to claim 6, further comprising crosstalk cancellation means comprising:

means for measuring a plurality of cable parameters including near end crosstalk between twisted pairs; and means for canceling near end crosstalk from said received data stream in accordance with said cable parameter measurements.

16. The apparatus according to claim 6, further comprising Near End Crosstalk (NEXT) cancellation means, comprising:

means for generating an estimate of a NEXT transfer function of the crosstalk caused by radiators nearby to a modem element;

means for generating an estimate of a NEXT disturbance signal in accordance with said estimated NEXT transfer function; and means for subtracting said estimate of a NEXT disturbance signal from the signal received by a modem element.

17. The apparatus according to claim 6, wherein said error correction encoding scheme comprises Reed Solomon block encoding.

18. The apparatus according to claim 6, wherein said encoder is operative to generate a plurality of codewords of length K, each codeword consisting of a payload portion containing K-R bytes and a redundancy portion consisting of R bytes.

19. The apparatus according to claim 6, wherein said encoder is operative to generate a plurality of codewords of length K, each codeword consisting of a payload portion containing K-R bytes and a redundancy portion consisting of R bytes, wherein K and R are chosen such that no more than R/2 bytes are corrupted in the event one or more lines are cut thus providing resiliency to a specified number of cut lines.

20. The apparatus according to claim 6, further comprising means for selecting parameters for codewords generated by said encoder so as to provided desired resiliency to line failures, minimum bit error rate (BER) and maximum bandwidth, said parameters consisting of K and R, wherein K represents the length of the codewords, K-R represents the number of bytes in a payload portion of said codeword and R represents the number of bytes in a redundancy portion of said codeword.

* * * * *